US012684535B2

(12) United States Patent
Zewail et al.

(10) Patent No.: US 12,684,535 B2
(45) Date of Patent: Jul. 14, 2026

(54) SHARED RESOURCE POOLS BETWEEN TRANSMISSION AND RECEPTION POINTS WITH USER EQUIPMENT ASSISTANCE

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 642 days.

(21) Appl. No.: 18/183,944

(22) Filed: Mar. 14, 2023

(65) Prior Publication Data

US 2024/0314742 A1 Sep. 19, 2024

(51) Int. Cl.
| | |
|---|---|
| *H04W 72/02* | (2009.01) |
| *H04W 72/1263* | (2023.01) |
| *H04W 72/23* | (2023.01) |

(52) U.S. Cl.
CPC ....... H04W 72/02 (2013.01); H04W 72/1263 (2013.01); H04W 72/23 (2023.01)

(58) Field of Classification Search
None
See application file for complete search history.

(56) References Cited

U.S. PATENT DOCUMENTS

| | | | | |
|---|---|---|---|---|
| 2021/0352629 | A1* | 11/2021 | Haghighat | ............ H04L 1/1896 |
| 2021/0392652 | A1* | 12/2021 | Dutta | .................. H04W 72/542 |
| 2022/0132534 | A1* | 4/2022 | Jang | ...................... H04L 5/0051 |
| 2022/0295589 | A1* | 9/2022 | Tsai | ...................... H04W 76/19 |
| 2023/0023982 | A1* | 1/2023 | Kim | .................. H04W 52/0216 |
| 2023/0239025 | A1* | 7/2023 | Park | ...................... H04L 5/0053 |
| | | | | 370/329 |
| 2023/0370141 | A1* | 11/2023 | Hindy | .................. H04B 7/0639 |
| 2024/0072975 | A1* | 2/2024 | Rastegardoost | ...... H04W 72/20 |
| 2025/0056513 | A1* | 2/2025 | Kang | ........................ H04L 1/18 |

* cited by examiner

*Primary Examiner* — Kodzovi Acolatse
(74) *Attorney, Agent, or Firm* — Procopio, Cory, Hargreaves & Savitch

(57) ABSTRACT

The apparatus may be associated with at least a first TRP and may be configured to configure at least a first resource pool associated with the first TRP and a second resource pool associated with both the first TRP and a second TRP. The apparatus may further be configured to provide a grant for a resource for a first communication with the first TRP using one of a single control message based on the resource being in the first resource pool, or multiple control messages based on the resource being in the second resource pool. In an aspect of the disclosure, the apparatus may be configured to receive the configuration for at least the first resource pool and the second resource pool to receive a grant for the resource for the first communication via one of the single control message, or the multiple control messages.

30 Claims, 19 Drawing Sheets

1502 — receive a configuration for at least a first resource pool associated with a first TRP and a second resource pool associated with both the first TRP and a second TRP 1508 — receive a grant for a resource for a communication with a particular TRP

FIG. 16

receive a configuration for a plurality of resource pools for communication with at least a first and second TRP — 1602

1600 receive, for DL communication with at least one wireless device, a configuration of a 1st resource pool associated with the 1st TRP, a 2nd resource pool associated with both the 1st TRP and the 2nd TRP, and a 3rd resource pool associated with the 2nd TRP — 1604 receive, for UL communication with at least one wireless device, a configuration of a 4th resource pool associated with the 1st TRP, a 5th resource pool associated with both the 1st TRP and the 2nd TRP, and a 6th resource pool associated with the 2nd TRP — 1606 receive a grant for a communication with the first (or second) TRP 1608

1610 — 1st, 2nd, or 3rd Resource Pool?

1st branch:
1612A — receive DCI for grant?
 No / Yes
1614A — transmit or receive a communication via the granted resource
1616A — to next resource pool?
 No / Yes

2nd branch:
1618 — receive at least one DCI for a potential grant?
 No / Yes
1620 — determine to accept or reject each received potential grant
1622 — transmit (or omit) feedback based on determination
1624 — receive DCI granting resources for an accepted potential grant
1626 — transmit or receive at least one communication based on feedback
1628 — transition to next resource pool?
 Yes / No

3rd branch:
1612B — receive DCI for grant?
 No / Yes
1614B — transmit or receive a communication via the granted resource
1616B — to next resource pool?
 No / Yes

SHARED RESOURCE POOLS BETWEEN TRANSMISSION AND RECEPTION POINTS WITH USER EQUIPMENT ASSISTANCE

TECHNICAL FIELD

The present disclosure relates generally to communication systems, and more particularly, to systems including at least one wireless device communicating with multiple transmission and reception points (TRPs) that may not coordinate for individual resource grants.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be associated with at least a first TRP and may be configured to configure at least a first resource pool associated with the first TRP and a second resource pool associated with both the first TRP and a second TRP. The apparatus may further be configured to provide a grant for a resource for a first communication with the first TRP using one of a single control message based on the resource being in the first resource pool, or multiple control messages based on the resource being in the second resource pool.

In an aspect of the disclosure, a method, a computer-readable medium, and an apparatus are provided. The apparatus may be a wireless device configured to receive a configuration for at least a first resource pool associated with a first TRP and a second resource pool associated with both the first TRP and a second TRP. The apparatus may further be configured to receive a grant for a resource for a first communication with the first TRP via one of a single control message based on the resource being in the first resource pool, or multiple control messages based on the resource being in the second resource pool.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 9 is a set of diagrams illustrating a successful collision avoidance and an unsuccessful collision avoidance, respectively, when a first TRP uses pre-grant signaling and a second TRP grants resources without pre-grant signaling in accordance with some aspects of the disclosure.

FIG. 16 is a flowchart of a method of wireless communication.

DETAILED DESCRIPTION

Figure 1:
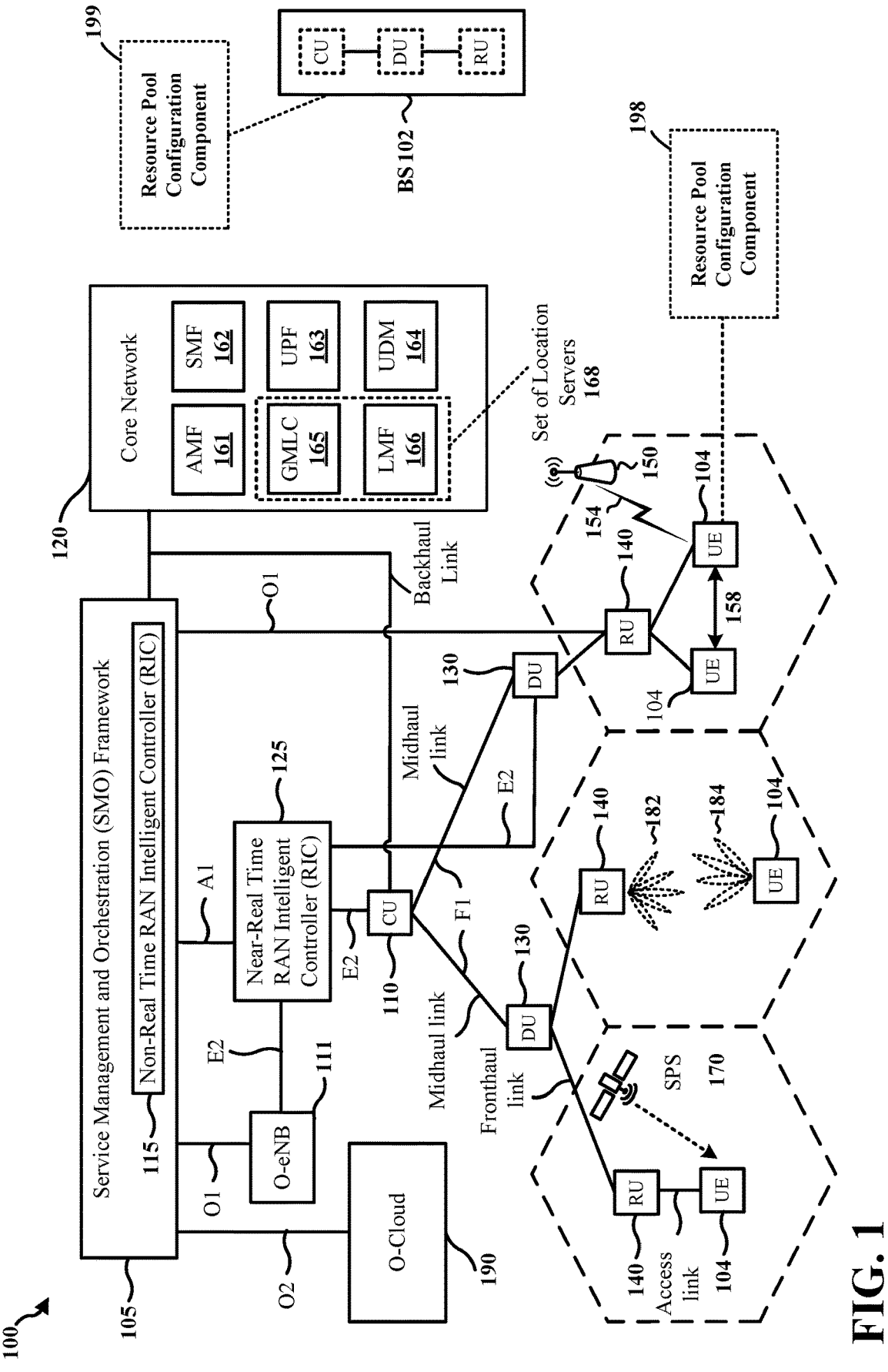
FIG. 1 is a diagram illustrating an example of a wireless communications system and an access network.

In some aspects of wireless communication, e.g., 5G NR as a non-limiting example of a wireless communication technology, a multi-TRP (mTRP) architecture may be implemented allowing a UE to connect to multiple TRPs. In some aspects, multiple TRPs connected to a particular UE may not cooperate and/or coordinate (e.g., in real-time and/or via fast backhaul signaling) to schedule individual communications. The lack of cooperation and/or coordination may lead to "collisions" between communications for the different TRPs such that neither communication can be decoded resulting in wasted resources. For example, a same set of resources (or overlapping resources in one or more of frequency and/or time) may be allocated and/or granted for communication with a particular UE (or other wireless device) by two TRPs such that at least one communication cannot be correctly received (or transmitted) and decoded (or encoded) by the UE. Accordingly, a method and apparatus are provided for collision avoidance to improve communication between the UE and the network by configuring resource pools for each TRP separately and/or a shared resource pool and a corresponding type of resource grant procedure for separate and shared resource pools to reduce collisions and wasted resources for non-cooperating and/or non-coordinating TRPs.

A network device, in some aspects, may allocate, for a particular UE or wireless device, a first (separate) resource pool for communication between the UE and a first TRP, a second (separate) resource pool for communication between the UE and a second TRP, and a third (shared) resource pool for communication between the UE and either the first TRP or the second TRP. The network device may further configure each TRP to grant resources in a corresponding first or second (separate) resource pool using a first format (e.g., a legacy DCI format) that is not configured to handle collisions and to grant resources in the third (shared) resource pool using a second format (e.g., a pre-grant format as described below) that is configured to handle collisions.

Accordingly, the aspects presented herein reduce the effect of collisions while introducing a minimal amount of additional cooperation and/or coordination between independent TRPs and a minimal amount of additional signaling overhead.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a resource pool configuration component 198 that may be configured to receive a configuration for at least a first resource pool associated with a first TRP and a second resource pool associated with both the first TRP and a second TRP. The resource pool configuration component 198 may further be configured to receive a grant for a resource for a first communication with the first TRP via one of a single control message based on the resource being in the first resource pool, or multiple control messages based on the resource being in the second resource pool. In certain aspects, the base station 102 may have a resource pool configuration component 199 that may be configured to configure at least a first resource pool associated with the first TRP and a second resource pool associated with both the first TRP and a second TRP. The resource pool configuration component 199 may further be configured to provide a grant for a resource for a first communication with the first TRP using one of a single control message based on the resource being in the first resource pool, or multiple control messages based on the resource being in the second resource pool. Although the following description may be focused on a single wireless device and two TRPs, the shared and separate resource pool configuration and corresponding grant formats for resource allocation may be applied for additional wireless devices associated with the same two TRPs or for additional TRPs associated with a same wireless device.

Figures 2A, 2B, 2C, 2D:
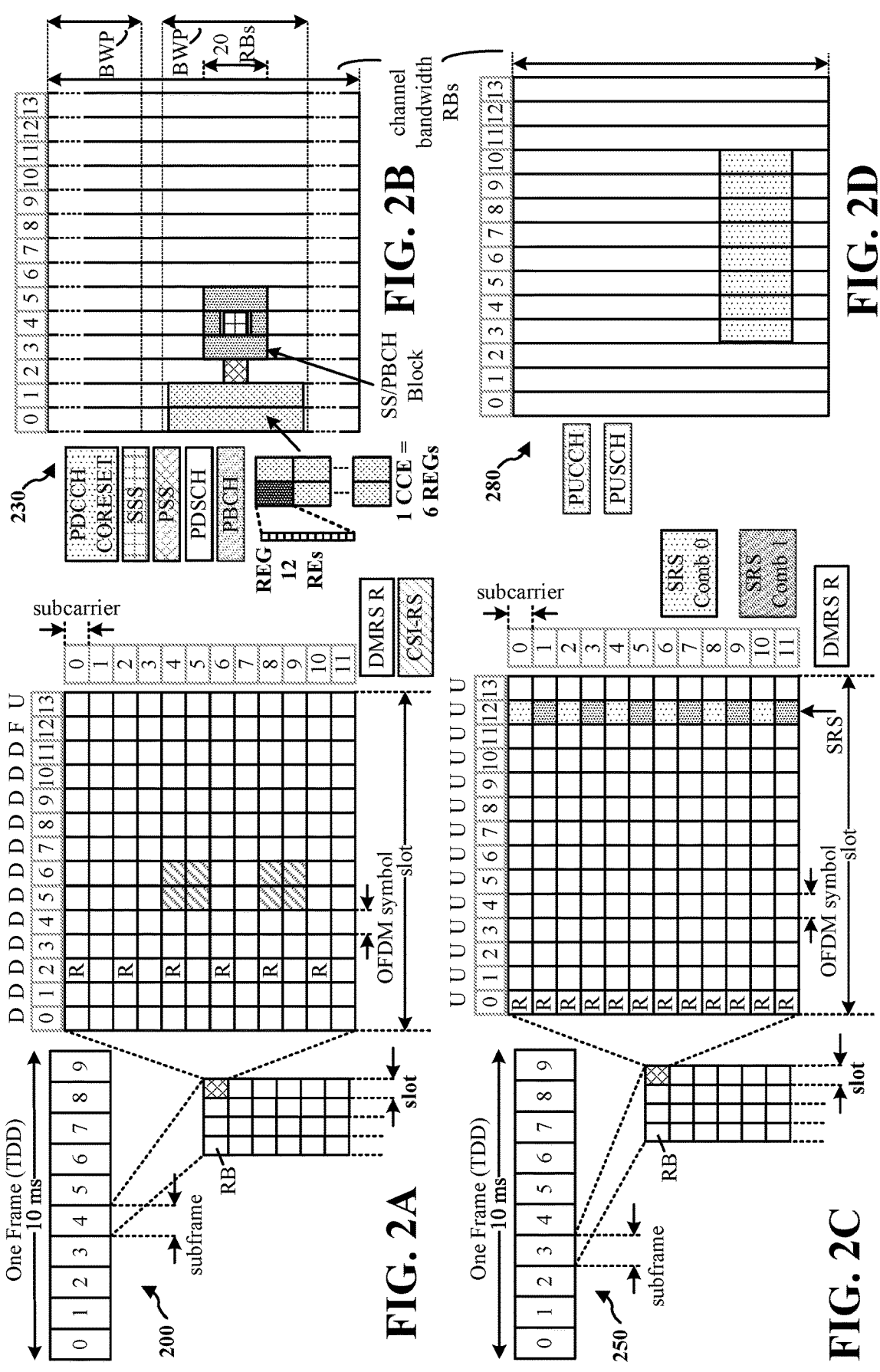
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| $\mu$ | SCS $\Delta f = 2^{\mu} \cdot 15[kHz]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2 slots/subframe. The subcarrier spacing may be equal to $2^{\mu} * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
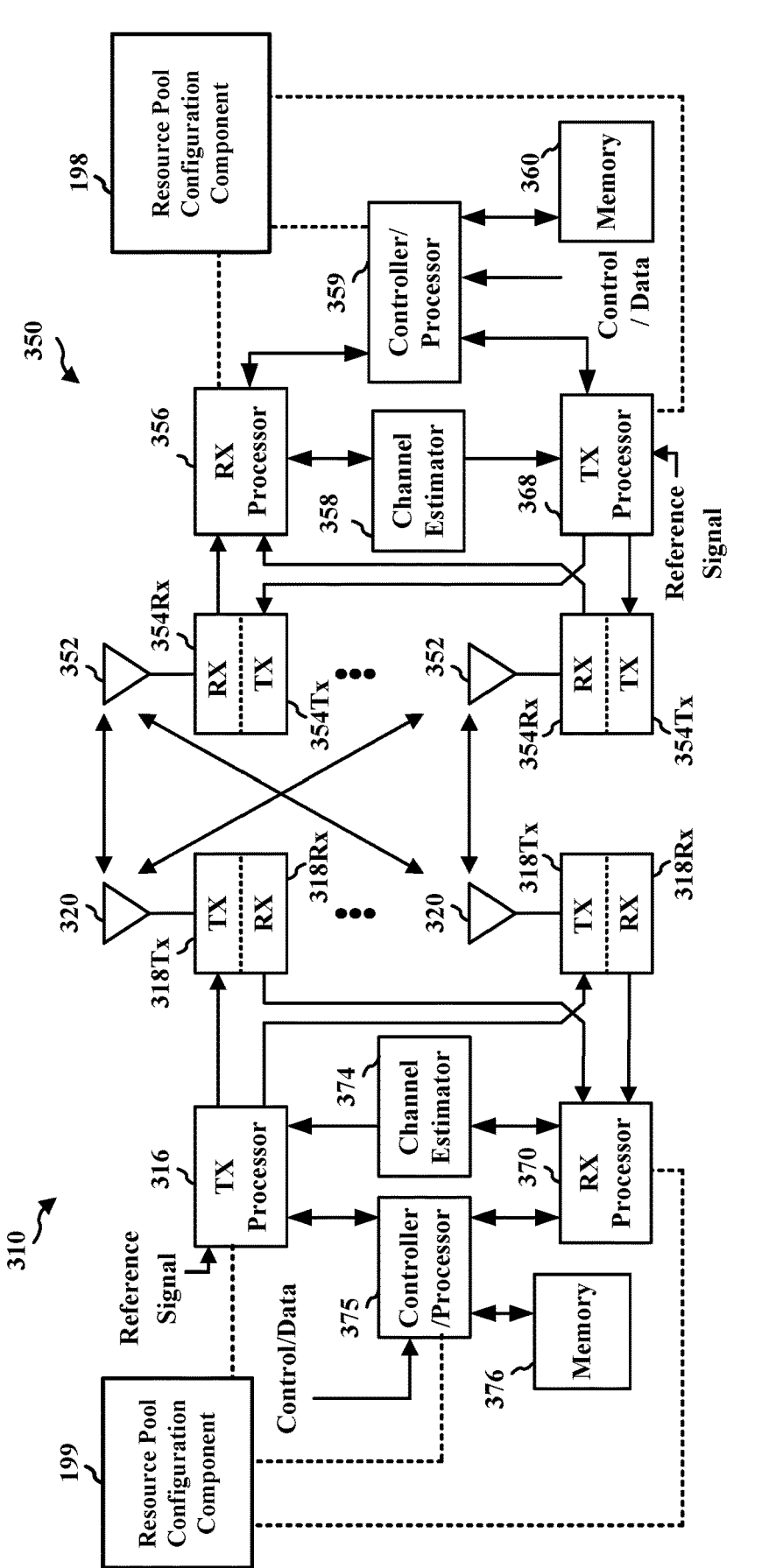
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the resource pool configuration component 198 of FIG. 1.

At least one of the TX processor 316, the RX processor 370, and the controller/processor 375 may be configured to perform aspects in connection with the resource pool configuration component 199 of FIG. 1.

Figures 4A, 4B:
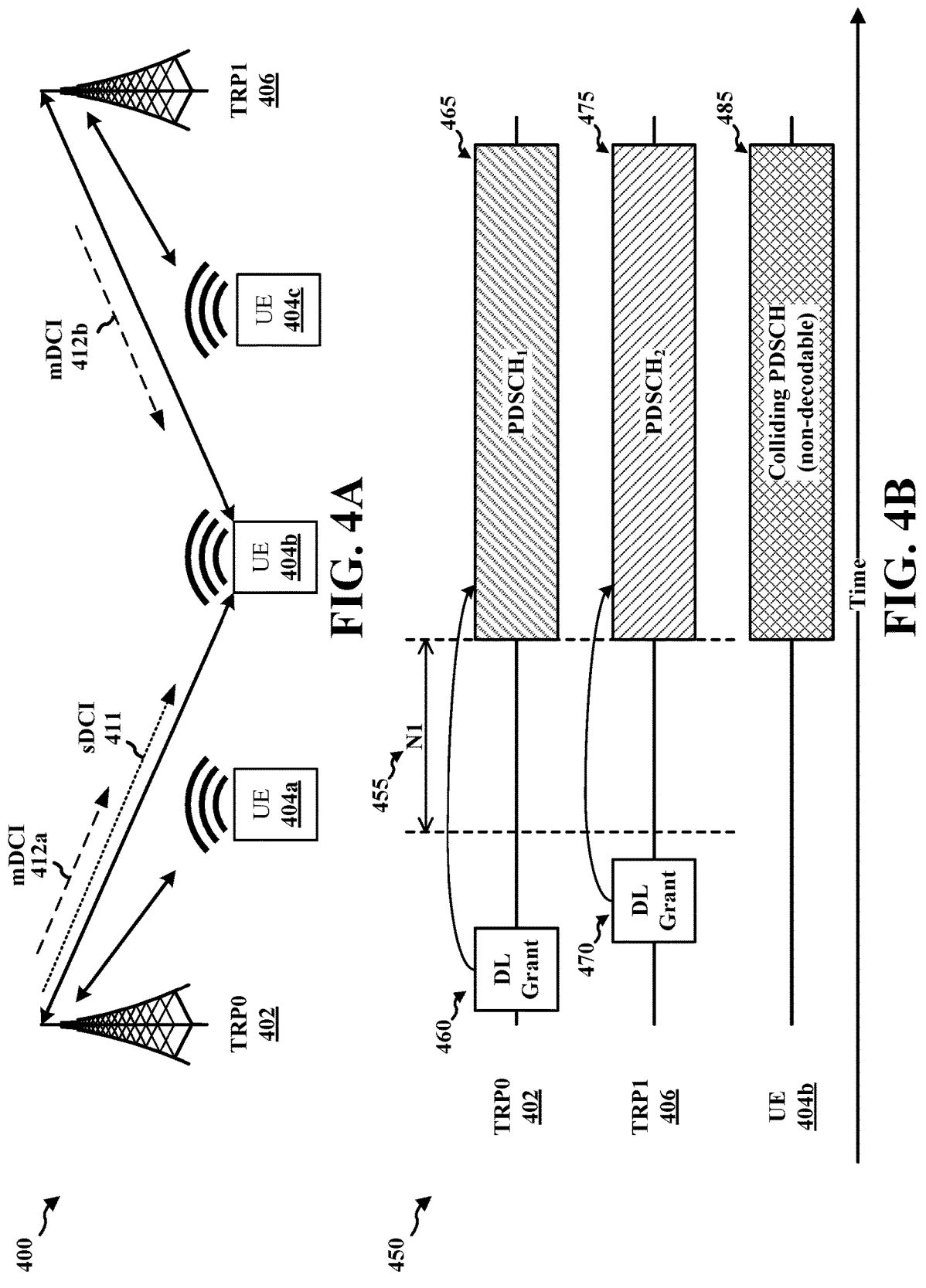
FIG. 4A is a diagram illustrating a set of two TRPs associated with a particular UE in accordance with some aspects of the disclosure.
FIG. 4B is a diagram illustrating a collision between a set of two communications associated with the two TRPs illustrated in FIG. 4A in accordance with some aspects of the disclosure.

In some aspects of wireless communication multiple TRPs may communicate with a single wireless device and/or a single wireless device may communicate with multiple TRPs. There is the potential for overlap in time, frequency, spatial direction, etc. for communication at a UE with multiple TRPs. In some aspects, mTRP communication may be scheduled with a single DCI (sDCI) transmitted by one of the TRPs. As an example, FIG. 4A illustrates an example in which a TRP0 402 sends an sDCI 411 with scheduling information for downlink communication, such as PDSCH, from the TRP0 402 and the TRP1 406. In some aspects, the mTRP communication may be scheduled by multiple DCI (mDCI), e.g., from the different TRPs. FIG. 4A also shows an example in which the TRP0 402 sends a DCI 412a scheduling downlink communication, e.g., PDSCH, from the TRP0 402, and the TRP1 406 sends DCI 412b scheduling downlink communication from the TRP1 406. Thus, control and/or data signaling from the TRPs may overlap in time, frequency, and/or spatial directions. For the sDCI example, one or more of spatial division multiplexing (SDM), frequency division multiplexing (FDM), or time division multiplexing (TDM) may be employed for the PDSCHs from different TRPs. For the mDCI example, HARQ ACK/NACK feedback for the different TRPs may be based on a single codebook or may be based on different codebooks. In some aspects, PDCCH from multiple TRPs may be transmitted with repetition having different QCL relationships. In some aspect, PUSCH or PUCCH may be transmitted to multiple TRPs in a TDM manner with repetition, or may be simultaneously transmitted with SDM.

In some aspects, multiple TRPs connected to a particular UE may not cooperate and/or coordinate (e.g., in real-time and/or via fast backhaul signaling) to schedule individual communications. The lack of cooperation and/or coordination may lead to "collisions" between communications for the different TRPs such that one or both of the colliding communications cannot be completed (e.g., transmitted, received, decoded, and/or encoded) leading to wasted resources as described below in relation to FIGS. 4A-9. For example, a same set of resources (or overlapping resources in one or more of frequency and/or time) may be allocated and/or granted by two TRPs for communication with a particular UE (or other wireless device) that does not support both communications (e.g., the overlap is such that the UE does not support transmitting and/or receiving both communications or of decoding and/or encoding both communications, e.g., based on a UE capability).

In some aspects, a per-cell operation of TRPs (e.g., base stations, eNBs, gNBs, etc.) that does not rely on cooperation and/or coordination to serve UEs may be assumed as a current state or configuration of a network or network entities in the network. For example, each TRP may have an independent scheduler. The network, in some aspects, may have mTRP-capable UEs introduced which may be served with currently-deployed TRPs (e.g., base stations, eNBs, gNBs, etc.) without substantial change to the network (e.g., the network entities or network components such as the TRPs, base stations, etc.). For example, while some software upgrades for one or more TRPs may be implemented, in some aspects, fast backhaul signaling between TRPs may not be implemented. To support mTRP-capable UEs with the minimal changes (e.g., software upgrades) discussed above, in some aspects presented herein, a network device may configure resource pools for each TRP separately and/or a shared resource pool and a corresponding type of resource grant procedure for separate and shared resource pools to reduce collisions and wasted resources for non-cooperating and/or non-coordinating TRPs. The aspects presented herein, in some aspects, may be easier to deploy as they does not rely on tight coordination. Aspects presented herein provide a type of unified mTRP framework for communication systems including multiple TRPs. Additionally, as the aspects enable independent TRP operation, e.g., without a certain level of coordination, the method and apparatus may be extended to active set management with different cells such that each TRP is packaged into an active set member and enables each active set to operate with its own TCI states, RS, CORESET, etc.

The network device, in some aspects, may allocate, for a particular UE or wireless device, a first (separate) resource pool for communication between the UE and a first TRP, a second (separate) resource pool for communication between the UE and a second TRP, and a third (shared) resource pool for communication between the UE and either the first TRP or the second TRP. The network device may further config- ure each TRP to grant resources in a corresponding first or second (separate) resource pool using a first DCI format for grants that is not configured to handle collisions and to grant resources in the third (shared) resource pool using a second format (e.g., a DCI format for grants that can also be used for the pre-grants or a pre-grant format as described below) that is configured to handle collisions. Accordingly, the aspects presented herein reduce the effect of collisions while introducing a minimal amount of additional cooperation and/or coordination between independent TRPs and a mini- mal amount of additional signaling overhead. In some aspects, the aspects presented herein may additionally increase throughput in the absence of collisions to offset the additional signaling in the case of collisions (e.g., collisions that have not been averted or avoided by the method and apparatus as will be described below).

FIG. 4A is a diagram 400 illustrating a set of two TRPs, TRP0 402 and TRP1 406, associated with a particular UE, UE 404b, in accordance with some aspects of the disclosure. In FIGS. 4A-16 below, the term 'TRP' (or 'the TRP') may be used in the place of reciting 'a network device associated with the TRP' with the understanding that certain actions and/or operations described as being performed by a TRP may be performed by the network device associated with the TRP. In some aspects, there may be multiple UEs, e.g., UE 404a, UE 404b, and UE 404c, each in communication with one or more of the TRPs, TRP0 402 or TRP1 406, (which may be base stations, gNBs, etc. or a component of one or more base stations). Traffic to and from the TRPs may be at least partially correlated. As an example, for DL and UL traffic, for mDCI mTRP communication, the traffic arrival at a base station may be correlated. For DL traffic the upper layer may distribute the packets to the two TRPS when there is a common traffic arrival burst. For UL traffic, the UE 404b may send a scheduling request (SR) or buffer status report (BSR), and the TRPs may schedule the UE to transmit the data to either TRP. Due to the activity of each TRP, they may not serve the UE continuously. In some aspects, each TRP may run its individual scheduler to serve multiple UEs including the UE 404b (which may be referred to as a target UE). If a TRP is lightly loaded, there is a higher likelihood for both TRPs to serve the UE at the same time. If the TRP is more highly loaded, there is a lower likelihood that both TRPs will attempt to serve the UE at the same time.

FIG. 4B is a diagram 450 illustrating a collision between a set of two communications (e.g., a first and second PDSCH) associated with the two TRPs, TRP0 402 or TRP1

406, illustrated in FIG. 4A in accordance with some aspects of the disclosure. For example, TRP0 402 may transmit, and UE 404b may receive, a first grant of DL resources 460 for a first PDSCH communication (e.g., $PDSCH_1$ 465) and TRP1 406 may transmit, and UE 404b may receive, a second grant of DL resources 470 for a second PDSCH communi- cation (e.g., $PDSCH_2$ 475). While illustrated in terms of conflicting and/or colliding DL resources (e.g., for a PDSCH), in some aspects, one or both of the granted resources may be for an UL communication (e.g., a PUSCH). The first and second grants of the DL resources 460 and 470 may be received via a DCI or other signaling that precedes the granted resources by at least a time 'N1' 455.

While illustrated as being fully overlapping in time, the granted resources associated with $PDSCH_1$ 465 and $PDSCH_2$ 475, in some aspects, may be partially overlapping in time. Additionally, the granted resources associated with $PDSCH_1$ 465 and $PDSCH_2$ 475, in some aspects, may not overlap in frequency, or may partially or fully overlap in frequency.

In some aspects, a UE may support simultaneous (e.g., at least partially overlapping in time) reception from mTRPs or simultaneous transmission to mTRPs. The collision illus- trated for resources 485, in some aspects, may be based on the capabilities of the UE 404b to transmit and/or receive simultaneously (e.g., overlapping in time such as in a same slot or symbol) on one or more frequency ranges. For example, a UE with a single antenna may experience a collision for two transmissions at a same time despite the two transmissions using different frequencies, while a UE with multiple antennas may be capable of receiving and decoding (or encoding and transmitting) a first transmission via a first range of frequencies while receiving and decoding (or encoding and transmitting) a second transmission over- lapping in time using a separate (or only slightly-overlap- ping) range of frequencies. For a collision between two PDSCH transmissions, one or both of the two PDSCH transmissions may be undecodable. For example, if a first PDSCH communication (e.g., associated with $PDSCH_1$ 465) of the two PDSCH communications is received with a power that is significantly greater than a received power of a second PDSCH communication (e.g., associated with $PDSCH_2$ 475), the first PDSCH communication may be decodable despite the collision while the second PDSCH communica- tion may not be decodable. Whereas, if the first and second PDSCH communications are received with similar powers, neither communication may be decodable. For a collision involving at least one UL communication (e.g., a UL/UL conflict or a DL/UL conflict), the collision may be avoided by the UE by omitting (e.g., canceling or skipping) the transmission of the at least one UL communication. A UE may consider it an error case if a serving combination, e.g., overlapping resources scheduled for reception from mTRPs or for transmission to mTRPs, exceeds the capability sup- ported by the UE. In some aspects, collision detection and reporting may be provided. Detection may be PDCCH decoding based, and reporting may be in ACK/NACK or MAC-CE. The reporting may include an ACK/NACK with- out indication of the cause or may provide more collision indication information. In some aspects the detection and reporting may be based on a backoff window. Communica- tion with multiple TRPs may additionally increase through- put in the absence of collisions to offset the additional signaling in the case of collisions (e.g., collisions that have not been averted or avoided). Aspects presented herein allow the UE to help provide some coordination information between multiple TRPs that may have separate, independent schedulers without a fast backhaul connection to provide coordination directly between the TRPs. By avoiding collisions, the information provided by the UE reduces resource waste and improves the accuracy of communication exchanged between the UE and the TRPs.

Figure 5:
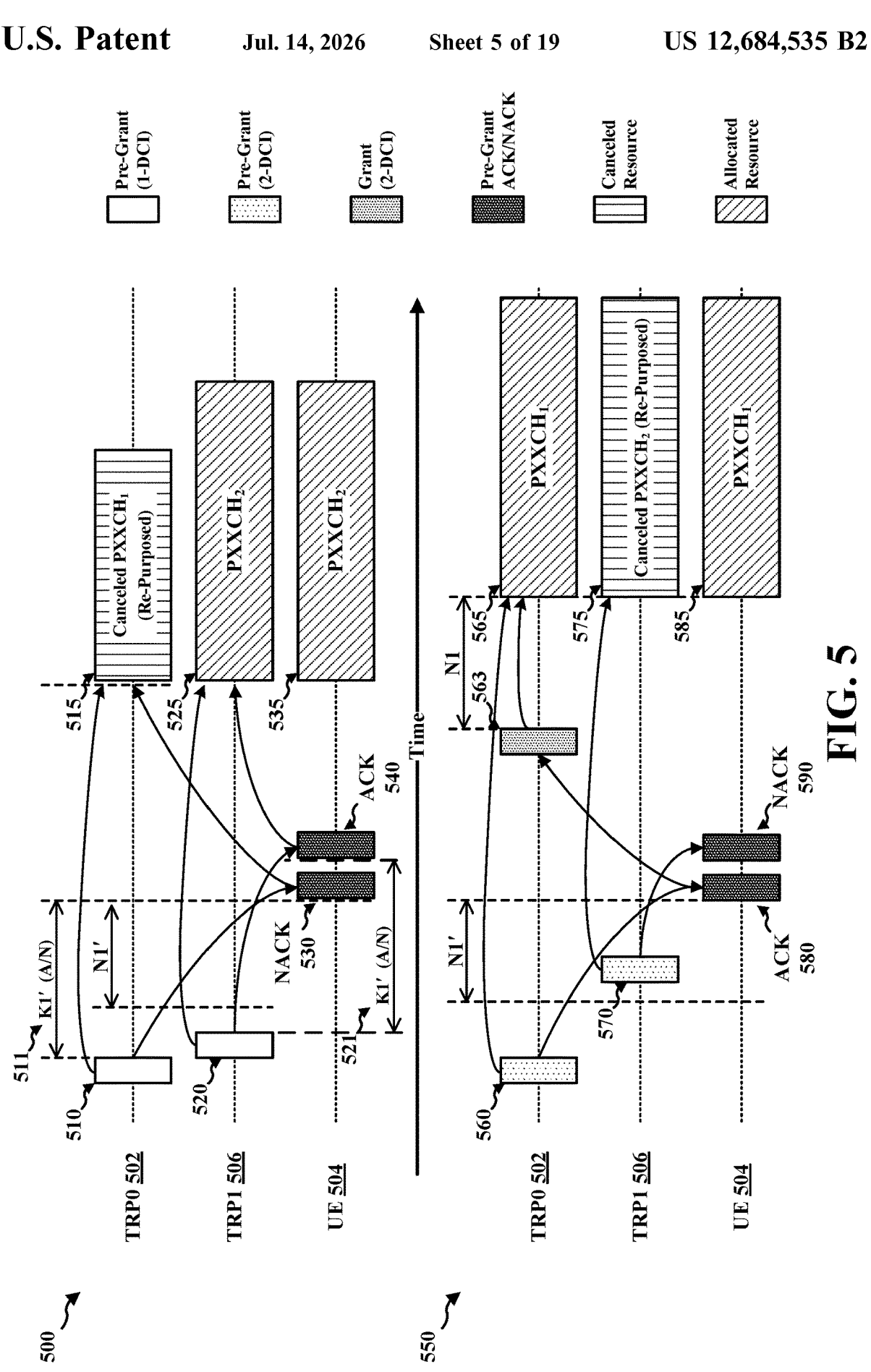
FIG. 5 is a set of diagrams illustrating the use of a single-DCI format for a pre-grant signaling and the use of a two-DCI format for the pre-grant signaling used to avoid collisions in accordance with some aspects of the disclosure.

FIG. 5 is a set of diagrams 500 and 550 illustrating the use of a single-DCI format for a pre-grant signaling and the use of a two-DCI format for the pre-grant signaling used to avoid collisions in accordance with some aspects of the disclosure. Diagrams 500 and 550 assume a system including a first TRP, the TRP0 502, a second TRP, the TRP1 506, and a UE 504 in communication, or associated, with both the TRP0 502 and the TRP1 506. Diagrams 500 and 550 illustrate that the TRP0 502 may transmit a DCI 510 using a single-DCI format (or may transmit a DCI 560 using a two-DCI format) at a first time and that the TRP1 506 may transmit a DCI 520 using the single-DCI format (or may transmit a DCI 570 using a two-DCI format) at a second time. Each DCI (e.g., whether referred to as a pre-grant DCI or a DCI) may indicate a corresponding set of resources for a DL or UL channel (e.g., PDSCH, PDCCH, PUCCH, or PUSCH, represented by PXXCH in the diagrams 500 and 550). The DCI 510 and the DCI 520, in some aspects, may include all the information included in a normal DL and/or UL grant as well as additional information relating to a time offset between a slot including the pre-grant DCI and a slot including a corresponding feedback resource (e.g., a value, K1' 511, or a value, K1' 521, respectively, similar to a K1 value indicating a number of slots between a slot including a granted resource and a slot including a corresponding feedback resource), a priority, a total DL assignment index (DAI), and/or a counter DAI for the corresponding feedback resource (e.g., feedback resource 530 and feedback resource 540, respectively) (where the total DAI and counter DAI may be associated with a type 2 HARQ codebook). In some aspects, the total DAI may be separate from a total DAI included in a current UL grant format that is for UCI piggyback. The DCI 510 and 520 may in some aspects be referred to as a pre-grant or pre-grant DCI, as the TRPs may monitor for feedback from the UE before proceeding to use the granted/indicated resources.

The pre-grant DCI 560 and the pre-grant DCI 570, in some aspects, may include a limited set of information (e.g., less information than is included in a normal DL and/or UL grant) used to identify a conflict/collision based on the capabilities of the UE 504 and the additional information relating to the feedback resource (e.g., a value K1', a priority, a total DAI, and/or a counter DAI). In some aspects, the content of the pre-grant DCI may be based on information that will help a UE identify a collision that is not supported by the UE. For example, if the UE cannot receive, or transmit, (e.g., does not support reception, or transmission, of) two PDSCHs/PUSCHs ("PXSCH") (or one PDSCH and one PUSCH) in the same slot, the pre-grant DCI 560 and/or the pre-grant DCI 570 may include a slot index (e.g., in the form of K0 for PDSCH or K2 for PUSCH) for the (PXSCH) resources associated with the pre-grant DCI 560 and/or the pre-grant DCI 570. Similarly, if the UE 504 cannot receive, or transmit, (e.g., does not support reception, or transmission, of) two time overlapping PXSCHs, the pre-grant DCI 560 and/or the pre-grant DCI 570 may include a slot index (in the form of K0/K2) and a start and length indicator value (SLIV) for the PXSCH. If the UE 504 cannot receive, or transmit, (e.g., does not support reception, or transmission, of) two time and frequency overlapping PXSCHs, the pre-grant DCI 560 and/or the pre-grant DCI 570 may include a slot index (in the form of K0/K2), a SLIV for the PXSCH, and a frequency domain resource allocation (FDRA). If the UE 504 cannot receive, or transmit, (e.g., does not support reception, or transmission, of) two time and frequency overlapping PXSCHs, with combined rank above a certain threshold value, the pre-grant DCI 560 and/or the pre-grant DCI 570 may include a slot index (in the form of K0/K2), a SLIV for the PXSCH, an FDRA, and a rank (or antenna port assignment).

In some aspects, the pre-grant DCI 510, 520, 560, and/or 570 may also provide additional information to help the UE 504 determine how to resolve a collision if detected. In some aspects, there may be benefits to choosing one pre-grant DCI (e.g., for a PXSCH communication such as pre-grant DCI 520) over another conflicting pre-grant DCI (e.g., pre-grant DCI 510). In some aspects, the pre-grant DCI may include additional information regarding one or more of a payload size, a priority, a delay bound, a head of line (e.g., a sequence number), or other relevant information for a communication associated with a pre-grant DCI for the UE to use in selecting which pre-grant DCI to accept. For example, if a first pre-grant DCI (e.g., pre-grant DCI 520) is associated with a PXSCH having a larger payload (or otherwise requiring more resources in time and/or frequency) than a second pre-grant DCI (e.g., pre-grant DCI 510), it may be better to select the first pre-grant DCI as it may be easier to reschedule resources for the smaller payload. In some aspects providing payload size information, the pre-grant DCI may provide information regarding a SLIV, an FDRA, a rank, and a modulation and coding scheme (MCS) used to compute a TB size associated with the payload size. Additionally, or alternatively, in some aspects, it may be better to accept a pre-grant DCI for a communication with a higher priority or with a smaller delay bound (e.g., a shorter time to expiration or remaining packet delay budget). In some aspects, the head of line (or sequence number may also, or alternatively, be used to determine which pre-grant DCI to accept, e.g., a first communication in a sequence may take precedence over subsequent communications.

Based on the type of information included in the pre-grant DCI, the pre-grant DCI may use a same DCI format as other grants (e.g., a DCI Format 0_0, Format 0_1, Format 1_0, or Format 1_2) or a different (pre-grant) DCI format. In some aspects, the DCI format for grants and pre-grants may use reserved bits to indicated the additional information for the pre-grant (e.g., resources for the feedback, a delay bound, or a sequence number, where payload and priority may already be indicated in the DCI format). Additionally, when using a DCI format for grants and pre-grants, the pre-grant DCI may be indicated to be a pre-grant DCI instead of a grant DCI by one of a plurality of methods discussed below. In some aspects, a default configuration (or a set of selectable/indexed configurations or values) for feedback resources (or other characteristics) may be negotiated and/or configured previously, e.g., via RRC messages, and be associated with (or indicated in) a subsequent DCI identified to be a pre-grant DCI for PXSCH resources. One or more new, different formats for a pre-grant DCI, in some aspects, may be defined and/or selected based on the type of information (e.g., one or more of the types of information or specific information discussed above) identified for inclusion in the pre-grant DCI (e.g., for a pre-grant DCI format generally, or selected from a plurality of options for a particular pre-grant DCI).

A pre-grant DCI format, e.g., that is different from a grant DCI format, in some aspects, may be identified based on a new/different radio network temporary identifier (RNTI) used to mask/scramble the pre-grant DCI or by information (e.g., in a pre-defined field or in a reserved bit) included in the pre-grant DCI. For example, a pre-grant DCI format, in some aspects, may have a different length than a grant DCI format and may be associated with different resources (e.g., for blind decoding) than a grant DCI format. In some aspects, a pre-grant DCI format may use a same RNTI as, or a different RNTI than, a grant DCI format. A pre-grant DCI format, in some aspects, may be associated with a same set of resources as a grant DCI format and may be zero-padded to match a grant DCI format length (e.g., a DCI Format 0_0, Format 0_1, Format 1_0, or Format 1_2) and may use a new RNTI or a different RNTI than the grant DCI format such that a blind decoding for the grant DCI format (and a descrambling based on the new/different RNTI) may be used to detect a pre-grant DCI using the pre-grant-specific DCI format. A pre-grant DCI format, in some aspects, may use a format similar to a grant DCI format (e.g., with padded zeros to match the length) but may use one of a set of combinations of values for different fields that indicate that it is a pre-grant DCI instead of a grant DCI using a similar format. For example, a pre-grant DCI not using an FDRA for conflict/collision detection may use a particular value (e.g., a null value or empty grant) in the FDRA field, or a special combination of values in a set of fields (e.g., one or more values for HARQ ID, redundancy version identifier (RVID), new data indicator (NDI), MCS, etc.) may be used to indicate that the DCI is a pre-grant DCI format instead of a grant DCI format.

Diagrams 500 and 550 illustrate successful collision avoidance using the single-DCI and two-DCI formats, respectively. For example, diagram 500 illustrates that based on receiving the pre-grant DCI 510 associated with PXXCH$_1$ (e.g., PXXCH resources 515) and the pre-grant DCI 520 associated with PXXCH$_2$ (e.g., PXXCH resources 525), the UE 504 may transmit a NACK via feedback resource 530 rejecting the pre-grant DCI 510 and may transmit an ACK via feedback resource 540 accepting the pre-grant DCI 520. Accordingly, the TRP0 502 (or the UE 504) may cancel the transmission associated with PXXCH$_1$ while the TRP1 506 (or the UE 504) may transmit the transmission associated with the PXXCH$_2$ resulting in the communication associated with PXXCH$_2$ (e.g., via PXXCH resources 535 that are the same PXXCH resources 525).

In some aspects, the feedback resource 530 or the feedback resource 540 may be configured to include an indication of a detected conflict/collision as well as one or more of a reason for the conflict/collision and/or a suggestion for resolving the conflict/collision. For example, a feedback resource may be configured with a set of bits for indicating that (1) no conflict/collision was detected and/or identified and (2) a conflict/collision was detected and/or identified and the type of resources involved in the conflict/collision (e.g., an indicated set of PXXCH resources and one or more of an additional set of PDSCH resources, a set of PDCCH resources, a set of PUSCH resources, or a set of PUCCH resources). Based on detecting a conflict, a UE may provide additional information for conflict/collision resolution, e.g., an increased, or new, K1 value (e.g., for a PDSCH pre-grant) or a new K2 value (e.g., for a PUSCH pre-grant).

In some aspects, the collisions in diagram 500 and 550 are successfully avoided because the pre-grant DCI 510 and pre-grant DCI 520 (or the pre-grant DCI 560 and the pre-grant DCI 570) are both pre-grant DCIs and are received with sufficient time for the UE 504 to determine whether both pre-grant DCIs can be accepted or whether there is a conflict/collision between the resources associated with the pre-grant DCIs and, in the case of conflicting/colliding resources, which pre-grant DCI to accept and/or reject. In some aspects, UE 504 may determine whether to accept a pre-grant based on information received at least a time N1' before transmitting feedback via an indicated feedback resource. For example, the processing of pre-grant DCI 510 at the UE 504 may take at least a time N1' and the value K1' included in pre-grant DCI 510 may be configured to indicate a time offset greater than N1'. In some aspects, N1' may be shorter than a corresponding time N1 for processing a resource grant before receiving and/or transmitting a communication via the granted resources.

In diagram 500, for example, because both pre-grant DCI 510 and pre-grant DCI 520 are received more than a time N1' before the feedback resource 530, the UE 504 determines to reject the pre-grant DCI 510 and to accept the pre-grant DCI 520 and transmits a NACK via feedback resource 530 and an ACK via feedback resource 540 despite pre-grant DCI 510 being received earlier. This rejection of the earlier-received pre-grant DCI, in some aspects, is possible because both were received in time to be considered in responding to the pre-grant DCI 510 via feedback resource 530. In diagram 500, for example, the UE 504 determines to reject the pre-grant DCI 510 and to accept the pre-grant DCI 520 despite pre-grant DCI 510 being received earlier because both were received in time to be considered in responding to the pre-grant DCI 510 via feedback resource 530.

However, in diagram 550 illustrating a two-DCI format for the pre-grant signaling, because pre-grant DCI 570 associated with PXXCH$_2$ (e.g., PXXCH resources 575) is received less than a time N1' before the feedback resource 580, the UE 504 may determine to accept the pre-grant DCI 560 associated with PXXCH$_1$ (e.g., PXXCH resources 565) (and transmit an ACK via feedback resources 580 and receive a grant DCI 563) based on no detected conflict/collision. For the pre-grant DCI 570, the UE 504 may determine that there is a conflict/collision with the resources indicated in the accepted pre-grant DCI 560 and may reject the pre-grant DCI 570 (and transmit a NACK via feedback resources 590) based on the detected conflict/collision. Accordingly, the TRP1 506 (or the UE 504) may cancel the transmission associated with PXXCH$_2$ (e.g., PXXCH resources 575) while the TRP0 502 (or the UE 504) may transmit the grant DCI 563 for the transmission associated with the PXXCH$_1$ (e.g., PXXCH resources 565) resulting in the communication associated with PXXCH$_1$ (e.g., PXXCH resources 585). The grant DCI 563, in some aspects, may include at least the information not included in the pre-grant DCI 560 using a new DCI format or using a known DCI format (e.g., Format 0_0, Format 0_1, Format 1_0, or Format 1_2).

While the UE 504 may have determined to accept the pre-grant DCI 570 over the pre-grant DCI 560 had they both arrived in time (more than a time N1' before the feedback resource 580), the UE 504 has avoided the waste of resources associated with a conflict/collision. Although the above examples (both pre-grant DCIs arriving before the time N1' in diagram 500 or one pre-grant DCI arriving after the time N1' in diagram 550) were illustrated in only one of the single-DCI format or the two-DCI format for the pre-grant signaling, each example is similarly applicable to the other format. Accordingly, FIGS. 4A and 4B illustrate that without the use of a pre-grant DCI, conflicts/collisions between communications and/or resource grants may occur for two independent TRPs and FIG. 5 illustrates that conflicts/collisions may be avoided when using a pre-grant DCI.

Figure 6:
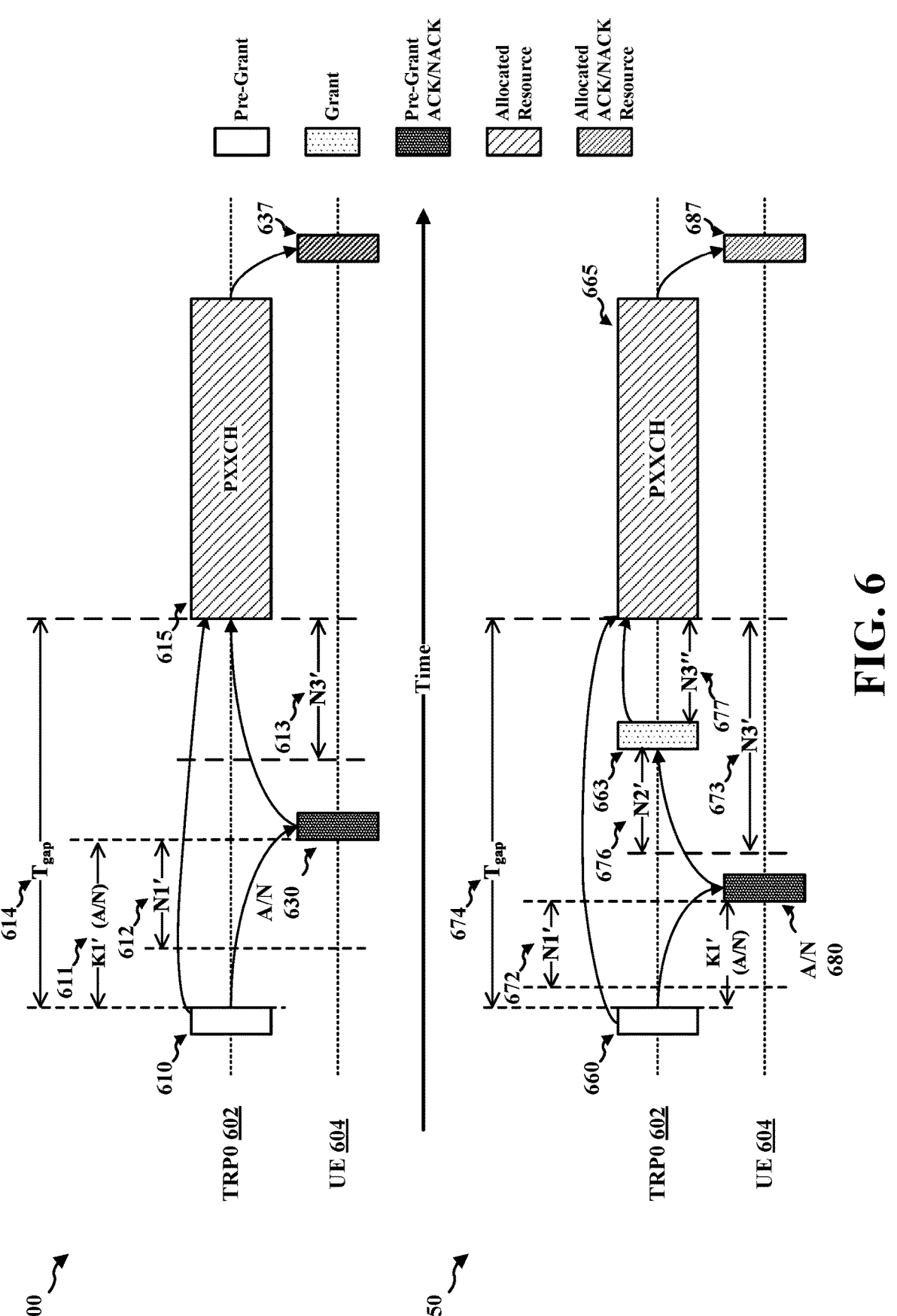
FIG. 6 is a set of diagrams illustrating a set of considerations relating to the timing of messages associated with a pre-grant DCI for a single-DCI format, and for a two-DCI format, for a pre-grant signaling in accordance with some aspects of the disclosure.

FIG. 6 is a set of diagrams 600 and 650 illustrating a set of considerations relating to the timing of messages associated with a pre-grant DCI for a single-DCI format, and for a two-DCI format, for a pre-grant signaling in accordance with some aspects of the disclosure. Diagrams 600 and 650 are illustrated using a first TRP, the TRP0 602, transmitting a pre-grant DCI and a UE 604 receiving the pre-grant DCI and transmitting an associated feedback (e.g., an ACK or NACK). Diagram 600 illustrates that, in some aspects using a single-DCI format for pre-grant signaling, a pre-grant DCI 610 indicates a feedback resource 630 using a value K1' 611 (e.g., a value indicating a number of slots separating the slot including the pre-grant DCI 610 and the slot including the feedback resource 630). The value K1' 611, in some aspects, may be configured to indicate an offset greater than a time N1' 612 that may be related to a time for the UE 604 to process the pre-grant DCI 610 (e.g., to decode the pre-grant DCI 610 and to determine whether to accept or reject the pre-grant DCI 610) and generate feedback for transmission (e.g., via feedback resource 630). After receiving the pre-grant DCI 610, the UE 604 may process the pre-grant DCI 610 and transmit feedback (e.g., an ACK or NACK) via the feedback resource 630.

In some aspects for which the PXXCH is a PUSCH, the feedback resource 630 may be configured to precede the resources (e.g., PXXCH resources 615) indicated in the pre-grant DCI 610 by at least a time N3' 613. The time N3' 613 may be based on a time after determining to accept the pre-grant DCI 610 and/or transmitting the feedback (e.g., an ACK/NACK, or an absence of feedback) for the UE 604 to prepare the communication associated with the PUSCH resources 615. The time N3' 613, in some aspects, may be based on a processing speed of the UE 604. In some aspects, the time N3' 613 may further be based on a minimum offset between transmitting the feedback via feedback resource 630 and the beginning of the PUSCH resources 615 based on a minimum time for the TRP0 602 to decode the feedback received via the feedback resource 630 and re-schedule the resource (if pre-grant DCI 610 is rejected) for an UL or DL communication with another UE. If the time N3' 613 is based on an expected minimum offset associated with the TRP0 602, in some aspects, the TRP0 602 may indicate a value for the minimum offset (e.g., an index into an indexed list, a minimum number of symbols, etc.) to the UE 604 before the transmission of the pre-grant DCI 610 (e.g., in an RRC configuration message during an initial configuration). Accordingly, the overall timeline for the pre-grant DCI, and specifically a $T_{gap}$ 614 between the end of the pre-grant DCI 610 and the beginning of the PUSCH resources 615, in some aspects, may be configured to allow for all the processing times and minimum offsets associated with the pre-grant DCI 610. In some aspects, the pre-grant for a PUSCH may be transmitted N13 symbols prior to the first symbol of the PUSCH, where N13≥N1'+N3'. In some aspects, N13 may be defined based on being larger than N1', e.g., N13≥N1'.

In some aspects for which the PXXCH is a PDSCH, the feedback resource 630 is configured to precede the resources (e.g., PXXCH resources 615) indicated in the pre-grant DCI 610 by at least a time N3' 613. The time N3' 613 may be based on a time after receiving the feedback (e.g., an ACK/NACK, or an absence of feedback) for the TRP0 602 to process (and/or interpret) the feedback and prepare the communication associated with the PXXCH resources 615. The time N3' 613, in some aspects, may be based on a processing speed of a network entity (e.g., a base station, or network node) associated with TRP0 602. In some aspects, the time N3' 613 may further be based on a minimum offset between transmitting the feedback via feedback resource 630 and the beginning of the PXXCH resources 615 for receiving a PXXCH communication expected by, and/or depending on, the UE 604. If the time N3' 613 is based on an expected minimum offset associated with the UE 604, in some aspects, the UE 604 may indicate a value for the minimum offset (e.g., an index into an indexed list, a minimum number of symbols, etc.) to the TRP0 602 before the transmission of the pre-grant DCI 610 (e.g., in an RRC configuration message during an initial configuration). Accordingly, the overall timeline for the pre-grant DCI, and specifically a $T_{gap}$ 614 between the end of the pre-grant DCI 610 and the beginning of the PXXCH resources 615, in some aspects, may be configured to allow for all the processing times and minimum offsets associated with the pre-grant DCI 610. In some aspects, a timeline between the PXXCH resources 615 and the associated feedback resources 637 (e.g., for PDSCH resources) may be unaffected by the use of a pre-grant DCI signaling format. In some aspects, the pre-grant for a PXXCH may be transmitted N13 symbols prior to the first symbol of the PXXCH, where N13≥N1'+N3'. In some aspects, N13 may be defined based on being larger than N1', e.g., N13≥N1'.

Diagram 650 illustrates that, in some aspects using a two-DCI format for pre-grant signaling, a pre-grant DCI 660 indicates a feedback resource 680 using a value K1' 671 (e.g., a value indicating a number of slots separating the slot including the pre-grant DCI 660 and the slot including feedback resource 680). The value K1' 671, in some aspects, may be configured to indicate an offset greater than a time N1' 672 that may be related to a time for the UE 604 to process the pre-grant DCI 660 (e.g., to decode the pre-grant DCI 660 and to determine whether to accept or reject the pre-grant DCI 660) and generate feedback for transmission (e.g., via feedback resource 680). After receiving the pre-grant DCI 660, the UE 604 may process the pre-grant DCI 660 and transmit feedback (e.g., an ACK or NACK) via the feedback resource 680.

In some aspects for which the PXXCH is a PUSCH, the feedback resource 680 is configured to precede the resources (e.g., PXXCH resources 665) indicated in the pre-grant DCI 660 by at least a time N3' 673. The time N3' 673 may be based on a time after determining to accept the pre-grant DCI 660 and/or transmitting the feedback (e.g., an ACK/NACK, or an absence of feedback) for the UE 604 to prepare the communication associated with the PUSCH resources 665. The time N3' 673, in some aspects, may be based on a processing speed of the UE 604. In some aspects, the time N3' 673 (and the time N3" 677) may further be based on a minimum offset between transmitting the feedback via feedback resource 680 and the beginning of the PUSCH resources 665 based on a minimum time for the TRP0 602 to decode the feedback received via the feedback resource 680 and re-schedule the resource (if pre-grant DCI 660 is rejected) for an UL or DL communication with another UE. If the time N3' 673 (and/or the time N3" 677) is based on an expected minimum offset associated with the TRP0 602, in some aspects, the TRP0 602 may indicate a value for the minimum offset (e.g., an index into an indexed list, a minimum number of symbols, etc.) to the UE 604 before the transmission of the pre-grant DCI 660 (e.g., in an RRC configuration message during an initial configuration). Accordingly, the overall timeline for the pre-grant DCI, and specifically a $T_{gap}$ 674 between the end of the pre-grant DCI 660 and the beginning of the PUSCH resources 665, in some aspects, may be configured to allow for all the processing times and minimum offsets associated with the pre-grant DCI 660.

In some aspects, the feedback resource 680 is configured to precede the resources (e.g., PXXCH resources 665) indicated in the pre-grant DCI 660 by at least a time N3' 673. The time N3'673 may be based on a (minimum) time after receiving the feedback (e.g., an ACK/NACK, or an absence of feedback) for the TRP0 602 to process (and/or interpret) the feedback and transmit a grant DCI 663 (e.g., a time N2' 676). The time N3'673, in some aspects, may further be based on a (minimum) time (e.g., a time N3" 677) for the TRP0 602 to prepare the communication associated with the PXXCH resources 665 after transmitting the grant DCI 663 (or after receiving the feedback via feedback resources 680). The time N3' 673 (and the time N3" 677), in some aspects, may be based on a processing speed of a network entity (e.g., a base station, or network node) associated with TRP0 602. In some aspects, the time N3' 673 (and the time N3" 677) may further be based on a minimum offset between receiving the grant DCI 663 (or transmitting the feedback via feedback resource 680) and the beginning of the PXXCH resources 665 for receiving a PXXCH communication expected by, and/or depending on, the UE 604. If the time N3' 673 (and/or the time N3" 677) is based on an expected minimum offset associated with the UE 604, in some aspects, the UE 604 may indicate a value for the minimum offset (e.g., an index into an indexed list, a minimum number of symbols, etc.) to the TRP0 602 before the transmission of the pre-grant DCI 660 (e.g., in an RRC configuration message during an initial configuration). Accordingly, the overall timeline for the pre-grant DCI, and specifically a $T_{gap}$ 674 between the end of the pre-grant DCI 660 and the beginning of the PXXCH resources 665, in some aspects, may be configured to allow for all the processing times and minimum offsets associated with the pre-grant DCI 660. In some aspects, a timeline between the PXXCH resources 665 and the associated feedback resources 687 (e.g., for PDSCH resources) may be unaffected by the use of a pre-grant DCI signaling format.

Figure 7:
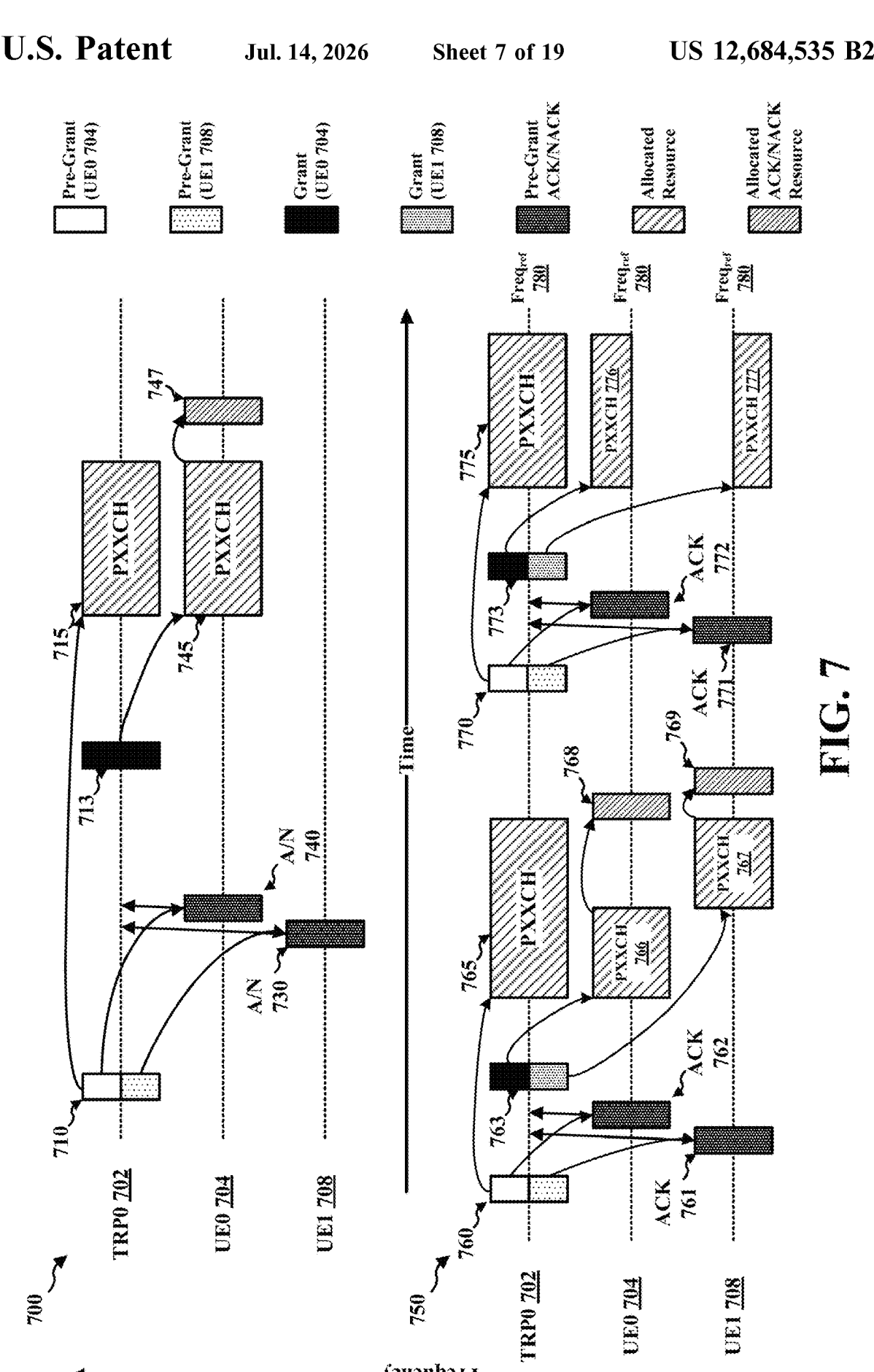
FIG. 7 is a set of diagrams illustrating a TRP using a two-DCI pre-grant signaling format using over-provisioning in accordance with some aspects of the disclosure.

FIG. 7 is a set of diagrams 700 and 750 illustrating a TRP using a two-DCI pre-grant signaling format using over-provisioning in accordance with some aspects of the disclosure. Diagram 700 illustrates that a first TRP, e.g., the TRP0 702, may transmit a pre-grant DCI 710 to a plurality of UEs (e.g., a first UE, e.g., the UE0 704, and a second UE, e.g., the UE1 708) indicating a same set of resources for a PXXCH communication (e.g., PXXCH resources 715). In some aspects, the pre-grant DCI 710 may be a common pre-grant DCI (e.g., associated with a particular RNTI or including information indicating that the pre-grant applies to a group of UEs including the UE0 704 and the UE1 708). The pre-grant DCI 710, in some aspects, may represent a plurality of pre-grant DCIs transmitted during a first time period as separate pre-grant DCIs (e.g., at different times). For example, to transmit the pre-grant DCI 710, the TRP0 702 may transmit a plurality of pre-grant DCIs indicating the same PXXCH resources 715 and different feedback resources for the pre-grant DCI (e.g., feedback resources 730 or feedback resources 740). The indicated PXXCH resources 715, in some aspects, may be associated with a first type of over-provisioning for which the indicated PXXCH resources 715 are over-provisioned in the sense that the same set of PXXCH resources are the subject of multiple pre-grants to multiple UEs despite being ultimately assignable to one UE. Using this first type of over-provisioning, the TRP0 702 may avoid wasting resources (e.g., PXXCH resources 715) associated with a rejected pre-grant. For example, a pre-grant DCI (e.g., pre-grant DCI 710 transmitted to the UE0 704) may be rejected by a first UE (e.g., the UE0 704) and there may not be enough time to transmit an additional pre-grant DCI to another UE (e.g., UE1 708) for those resources such that the resources are not used for any communication.

Based on the pre-grant DCI 710, the UE0 704 and the UE1 708 may determine whether to accept the pre-grant DCI 710. Based on the determination, the UE1 708 may transmit one of an ACK or NACK indicating one of an acceptance or rejection of the pre-grant DCI 710 via the feedback resources 730. Similarly, the UE0 704 may, based on the determination, transmit one of an ACK or NACK indicating one of an acceptance or rejection of the pre-grant DCI 710 via the feedback resources 740. In some aspects, both the UE1 708 and the UE0 704 may transmit an acceptance of the pre-grant DCI 710 and the TRP0 702 may determine which UE to grant the PXXCH resources 715 (and to which UE to transmit, or from which UE to receive, a PXXCH communication via the PXXCH resources 715). Accordingly, the TRP0 702 may transmit a grant DCI 713 to UE0 704 granting PXXCH resources 745 (e.g., the same resources as PXXCH resources 715) for a PXXCH communication and granting resources 747 for providing feedback relating to PXXCH resources 745 (for a PDSCH communication). The TRP0 702 may not transmit, and UE1 708 may not receive, a grant DCI despite indicating an acceptance of the pre-grant DCI 710.

In some aspects, based on the determination, the UE1 708 may transmit one of an ACK or NACK indicating a rejection of the pre-grant DCI 710 via the feedback resources 730 and the UE0 704 may, based on the determination, transmit one of an ACK or NACK indicating an acceptance of the pre-grant DCI 710 via the feedback resources 740. Accordingly, the TRP0 702 may transmit the grant DCI 713 to UE0 704 granting PXXCH resources 745 for a PXXCH communication and granting resources 747 for providing feedback relating to PXXCH resources 745 (e.g., for a PDSCH communication). The TRP0 702 may not transmit, and UE1 708 may not receive, a grant DCI based on indicating the rejection of the pre-grant DCI 710.

Diagram 750 illustrates that the first TRP, e.g., the TRP0 702, may transmit a pre-grant DCI 760 to a plurality of UEs (e.g., the first UE, e.g., the UE0 704, and the second UE, e.g., the UE1 708) indicating a same set of resources for a PXXCH communication (e.g., PXXCH resources 765). In some aspects, the pre-grant DCI 760 may be a common pre-grant DCI (e.g., associated with the particular RNTI or including information indicating that the pre-grant applies to a group of UEs including the UE0 704 and the UE1 708). The pre-grant DCI 760, in some aspects, may represent a plurality of pre-grant DCIs transmitted during a first time period as separate pre-grant DCIs (e.g., at different times). For example, to transmit the pre-grant DCI 760, the TRP0 702 may transmit a plurality of pre-grant DCIs indicating the same PXXCH resources 765 and different feedback resources for the pre-grant DCI (e.g., feedback resources 761 or feedback resources 762). The indicated PXXCH resources 765, in some aspects, may be associated with a second type of over-provisioning for which the indicated PXXCH resources 765 are over-provisioned in the sense that the indicated PXXCH resources 765 may include more resources than will ultimately be granted to any particular UE in the plurality of UEs that received the pre-grant DCI 760.

For example, both the UE0 704 and the UE1 708 may determine to transmit, and transmit, one of an ACK or NACK indicating an acceptance of the pre-grant DCI 760 via the feedback resources 762 and the feedback resource 761, respectively. Based on both the UE0 704 and the UE1 708 transmitting an acceptance of the pre-grant DCI 760, the TRP0 702 may determine to grant separate subsets (e.g., PXXCH resource subset 766 and PXXCH resource subset 767) of the PXXCH resources 765 to each of the UE0 704 and the UE1 708. Accordingly, the TRP0 702 may transmit a set of grant DCIs 763 to UE0 704 and UE1 708 granting PXXCH resource subset 766 and PXXCH resource subset 767 for PXXCH communications with the UE0 704 and the UE1 708, respectively. The PXXCH resource subset 766, in some aspects, may exclude the PXXCH resource subset 767. The set of grant DCIs 763 may, for a PDSCH communication, further grant feedback resources 768 and feedback resources 769 for providing feedback relating to PXXCH (e.g., PDSCH) resource subset 766 and PXXCH (e.g., PDSCH) resource subset 767, respectively. In some aspects, the PXXCH resource subset 766 and the PXXCH resource subset 767 may each occupy a non-overlapping subset of temporal resources across a set of frequencies associated with the PXXCH resources 765 (wherein the set of frequencies is a range of frequencies centered around a first frequency, e.g., Freq$_{ref}$ 780).

Diagram 750 illustrates that the first TRP, e.g., the TRP0 702, may transmit a pre-grant DCI 770 to a plurality of UEs (e.g., the first UE, e.g., the UE0 704, and the second UE, e.g., the UE1 708) indicating a same set of resources for a PXXCH communication (e.g., PXXCH resources 775). In some aspects, the pre-grant DCI 770 may be a common pre-grant DCI (e.g., associated with the particular RNTI or including information indicating that the pre-grant applies to a group of UEs including the UE0 704 and the UE1 708). The pre-grant DCI 770, in some aspects, may represent a plurality of pre-grant DCIs transmitted during a first time period as separate pre-grant DCIs (e.g., at different times). For example, to transmit the pre-grant DCI 770, the TRP0 702 may transmit a plurality of pre-grant DCIs indicating the same PXXCH resources 775 and different feedback resources for the pre-grant DCI (e.g., feedback resources 771 or feedback resources 772). The indicated PXXCH resources 775, in some aspects, may be associated with the second type of over-provisioning for which the indicated PXXCH resources 765 are over-provisioned in the sense that the indicated PXXCH resources 775 may include more resources than will ultimately be granted to any particular UE in the plurality of UEs that received the pre-grant DCI 770.

For example, both the UE0 704 and the UE1 708 may determine to transmit, and transmit, one of an ACK or NACK indicating an acceptance of the pre-grant DCI 770 via the feedback resources 772 and the feedback resource 771, respectively. Based on both the UE0 704 and the UE1 708 transmitting an acceptance of the pre-grant DCI 770, the TRP0 702 may determine to grant separate subsets (e.g., PXXCH resource subset 776 and PXXCH resource subset 777) of the PXXCH resources 775 to each of the UE0 704 and the UE1 708. Accordingly, the TRP0 702 may transmit a set of grant DCIs 773 to UE0 704 and UE1 708 granting PXXCH resource subset 776 and PXXCH resource subset 777 for PXXCH communications with the UE0 704 and the UE1 708, respectively. The set of grant DCIs 773 may further grant feedback resources (not shown) similar to feedback resources 768 and feedback resources 769 for providing feedback relating to PXXCH (e.g., PDSCH)

resource subset 776 and PXXCH (e.g., PDSCH) resource subset 777, respectively. In some aspects, the PXXCH resource subset 776 and the PXXCH resource subset 777 may each occupy a non-overlapping subset of frequency resources and across overlapping temporal resources associated with the PXXCH resources 775.

While diagram 750 is illustrated in terms of transmitting pre-grant DCIs for two UEs and two communications (e.g., a set of PXXCH resources including two independent subsets of PXXCH resources), the (over-provisioned) pre-grant DCI may be transmitted to a larger number of UEs to make it more likely that at least a number of UEs equal to the number of communications will accept the pre-grant so that no communication resources are unused and/or wasted. Additionally, or alternatively, the indicated PXXCH resources may include a larger number of resource subsets for a correspondingly larger number of communications. The number of UEs receiving a pre-grant DCI for a same set of PXXCH resources, in some aspects, may be larger than the number of resource subsets (or the corresponding number of communications) to allow for some UEs to reject the (over-provisioned) pre-grant DCI while being able to grant the number of resource subsets for the corresponding number of communications (e.g., not wasting resources based on rejected pre-grants). In some aspects, the use of larger sets of indicated PXXCH resources may allow for a larger number of concurrently scheduled communications with the tradeoff that conflicts/collisions may be detected and/or identified based on the larger sets of indicated PXXCH resources even if no conflict/collision would result, or be detected, based on an indication of a smaller set of indicated PXXCH resources (e.g., associated with a smaller number of resource and/or a smaller number of communications).

Figure 8:
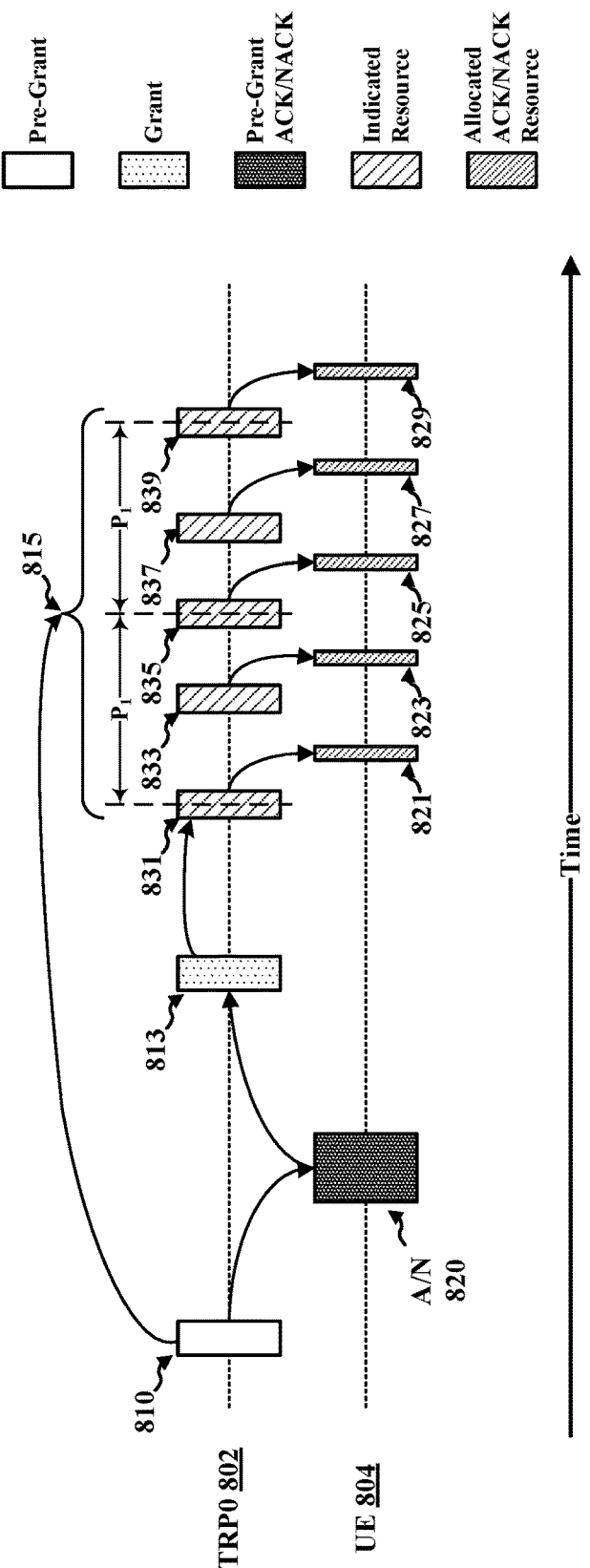
FIG. 8 is a diagram illustrating a pre-grant DCI associated with potential grants and/or reservations for multiple transmissions in accordance with some aspects of the disclosure.

FIG. 8 is a diagram 800 illustrating a pre-grant DCI associated with potential grants and/or reservations for multiple transmissions in accordance with some aspects of the disclosure. In some aspects, a first TRP, the TRP0 802, may transmit, and a UE 804 may receive, a multi-resource pre-grant DCI 810 indicating a pre-grant or reservation for multiple transmissions, which may be referred to as multiple resources, in a set of resources 815. For example, the multi-resource pre-grant DCI 810 may indicate the set of resources 815, e.g., a set of resources including one or more of a first resource 831, a second resource 833, a third resource 835, a fourth resource 837, and a fifth resource 839 for a PXSCH communication and, for a PDSCH, a corresponding one or more of a first feedback resource 821, a second feedback resource 823, a third feedback resource 825, a fourth feedback resource 827, and a fifth feedback resource 829. In some aspects, the set of resources 815 may include the first resource 831, the third resource 835, and the fifth resource 839 which may be occasions of a periodic set of resources with a period P1 (e.g., associated with a first configured set of periodic resources or with a second configured set of semi-persistent scheduled resources). The set of resources 815, in some aspects, may additionally, or alternatively, include the second resource 833 and/or the fourth resource 837 not associated with the periodic set of resources. In some aspects, the multi-resource pre-grant DCI 810 may be associated with a single-DCI pre-grant signaling format or a two-DCI pre-grant signaling format (e.g., including a grant DCI 813 granting one or more of the resources 831-839 based on at least one acceptance received via feedback resource 820).

In some aspects, the use of a single multi-resource pre-grant DCI 810 to indicate a resource reservation for multiple resources, or multiple transmissions, may provide more efficient signaling because fewer pre-grant DCIs are used to indicate the reservation. The multi-resource pre-grant DCI 810, in some aspects, may indicate, or be associated with, a feedback resource 820. The feedback resource 820, in some aspects, may be configured in a single-indication configuration to include an ACK/NACK associated with the multi-resource pre-grant DCI 810 to accept or decline the set of resources 815 indicated in the multi-resource pre-grant DCI 810 as a whole, e.g., either accepting or rejecting all of the resources (e.g., the set of resources 815) for the multiple transmissions.

In some aspects, the feedback resource 820, in some aspects, may be configured in a multi-indication configuration to include an ACK/NACK associated with each resource in the set of resources 815 associated with the multi-resource pre-grant DCI 810 to accept or decline each of the multiple resources independently (e.g., to individually accept or reject each of the first resource 831, the second resource 833, the third resource 835, the fourth resource 837, and the fifth resource 839 included in the set of resources 815). For the multi-indication configuration of the feedback resource 820, the feedback resource 820 may include a bitmap or other multi-bit indication of a set of accepted and/or rejected reservations (e.g. pre-grants). In some aspects, the feedback may be based on a configuration of a default behavior (e.g., if feedback is not received) and a meaning associated with an ACK or NACK (e.g., whether an ACK, or NACK, indicates an acceptance or a rejection) as described herein, e.g., in relation to FIG. 11 below. For a single-indication configuration for the feedback resource 820, a conflict/collision detection between TRPs, and an associated rejection, may be more likely than a complete rejection of the individual resources for a multi-indication configuration for the feedback resource 820. While the single-indication configuration may be more likely to result in a rejection of the pre-grant reservation (e.g., based on a conflict/collision identified for any one of the multiple resources) and an accompanying waste of resources, a reduced signaling overhead may offset the waste of resources for a sparsely-scheduled UE (e.g., a UE not likely to experience conflicts/collisions based on a percentage of available communication resources used by the UE).

The content of the reservation DCI (e.g., the multi-resource pre-grant DCI 810) may be similar to the pre-grant DCI discussed herein (e.g., in relation to FIGS. 5-7), with the exception that the resource reserved can be for more than one PXXCH. Other aspects of the reservation DCI format (a multi-resource pre-grant DCI format) can follow the aspects described herein for a pre-grant. For example, the multiple resource reservations can be provided in the reservation DCI by adding multiple copies of fields describing the resources to be reserved, e.g., multiple K, multiple SLIV, multiple FDRA, multiple rank, multiple MCS, among other fields. For example, the multiple fields may include one for each of the resources being reserved. The multiple resource reservations can be provided in the reservation DCI by having the same resource in multiple slots being reserved by the DCI, e.g., adding an indication for a number (X) of slots to which the same resources are being reserved along with a single K, a single SLIV, a single FDRA, a single rank, and a single MCS. The reservation DCI, in some aspects, may indicate that starting from slot K, in the next X slots, the same resource defined by the single indicated FDRA, SLIV, rank, and MCS, are being reserved. X can be absolute (e.g., over all slots), or can be counted according to a configured set of candidate slots (e.g., skipping or not counting the slots not in the configured set of candidate slots). In some aspects, the reservation DCI may provide K and X, so the reservation is in slot unit. In some aspects, if the reservation is in a unit of slots, the same reservation DCI may reserve resources for both PDSCH and PUSCH.

Figure 9:
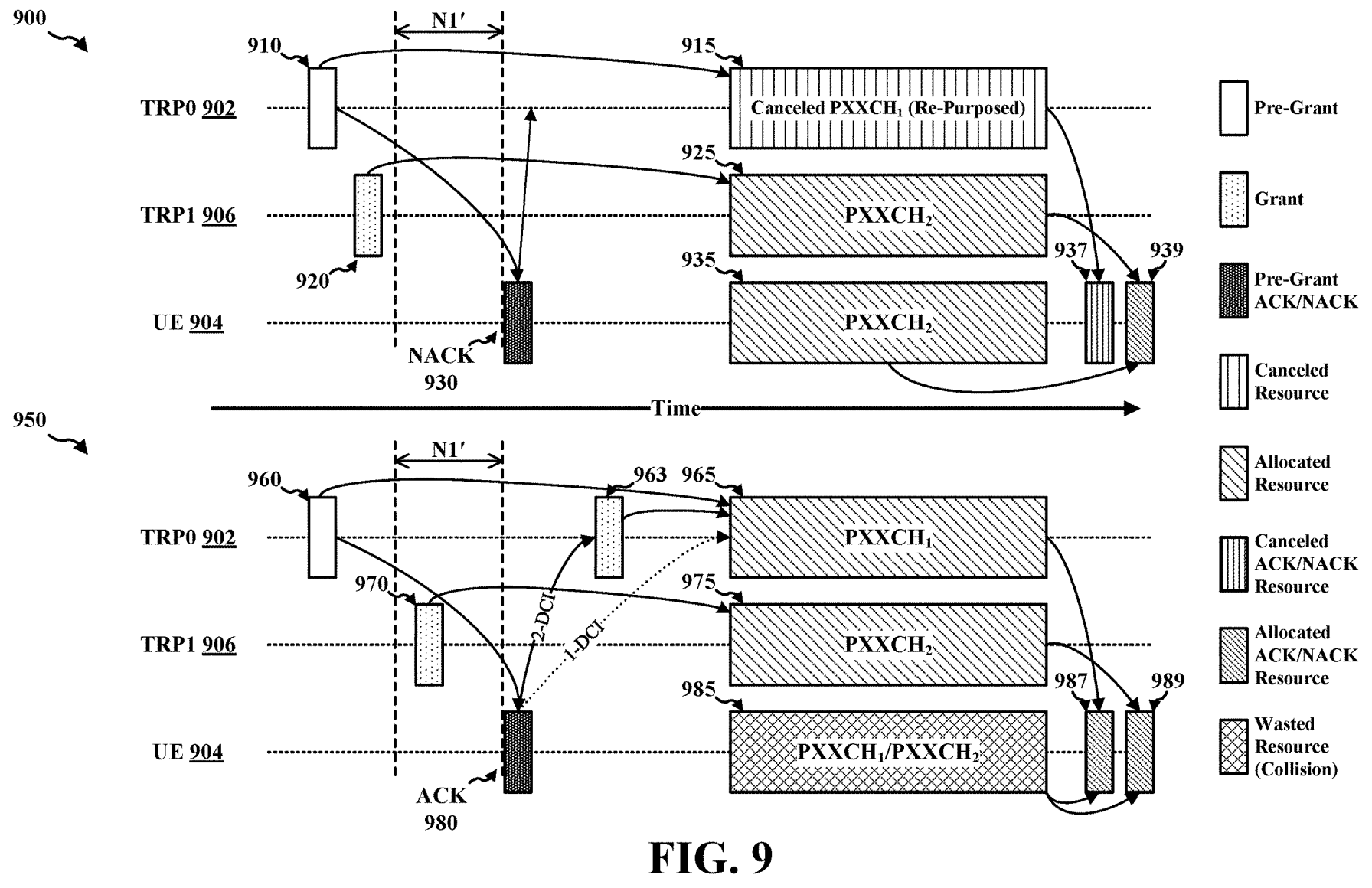

FIG. 9 is a set of diagrams 900 and 950 illustrating a successful collision avoidance and an unsuccessful collision avoidance, respectively, when a first TRP, TRP0 902, uses pre-grant signaling and a second TRP, TRP1 906, grants resources without pre-grant signaling in accordance with some aspects of the disclosure. Diagrams 900 and 950 assume a system including a first TRP, TRP0 902, a second TRP, TRP1 906, and a UE 904 in communication, or associated, with both TRP0 902 and TRP1 906. Diagram 900 illustrates that the TRP0 902 may transmit a pre-grant DCI 910 (e.g., using either a single-DCI, or a two-DCI, format) at a first time and that the TRP1 906 may transmit a grant DCI 920 (e.g., using a DCI format for a resource grant). While shown for a grant of PDSCH, each pre-grant DCI (or grant DCI) may indicate a corresponding set of resources for one of a DL or UL channel (e.g., PDSCH, PDCCH, PUCCH, or PUSCH, represented by PXXCH). As described in relation to pre-grant DCIs 510, 520, 560, and 570 of FIG. 5, the pre-grant DCI 910, in some aspects, may include all the information included in a normal DL and/or UL grant as well as additional information specific to a pre-grant, or may include a limited set of information for identifying conflicts/collisions based on the UE capabilities.

Diagram 900 illustrates a successful collision avoidance using the pre-grant DCI format. For example, diagram 900 illustrates that based on receiving the pre-grant DCI 910 and the grant DCI 920, the UE 904 may transmit NACK 930 rejecting the pre-grant DCI 910 while no feedback is provided (or configured) for grant DCI 920 as it is assumed to be accepted by TRP1 906. Accordingly, the TRP0 902 (or the UE 904) may cancel the transmission associated with PXXCH₁ 915 (and associated feedback resource 937) while TRP1 906 (or the UE 904) may transmit the transmission associated with the PXXCH₂ 925 (and receive feedback, e.g., for a PDSCH, via feedback resource 939). Accordingly, UE 904 may receive PXXCH₂ 935 without receiving the conflicting/colliding PXXCH₁ 915. As illustrated in diagram 900, the conflict/collision avoidance, in some aspects, may be based on a conflicting/colliding grant being received at least a time N1' before feedback resource associated with the pre-grant DCI 910.

Diagram 950, illustrates a failure to avoid a conflict/collision based on a grant being received less than a time N1' before the feedback resource associated with a previously-received pre-grant DCI. For example, the TRP0 902 may transmit pre-grant DCI 960 (using a single-DCI or two-DCI format) indicating resources associated with PXXCH₁ 965 and TRP1 906 may transmit a grant DCI 970 granting resources for PXXCH₂ 975 that create a conflict/collision with the resources indicated in pre-grant DCI 960. The UE 904 may determine to accept the pre-grant DCI 960 (and transmit an ACK via feedback resources 980) based on no detected conflict/collision because the UE 904 does not have sufficient time to process the grant DCI 970 and detect and/or identify the conflict/collision between the resources associated with the pre-grant DCI 960 and the resources granted by grant DCI 970 (because grant DCI 970 is received less than a time N1' before the feedback resource 980). Accordingly, TRP0 902 may transmit a grant DCI 963 (e.g., for a two-DCI pre-grant signaling format) for, or transmit (or expect), a transmission via the resources associated with PXXCH₁ 965 (shown as being the same as resources 985) and TRP1 906 may transmit (or expect) a transmission via the resources for PXXCH₂ 975 (shown as
being the same as resources 985) and the UE 904 may
experience a conflict/collision associated with the resources
985. The conflict/collision or a resulting failure to decode a
PDXCH may be communicated via feedback resource 987
or feedback resource 989. Even if, in some aspects, the UE
can accommodate one of the PXXCH transmissions/recep-
tions for one TRP (e.g., the PXXCH₁ 965 is a PDSCH and
the PXXCH₂ 975 is a PUSCH that can be omitted to allow
for reception of the PDSCH), the other TRP experiences
wasted resources that may have been allocated to a different
UE. Accordingly, FIG. 9 illustrates that if only one of a pair
of TRPs operates in a pre-grant mode (e.g., uses a pre-grant
signaling format) conflicts/collisions may not be avoided in
some instances. Accordingly, a method of cooperation and/
or coordination between TRPs may provide more robust
collision avoidance.

Figure 10:
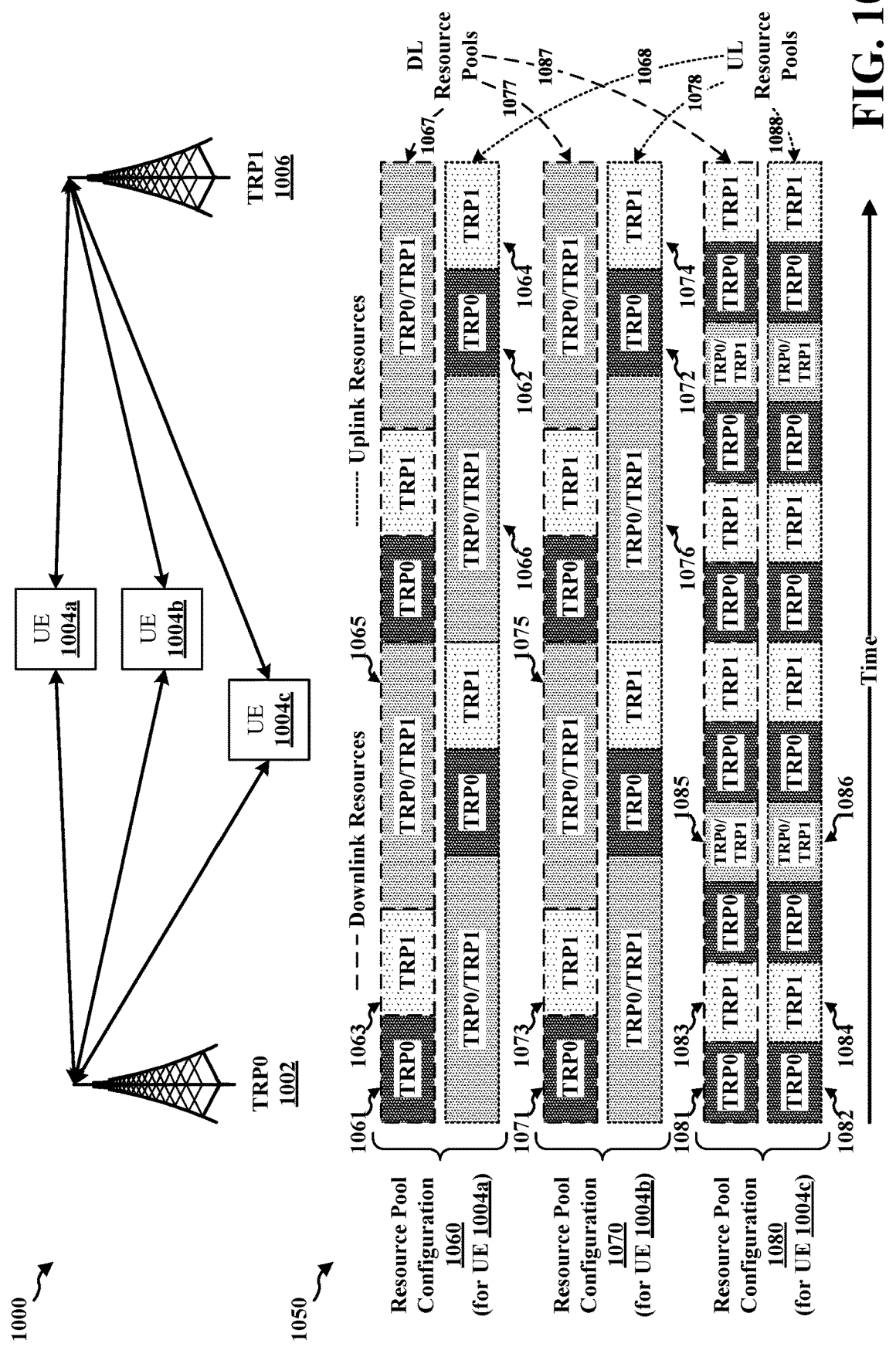
FIG. 10 is a set of diagrams illustrating a set of UE-specific resource pool allocations for a pair of TRPs and a set of UEs in accordance with some aspects of the disclosure.

FIG. 10 is a set of diagrams 1000 and 1050 illustrating a
set of UE-specific resource pool allocations for a pair of
TRPs, e.g., TRP0 1002 and TRP1 1006, and a set of UEs,
e.g., UE 1004a, UE 1004b, and UE 1004c, in accordance
with some aspects of the disclosure. Diagram 1000 illus-
trates that each of the UEs 1004a-1004c may be in com-
munication with each of TRP0 1002 and TRP1 1006. A
resource pool configuration for each UE may be negotiated
and/or configured by one of TRP0 1002, TRP1 1006, or a
network entity (not shown) in communication with TRP0
1002 and TRP1 1006.

As illustrated in diagram 1050, for each of the UEs
1004a-1004c, the network (e.g., one of TRP0 1002, TRP1
1006, or a common/shared network entity, network compo-
nent, or network device) may configure a resource pool
configuration for each of a plurality of UEs (e.g., resource
pool configuration 1060 for UE 1004a, resource pool con-
figuration 1070 for UE 1004b, and resource pool configu-
ration 1080 for UE 1004c). Each resource pool configuration
may include a first set of dedicated/separate resources asso-
ciated with a first TRP (e.g., first DL resource pool 1061, first
DL resource pool 1071, and first DL resource pool 1081 or
first UL resource pool 1062, first UL resource pool 1072, and
first UL resource pool 1082 associated with TRP0 1002) and
a second set of dedicated/separate resources associated with
a second TRP (e.g., second DL resource pool 1063, second
DL resource pool 1073, and second DL resource pool 1083
or second UL resource pool 1064, second UL resource pool
1074, and second UL resource pool 1084 associated with
TRP1 1006). Each resource pool configuration, in some
aspects, may further include a third set of shared resources
associated with both the first and second TRPs (e.g., third
DL resource pool 1065, third DL resource pool 1075, and
third DL resource pool 1085 or third UL resource pool 1066,
third UL resource pool 1076, and third UL resource pool
1086 associated with both TRP0 1002 and TRP1 1006).

Diagram 1050 further illustrates that the resource pool
configurations for different UEs may be the same (e.g.,
resource pool configuration 1060 may be the same as
resource pool configuration 1070) or different (resource pool
configuration 1060 and 1070 may be different from resource
pool configuration 1080). Additionally, a configuration of
DL resource pools (e.g., DL resource pools 1067, DL
resource pools 1077, or DL resource pools 1087) and UL
resource pools (e.g., UL resource pools 1068, UL resource
pools 1078, or UL resource pools 1088) for a particular UE
may be the same (e.g., for UE 1004c) or different (e.g., for
UEs 1004a and 1004b). The distribution of resources among
the different dedicated/separate and shared resource pools,
in some aspects, may include no resources for one or more of the resource pool types, e.g., all resources may be
associated with a shared resource pool but not with either of
the dedicated/separate resources associated with the first or
second TRPs, or no resources are associated with one of the
dedicated/separate resources associated with the first TRP,
the dedicated/separate resources associated with the second
TRP, or the shared resources associated with both the first
and second TRPs. The distribution of the resources among
the different types of resources (e.g., dedicated/separate or
shared resources) may be determined by the network based
on a current state of the TRPs and UEs. For example,
resource pool configuration 1080 may be configured to have
more dedicated/separate resources associated with TRP0
1002 than with TRP1 1006 because of a better connection
with (or because it is closer to) TRP0 1002 than with TRP1
1006 or because the network has determined that there is
more traffic associated with TRP0 1002 than with TRP1
1006.

The configuration of the resource pools, in some aspects,
may be associated with a mode of operation for each of the
TRPs. For example, for dedicated/separate resources asso-
ciated with a particular TRP, e.g., the first (or second) TRP,
the particular TRP, e.g., the first (or second) TRP, may be
configured to use a grant-DCI while the other TRP, e.g., the
second (or first) TRP, may be configured to skip (or omit)
granting resources of the dedicated/separate resources asso-
ciated with the particular TRP to avoid conflict/collision
with a grant from the particular TRP. Additionally, for shared
resources associated with both the first and second TRPs,
each TRP may be configured to use pre-grant DCI (e.g., one
of the single-DCI or two-DCI format for the pre-grant
signaling) to avoid a conflict/collision.

Figure 11:
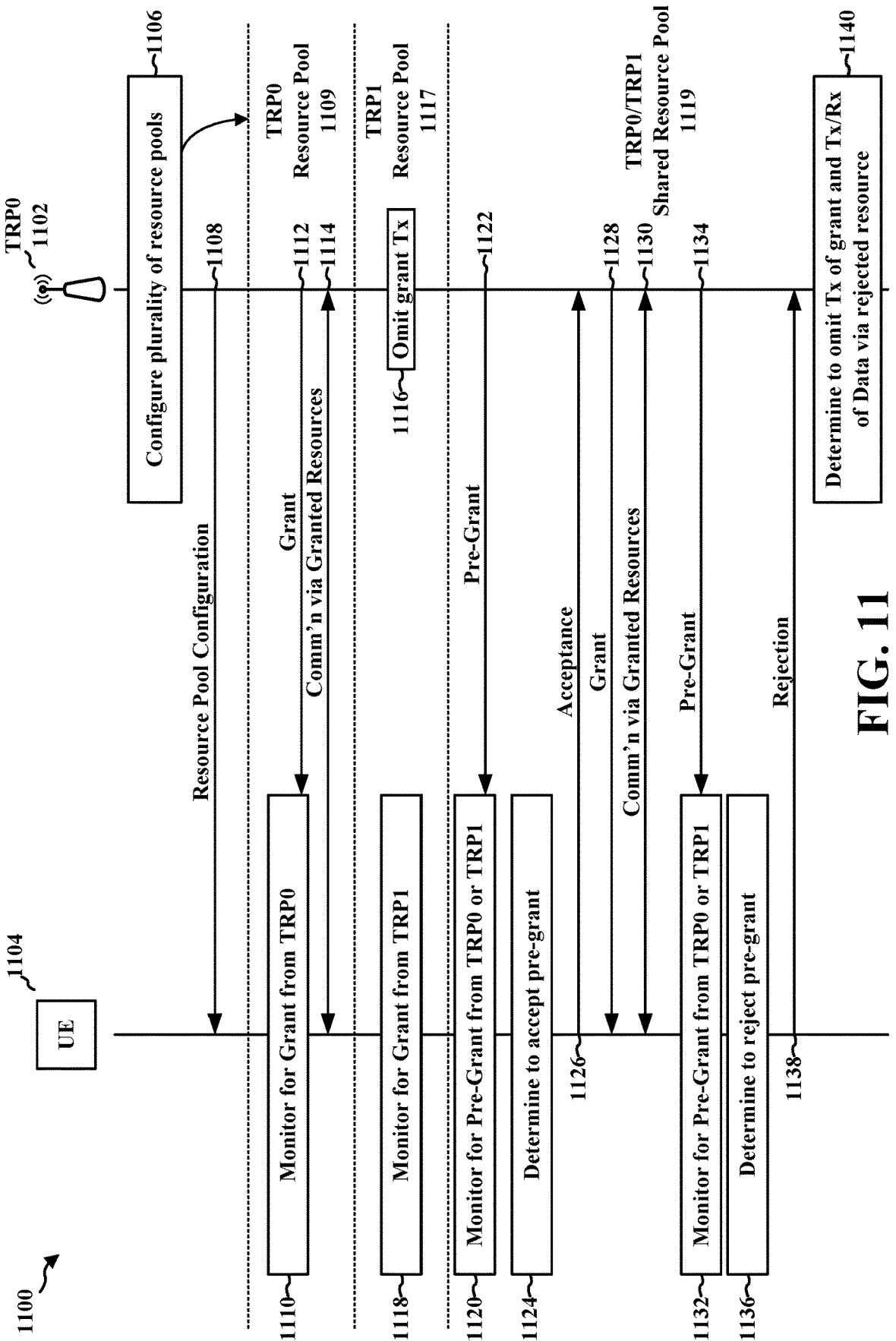
FIG. 11 is a call flow diagram of a method for configuring and using resource pools for communication between a TRP and a UE in accordance with some aspects of the disclosure.

FIG. 11 is a call flow diagram 1100 of a method for
configuring and using resource pools for communication
between a TRP, e.g., TRP0 1102, and a UE, e.g., UE 1104,
in accordance with some aspects of the disclosure. In some
aspects, TRP0 1102 may configure, at 1106, a plurality of
resource pools for UE 1104, e.g., as described in relation to
resource pool configuration 1060 for UE 1004a. The con-
figuration at 1106, in some aspects, may be triggered by a
detection by TRP0 1102 (or a related network component)
that UE 1104 is communicating with multiple TRPs. In some
aspects, the configuration at 1106 may include receiving a
configuration from one or more of another TRP in commu-
nication with UE 1104 or a network (e.g., a network com-
ponent, a network entity, a network device, etc.) that is
associated with TRP0 1102, UE 1104 and the other TRP.

TRP0 1102 may transmit, and UE 1104 may receive,
resource pool configuration 1108 indicating a first resource
pool 1109 associated with TRP0 1102, a second resource
pool 1117 associated with a second TRP (e.g., TRP1), and a
third shared resource pool 1119 associated with both TRP0
1102 and the second TRP (TRP1). In some aspects, the
resource pool configuration 1108 may indicate that an ACK
transmitted in response to a pre-grant DCI indicates no
conflict/collision (e.g., an acceptance) while a NACK indi-
cates a conflict/collision detected (e.g., a rejection, where the
pre-grant DCI associated with the conflicting/colliding
resource is selected for acceptance). In such a configuration,
a pre-grant DCI that is not received at UE may lead to no
transmission of feedback (or a NACK transmission being
included (as a filler) in a HARQ codebook) and a NACK
being identified (e.g., based on the NACK being included as
part of the HARQ codebook, or based on a default assump-
tion that no feedback be interpreted as a NACK) at the TRP
transmitting the pre-grant DCI. Based on the NACK being
identified, the TRP may cancel the grant and/or the PDSCH communication associated with the pre-grant DCI and the opportunity may be wasted if there was no actual conflict/collision (e.g., if, had the UE received the pre-grant DCI, the UE would have indicated an acceptance and/or no conflict/collision). In some aspects, based on the NACK being identified, the TRP may cancel the grant (and skip, or omit, monitoring for a UL communication from the UE) associated with the pre-grant DCI and the opportunity may be wasted if there was no actual conflict/collision (e.g., if, had the UE received the pre-grant DCI, the UE would have indicated an acceptance and/or no conflict/collision). In some aspects, the resource may be reused for another UE based on identifying a rejection from the UE that did not receive the transmitted pre-grant DCI. In some aspects, a lack of feedback may be interpreted as an ACK and the TRP may transmit a grant and/or the PDSCH communication associated with the pre-grant DCI. In some aspects, a lack of feedback may be interpreted as an ACK and the TRP may transmit a grant and/or monitor for the PUSCH communication associated with the pre-grant DCI.

In some aspects, the resource pool configuration 1108 may indicate that a NACK transmitted in response to a pre-grant DCI indicates no conflict/collision (e.g., an acceptance) while an ACK indicates a conflict/collision detected (e.g., a rejection, where the pre-grant DCI associated with the conflicting/colliding resource is selected for acceptance). In such a configuration, a pre-grant DCI that is not received at UE may lead to no transmission of feedback (or a NACK transmission being included (as a filler) in a HARQ codebook) and a NACK being identified (e.g., based on the NACK being included as part of the HARQ codebook, or based on a default assumption that no feedback be interpreted as a NACK) at the TRP transmitting the pre-grant DCI. Based on the NACK being identified, the TRP may transmit a grant (in a two-DCI pre-grant signaling format) and the PDSCH communication that may, or may not, conflict/collide with another communication that may have been identified based on the pre-grant DCI. In some aspects, based on the NACK being identified, the TRP may transmit a grant (in a two-DCI pre-grant signaling format) and/or monitor for the PUSCH communication that may, or may not, conflict/collide with another communication that may have been identified based on the pre-grant DCI. Accordingly, there may be resource waste in the case of a conflict/collision with another communication. However, if there was no conflict/collision, the UE may receive the PDSCH communication successfully. In some aspects, a lack of feedback may be interpreted as an ACK and the TRP may cancel the grant and/or the PDSCH communication associated with the pre-grant DCI and the opportunity may be wasted if there was no actual conflict/collision (e.g., if, had the UE received the pre-grant DCI, the UE would have indicated an acceptance and/or no conflict/collision). In some aspects, the resource may be reused for another UE based on canceling the PDSCH communication for the UE that did not receive a transmitted pre-grant DCI.

In some aspects, if there was no conflict/collision, the TRP may receive the PUSCH communication successfully. In some aspects, a lack of feedback may be interpreted as an ACK and the TRP may cancel the grant and/or skip, or omit, monitoring for the PUSCH communication associated with the pre-grant DCI and the opportunity may be wasted if there was no actual conflict/collision (e.g., if, had the UE received the pre-grant DCI, the UE would have indicated an acceptance and/or no conflict/collision). In some aspects, the resource may be reused for another UE based on identifying a rejection from the UE that did not receive the transmitted pre-grant DCI. The configuration of the default behavior, or assumption, may be based on whether the wasting resources (e.g., via conflicts/collisions) or wasting opportunities is determined to be of greater concern for the system (e.g., a network including at least the TRP).

In the previous examples, the feedback (e.g., an ACK or NACK) for the pre-grant DCI was able to be transmitted, e.g., there was no conflict/collision between the feedback resource and another communication. However, in some aspects, the feedback resources may conflict/collide with another communication (or a feedback resource for a different pre-grant DCI), e.g., the UE may not be capable of (e.g., may not support) simultaneous UL transmission and the feedback resource may conflict/collide with one of a PUSCH or PUCCH communication. In some aspects, the UE may not support transmission of the feedback and the conflicting/colliding communication (e.g., feedback). The UE, in some aspects, may follow a general feedback dropping rule for determining which of the conflicting/colliding communications to drop. If the feedback for a pre-grant DCI is dropped, the discussion above regarding a default assumption and behavior is applicable. In some aspects, the UE may apply one or more dropping rules specific to pre-grant feedback. For example, if omitted feedback is interpreted as, or assumed to be, a NACK (and a NACK is associated with canceling the resources and/or communication associated with the pre-grant DCI), some aspects, may assign a lower priority for the feedback (e.g., for a PUCCH carrying the ACK/NACK for a pre-grant DCI) compared to other PUCCH transmissions that might otherwise have a same priority. Additionally, or alternatively, a new rule indicating for a UE to drop a feedback (e.g., the PUCCH carrying the feedback) for a pre-grant DCI in favor of another PUCCH communication with a same priority that is not associated with a feedback for a pre-grant DCI.

The resource pool configuration 1108 may further indicate, or be associated with, the behavior of a TRP (e.g., the TRP0 1102) when receiving, from a UE (e.g., the UE 1104) a rejection (e.g., a NACK) in response to a pre-grant DCI. In some aspects, the TRP may be configured to cancel the PDSCH transmission (and associated grant DCI when using a two-DCI pre-grant signaling format). In some aspects, the TRP may be configured to skip, or omit, monitoring for the PUSCH transmission (and associated grant DCI when using a two-DCI pre-grant signaling format). The TRP may further be configured to attempt to reuse the rejected and/or canceled resource for one or more other UEs. For example, if the time remaining before the associated PDSCH resources is longer than a pre-grant timeline, e.g., based on N1'+N3' as described in relation to FIG. 6, the TRP may transmit a subsequent pre-grant DCI for the same PDSCH resources. If the time remaining before the associated PDSCH resources is shorter than a pre-grant timeline, the TRP may transmit a grant DCI to another UE (e.g., a UE operating in a grant mode instead of a pre-grant mode) to schedule a different PDSCH communication. Alternatively, or additionally, if the time remaining before the associated PUSCH resources is longer than a pre-grant timeline, e.g., based on N1'+N2' as described in relation to FIG. 6, the TRP may transmit a subsequent pre-grant DCI for the same PUSCH resources. If the time remaining before the associated PUSCH resources is shorter than a pre-grant timeline, the TRP may transmit a grant DCI to another UE (e.g., a UE operating in a grant mode instead of a pre-grant mode) to schedule a different PUSCH communication. This may avoid wasting resources at the TRP. In some aspects, the NACK may also trigger a backoff period and/or time for the rejecting UE during which the TRP may not attempt to schedule communication based on an assumption that the conflict/collision may persist during at least the backoff period. The implementation of the backoff period and/or time may depend on many local factors that may be included in the resource pool configuration 1108. In some aspects using, or including, feedback indicating a type of conflict/collision and/or a suggested remedy (e.g., an increased K1 value, new K2 value, a suggested backoff time), a specific backoff period and/or time may be based on the information included in the feedback.

Based on the resource pool configuration 1108, UE 1104 may, during a time period associated with the first resource pool 1109, monitor, at 1110, for a grant from TRP0 1102 (but not from TRP1). In some aspects, TRP0 1102 may transmit, and UE 1104 may receive, grant 1112 for a set of resources (e.g., time-and-frequency resources) in the first resource pool 1109 for a communication (e.g., a DL or UL communication). The grant 1112, in some aspects, may be transmitted via a DCI grant format (e.g., a DCI Format 0_0, Format 0_1, Format 1_0, or Format 1_2, etc.) for granting a particular type of resource or a resource for a particular type of communication. Based on the granted resources TRP0 1102 and UE 1104 may exchange communication 1114 via the granted resources. During a subsequent time period associated with the second resource pool 1117, UE 1104 may, at 1118, monitor for a grant from TRP1 (but not from TRP0 1102) and TRP0 1102 may omit, at 1116, transmitting a grant or pre-grant for, or a communication via, resources associated with the second resource pool 1117.

In some aspects, during a subsequent time period associated with the third shared resource pool 1119 associated with both TRP0 1102 and the second TRP (TRP1), UE 1104 may monitor, at 1120, for a pre-grant from both TRP0 1102 and a TRP1. TRP0 1102 may transmit, and UE 1104 may receive, a pre-grant 1122. UE 1104, in some aspects, may determine, at 1124, to accept the pre-grant 1122 and may transmit (or otherwise indicate) an acceptance 1126. The acceptance 1126, in some aspects, may be transmitted as an ACK or a NACK via a dedicated feedback resource indicated in pre-grant 1122 as described below (and in relation to, e.g., feedback resource 530 of FIG. 5 above). In some aspects, acceptance 1126 may be indicated by omitting a transmission via the dedicated feedback resource.

In some aspects, the pre-grant 1122 (or a subsequent pre-grant 1134) may be a pre-grant DCI (such as pre-grant DCI 510, pre-grant DCI 520, pre-grant DCI 560, or pre-grant DCI 570) indicating a corresponding set of resources for one of a DL or UL channel (e.g., PDSCH, PDCCH, PUCCH, PUSCH, etc.). The pre-grant 1122 (or the pre-grant 1134), in some aspects, may use a single-DCI pre-grant format including all the information included in a normal DL and/or UL grant (e.g., grant 1112) as well as additional information relating to a time offset (e.g., a value K1' similar to a K1 value between a granted resource and a corresponding feedback resource) between the pre-grant 1122 or 1134 and a feedback resource (e.g., for an acceptance 1126 of the pre-grant 1122 or a rejection 1138 of the pre-grant 1134), a priority, a total DAI, and/or a counter DAI for a corresponding feedback resource (where the total DAI and counter DAI may be associated with a type 2 HARQ codebook). The acceptance 1126 associated with the single-DCI pre-grant format, in some aspects, may indicate for TRP0 1102 to transmit and/or receive a communication 1130 (without transmitting a grant 1128).

The pre-grant 1122 and/or the pre-grant 1134, in some aspects, may use a two-DCI format including a limited set of information (e.g., less information than is included in a normal DL and/or UL grant such as the grant 1112 or a grant 1128) used to identify a conflict/collision based on the capabilities of UE 1104 and the additional information relating to the feedback resource (e.g., a value K1', a priority, a total DAI, and/or a counter DAI). For example, if UE 1104 cannot receive two PDSCHs/PUSCHs ("PXSCH") in the same slot, the pre-grant 1122 and/or the pre-grant 1134 may include a slot index (e.g., in the form of K0 for PDSCH or K2 for PUSCH) for the (PXSCH) resources associated with the pre-grant 1122 and/or the pre-grant 1134. Similarly, if the UE 1104 cannot receive two time overlapping PXSCHs, the pre-grant 1122 and/or the pre-grant 1134 may include a slot index (in the form of K0/K2) and a SLIV for the PXSCH. If the UE 1104 cannot receive two time and frequency overlapping PXSCHs, the pre-grant 1122 and/or the pre-grant 1134 may include a slot index (in the form of K0/K2), a SLIV for the PXSCH, and a FDRA. If the UE 1104 cannot receive two time and frequency overlapping PXSCHs, with combined rank above a certain threshold value, the pre-grant 1122 and/or the pre-grant 1134 may include a slot index (in the form of K0/K2), a SLIV for the PXSCH, an FDRA, and a rank (or antenna port assignment). The acceptance 1126 associated with the two-DCI pre-grant format, in some aspects, may indicate for TRP0 1102 to transmit the grant 1128 and to transmit and/or receive the communication 1130. The grant 1128, in some aspects, may be a DL and/or UL grant (e.g., a DCI format such as one of a Format 0_0, Format 0_1, Format 1_0, or Format 1_2, etc.), while in some aspects the grant 1128 may use a format that is related to, or based on, the format (or contents) of the pre-grant 1122. For example, the grant 1128 may provide the information missing from the pre-grant 1122 but not the information already included in the pre-grant 1122. In some aspects, the pre-grant 1122 may include and/or indicate more resources (e.g., may over-provision) than used for a subsequent communication (e.g., the communication 1130) and the grant 1128 may be a standard grant (using a current DCI format) for the subset of resources associated with the communication 1130.

In some aspects, the pre-grant 1122 and/or the pre-grant 1134 may further include an indication of a plurality of resources in the third shared resource pool 1119 for a plurality of transmissions (e.g., DL and/or UL communications) associated with UE 1104 and TRP0. The pre-grant 1122 and/or the pre-grant 1134 may, in some aspects, separately indicate each of the plurality of resources for the plurality of transmissions. In some aspects, the pre-grant 1122 and/or the pre-grant 1134 may indicate a set of resources to be reserved within a slot and a number of slots in which a same set of resources are to be reserved. While described in terms of slots, the reference time unit (periodicity) of the resources indicated in the pre-grant may be defined to be any of a set of slots, a frame, a set of frames, a time period, a number of symbols, or any other useful unit. Based on the indicated plurality of resources, UE 1104 may transmit, and TRP0 1102 may receive, the acceptance 1126 or a rejection 1138 including an acceptance or rejection for the plurality of resources as a whole or for each resource of the plurality of resources individually (e.g., the TRP0 1102 may receive separate feedback to the pre-grant, or potential grant, for one or more of the plurality of transmissions).

At a different time, during the time period associated with the third shared resource pool 1119 associated with both TRP0 1102 and the second TRP (TRP1), UE 1104 may further monitor, at 1132, for a pre-grant from both TRP0 1102 and a TRP1. While UE 1104 monitors for a pre-grant at 1132, TRP0 1102 may transmit, and UE 1104 may receive, a pre-grant 1134. UE 1104, in some aspects, may determine, at 1136, to reject the pre-grant 1134 and may transmit (or otherwise indicate) the rejection 1138. Based on the rejection 1138, TRP0 1102 may, at 1140, determine to omit, or skip, a transmission of a grant and/or a transmission and/or a reception of a communication associated with the pre-grant 1134.

The rejection 1138, in some aspects, may be transmitted as an ACK or a NACK via a dedicated feedback resource indicated in pre-grant 1134 as described above (and in relation to, e.g., feedback resource 530 of FIG. 5 above). In some aspects, rejection 1138 may be indicated by omitting a transmission via the dedicated feedback resource. The method of indicating the acceptance 1126 or the rejection 1138, in some aspects, may be based on a configuration indicating the meaning of an ACK or a NACK and a related default behavior. For example, if a default behavior, e.g., a behavior in the absence of feedback, is to cancel or omit a grant or communication associated with a pre-grant (or potential grant), a UE may be configured to transmit an ACK to accept the pre-grant and to transmit a NACK or to omit transmitting the feedback to reject the pre-grant. Alternatively, if the default behavior is to transmit a grant or to transmit and/or receive a communication associated with a pre-grant (or potential grant), a UE may be configured to transmit a NACK to accept the pre-grant (to indicate no conflict and/or collision) and to transmit an ACK or to omit transmitting the feedback to reject the pre-grant or to indicate a detected conflict and/or collision.

Call flow diagram 1100 includes a pre-grant (e.g., pre-grant 1122) followed by a grant (e.g., grant 1128) in accordance with the use of a two-DCI pre-grant format for completeness. However, for a single-DCI pre-grant format, in some aspects, the grant may be omitted and the information included in the grant 1128 will instead be included in the pre-grant as described above in relation to a single-DCI pre-grant format. In some aspects using the two-DCI pre-grant format, a feedback (e.g., acceptance 1126 or rejection 1138) may be omitted, or skipped, based on a conflict and/or collision between the feedback transmission and one or more other communications (e.g., DL or UL communication with higher priority) where the rules for which communication to omit or skip may be based on one or more of a capacity of the UE for simultaneous transmissions and/or simultaneous reception and transmission, a relative priority of the communication and the feedback (as defined in a pre-grant such as pre-grant DCI 510 or pre-grant 1122 for a single-DCI pre-grant format), and a default behavior in the absence of feedback.

Figure 12:
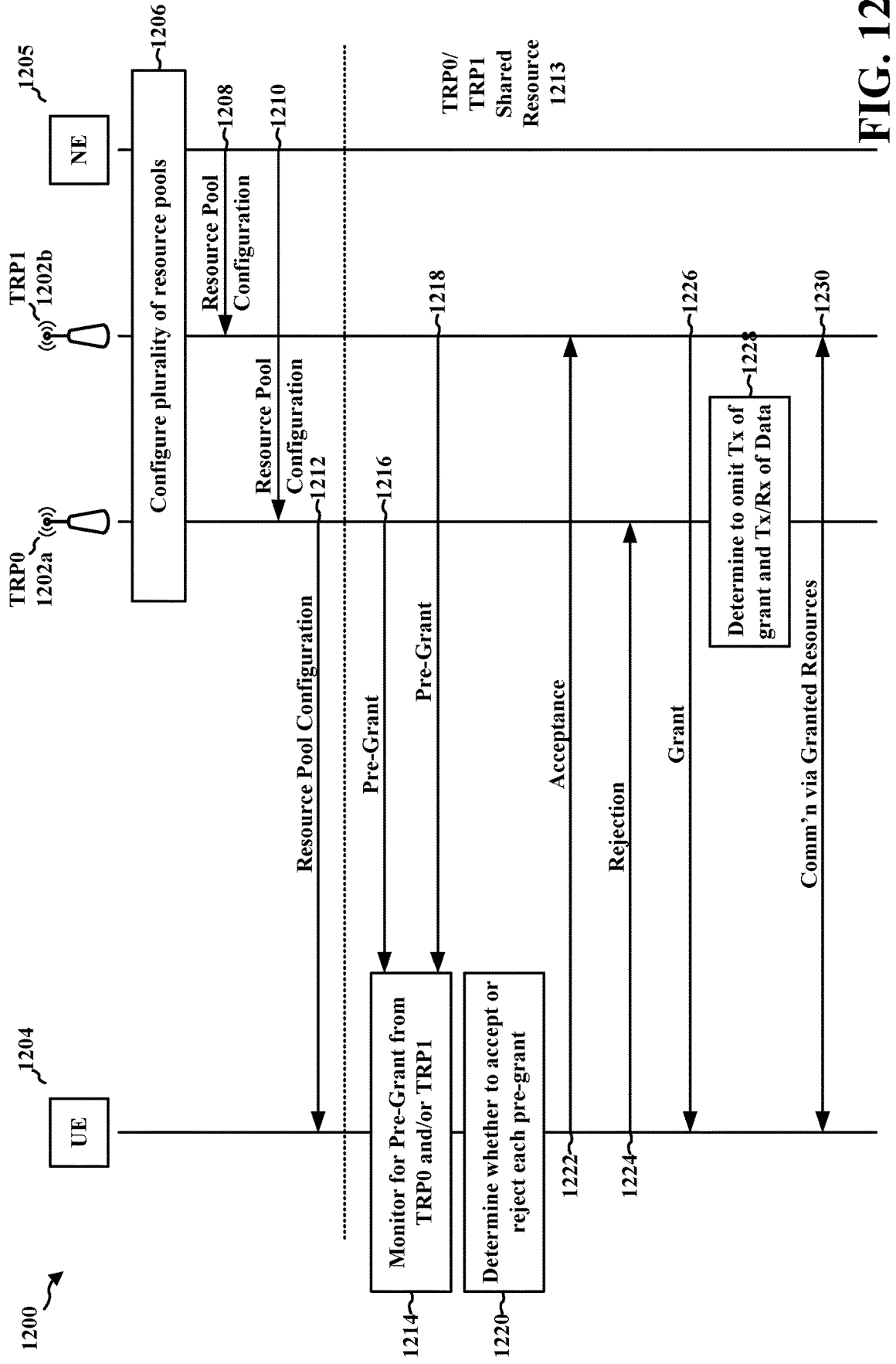
FIG. 12 is a call flow diagram of a method for configuring and using resource pools for communication between a set of TRPs and a UE in accordance with some aspects of the disclosure.

FIG. 12 is a call flow diagram 1200 of a method for configuring and using resource pools for communication between a set of TRPs, e.g., TRP0 1202a and TRP1 1202b, and a UE, e.g., UE 1204, in accordance with some aspects of the disclosure. In some aspects, a network entity 1205 in cooperation with TRP0 1202a and TRP1 1202b may configure, at 1206, a plurality of resource pools for UE 1204, e.g., as described in relation to resource pool configuration 1060 for UE 1004a. The network entity 1205, in some aspects, may be a component of a core network associated with one or more of TRP0 1202a or TRP1 1202b, or may be a component of a base station or other network device associated with one of TRP0 1202a or TRP1 1202b. The configuration of the plurality of resource pools at 1206, in some aspects, may be triggered by a detection by TRP0 1202a, TRP1 1202b, or network entity 1205 that UE 1204 is communicating with multiple TRPs (e.g., TRP0 1202a and TRP1 1202b). In some aspects, the configuration at 1206 may include an exchange of information between TRP0 1202a, TRP1 1202b, and network entity 1205 to determine the allocation of resources among the plurality of resource pools.

The network entity 1205 may provide, and TRP0 1202a and TRP1 1202b may obtain, resource pool configuration 1208 and resource pool configuration 1210, respectively. Resource pool configuration 1208 and resource pool configuration 1210, in some aspects, may indicate a first resource pool associated with TRP0 1202a, a second resource pool associated with a TRP1 1202b, and a third shared resource pool 1213 associated with both TRP0 1202a and TRP1 1202b. The first and second resource pools are omitted from call flow diagram 1200 as the function of each TRP for a resource pool associated with the TRP and for a resource pool associated with the other TRP is as described in relation to TRP0 1102 for the first resource pool 1109 and the second resource pool 1117 of FIG. 11, respectively.

TRP0 1202a (or TRP 902b) may transmit, and UE 1204 may receive, resource pool configuration 1212 based on resource pool configuration 1208 (or resource pool configuration 1210). Based on the resource pool configuration 1212, UE 1204 may, during a time period associated with the third shared resource pool 1213 associated with both TRP0 1202a and TRP1 1202b, UE 1204 may monitor, at 1214, for a pre-grant from both TRP0 1202a and TRP1 1202b. TRP0 1202a may transmit, and UE 1204 may receive, a pre-grant 1216. Additionally, TRP1 1202b may transmit, and UE 1204 may receive, a pre-grant 1218. UE 1204, in some aspects, may determine, at 1220, whether to accept or reject each pre-grant (e.g., the pre-grant 1216 and the pre-grant 1218). The determination, at 1220 may include identifying and/or determining whether there is a conflict and/or collision between the pre-grant 1216 and the pre-grant 1218 (based on the overlap in one or more of frequency and time of the resources associated with each pre-grant and the capabilities of UE 1204). The determination, at 1220, in some aspects, may further be based on other operations (or lack of operations) performed by UE 1204, e.g., the determination may be based on whether UE 1204 has data to transmit via resources associated with an UL pre-grant.

As illustrated, UE 1204 may determine, at 1220, to reject the pre-grant 1216 and to accept pre-grant 1218. In some aspects, the determination, at 1220, to reject the pre-grant 1216 and to accept pre-grant 1218 may be based on an overlap between resources (an overlap in time and/or frequency that UE 1204 does not support) indicated, or associated with, pre-grant 1216 and pre-grant 1218. Based on the determination at 1220, UE 1204 may transmit (or otherwise indicate) an acceptance 1222 and a rejection 1224. The acceptance 1222, in some aspects, may be transmitted as an ACK or a NACK via a dedicated feedback resource indicated in pre-grant 1218 as described above (in relation to pre-grant 1122 and acceptance 1126 of FIG. 11). In some aspects, acceptance 1222 may be indicated by omitting a transmission via the dedicated feedback resource. Similarly, the rejection 1224, in some aspects, may be transmitted as an ACK or a NACK via a dedicated feedback resource indicated in pre-grant 1216 as described above (in relation to pre-grant 1134 and rejection 1138 of FIG. 11). In some aspects, rejection 1224 may be indicated by omitting a transmission via the dedicated feedback resource. The method of indicating the acceptance 1222 or the rejection 1224, in some aspects, may be based on a configuration indicating the meaning of an ACK or a NACK and a related default behavior as described in relation to FIG. 11. In some aspects, TRP0 1202*a* and TRP1 1202*b* may have different default behaviors and may ascribe different meanings to an ACK, a NACK, or feedback that is not received (e.g., an omitted or skipped feedback transmission). Accordingly, UE 1204 may provide a same feedback (e.g., an ACK, a NACK, or an omitted feedback) to both TRP0 1202*a* and TRP1 1202*b* or may provide different feedback to each of TRP0 1202*a* and TRP1 1202*b* to indicate the acceptance of one pre-grant (e.g., the pre-grant 1218) and the rejection of the other pre-grant (e.g., the pre-grant 1216).

Based on the acceptance 1222, TRP1 1202*b* may transmit, and UE 1204 may receive, a grant 1226 associated with the pre-grant 1218. In some aspects using a single-DCI pre-grant format, TRP1 1202*b* may not transmit grant 1226 as the grant information may have been included in the pre-grant 1218. Based on the acceptance 1222 (and the grant 1226), TRP1 1202*b* may transmit and/or receive, and UE 1204 may receive and/or transmit, communication 1230. Based on the rejection 1224, TRP0 1202*a* may determine, at 1228, to omit, or skip, a transmission of a grant and/or a transmission and/or a reception of a communication associated with the pre-grant 1216. In some aspects, the pre-grant 1216, the determination at 1220, the rejection 1224, and the determination at 1228 may correspond to the pre-grant 1134, the determination at 1136, the rejection 1138, and the determination at 1140 of FIG. 11, where FIG. 11 shows the interaction between TRP0 1102 and UE 1104 (corresponding to TRP0 1202*a* an UE 1204) without the interaction between UE 1104 and the other TRP (corresponding to TRP1 1202*b*).

Call flow diagram 1200 includes a pre-grant (e.g., pre-grant 1218) followed by a grant (e.g., grant 1226) in accordance with the use of a two-DCI pre-grant format for completeness. However, for a single-DCI pre-grant format, in some aspects, the grant may be omitted and the information included in the grant 1226 will instead be included in the pre-grant as described above in relation to a single-DCI pre-grant format. In some aspects using the two-DCI pre-grant format, a feedback (e.g., acceptance 1222 or rejection 1224) may be omitted, or skipped, based on a conflict and/or collision between the feedback transmission and one or more other communications (e.g., DL or UL communication with higher priority) where the rules for which communication to omit or skip may be based on one or more of a capacity of the UE for simultaneous transmissions and/or simultaneous reception and transmission, a relative priority of the communication and the feedback (as defined in a pre-grant such as pre-grant DCI 510, pre-grant 1216, or pre-grant 1218 for a single-DCI pre-grant format), and a default behavior in the absence of feedback.

In some aspects, one of TRP0 1202*a* or TRP1 1202*b*, may transmit a grant (instead of a pre-grant) during a time period associated with the third shared resource pool 1213. For a grant received at UE 1204 during the third shared resource pool 1213, the UE 1204 may attempt to follow the grant (e.g., to transmit or receive via the resources indicated in the grant). For example, if there is no detected conflict with another pre-grant or grant, or if a conflicting pre-grant may be rejected as in diagram 900, the UE may follow the grant (and reject the pre-grant). However, if the grant creates a conflict with an accepted pre-grant as in diagram 950, the UE 1204 may be configured, in some aspects, to follow the pre-grant (or to follow the grant). Additionally, if multiple conflicting grants are received during the time period associated with the third shared resource pool 1213, the UE may have a local configuration that determines which of the multiple grants to follow.

As described herein, multiple TRPs can reserve/contend for a resources in a shared resource pool with a pre-grant (for two DCI type of resource allocation). If the resources will overlap, one of the TRPs may proceed to send the second DCI granting the resources. The pre-grant provides the information about the resource for a tentative downlink or uplink transmission. The DCI may indicate a pre-grant or reservation for a single transmission, e.g., which may be referred to as a single resource, or for multiple transmissions, which may be referred to as multiple resources. For example, the reservation can reserve multiple resources in the shared resource pool, that can be used for multiple transmissions. The use of a single pre-grant DCI to indicate a resource reservation for multiple resources, or multiple transmissions, provides more efficient signaling because fewer pre-grant DCIs are used to indicate the reservation. However, and ACK/NACK for the pre-grant may accept or decline the pre-grant as a whole either accepting or rejecting all of the resources for the multiple transmissions, and the collision probability is higher between TRPs.

As discussed above in relation to FIG. 8, for resource in a shared resource pool, a TRP may send a reservation signal (a DCI or pre-grant) to reserve a set of resources for one or more PDSCH or PUSCH transmissions. The UE can compare pre-grants received from the TRPs for resources in the shared resource pool to determine if there is a collision with the indicated resources for the transmissions. If there is a collision, the UE can decide to decline one of the reservations and accept the other reservation, e.g., accepting or declining individual resources within a pre-grant individually or independently rather than accepting or declining the pre-grant as a whole.

A reservation DCI may reserve resources in the shared resource pool. The content of the reservation DCI may be similar to the pre-grant discussed herein, with the exception that the resource reserved can be for more than one PDSCH/PUSCH. Other aspects of the DCI format can follow the aspects described herein for a pre-grant.

The multiple resource reservations can be provided in the reservation DCI by adding multiple copies of fields describing the resources to be reserved, e.g., multiple K, multiple SLIV, multiple FDRA, multiple rank, multiple MCS, among other fields. For example, the multiple fields may include one for each of the resources being reserved. The multiple resource reservations can be provided in the reservation DCI by having the same resource in multiple slots being reserved by the DCI, e.g., adding an indication for a number (X) of slots to which the same resources are being reserved along with a single K, a single SLIV, a single FDRA, a single rank, and a single MCS. The reservation DCI indicates that starting from slot K, in the next X slots, the same resource defined by the single indicated FDRA, SLIV, rank, and MCS, are being reserved. X can be absolute (e.g., over all slots), or can be counted according to the shared resource pool (e.g., skipping or not counting the slots not in the shared resource pool). In some aspects, the reservation DCI may provide K and X, so the reservation is in slot unit. In some aspects, if the reservation is in a unit of slots (in the shared resource pool), the same reservation DCI may reserve resources for both PDSCH and PUSCH.

For ACK/NACK feedback for the reservation DCI, the feedback may be provided similar to the pre-grant. For example, the ACK/NACK may accept or decline the entire reservation DCI, including the multiple resources, in some aspects. In other aspects, the ACK/NACK may accept or decline separate resources, e.g., a subset of the indicated resources, using a larger ACK/NACK payload.

Figure 13:
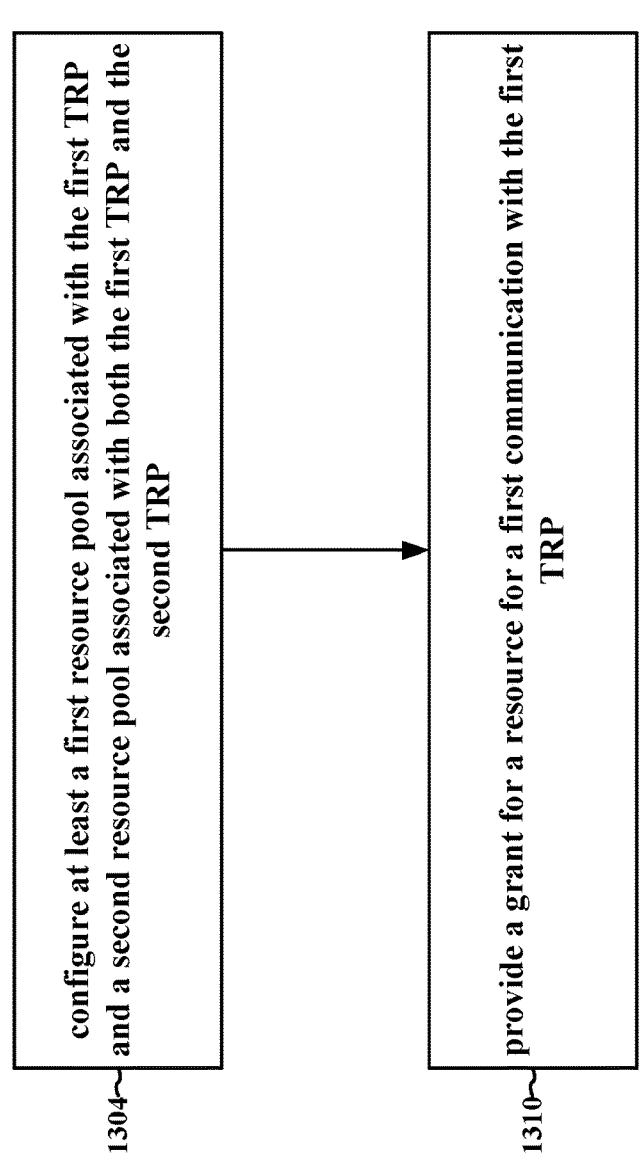
FIG. 13 is a flowchart of a method of wireless communication.

FIG. 13 is a flowchart 1300 of a method of wireless communication. The method may be performed by a base station or network device, e.g., a base station or network device associated with one of a first or second TRP (e.g., the base station 102; TRP0 402, TRP1 406, TRP0 502, TRP1 506, TRP0 602, TRP0 702, TRP0 802, TRP0 902, TRP1 906, TRP0 1002, TRP1 1006, TRP0 1102, TRP0 1202*a*, TRP1 1202*b*; the network entity 1205, the network entity 1702, the network entity 1802, or the network entity 1960). The network device (e.g., a network device associated with a first TRP, such as TRP0 402, 502, 602, 702, 802, 902, 1002, 1102, or 1202*a*) may receive resource information regarding, or for, a second TRP (e.g., TRP1 406, 506, 906, 1006, or 1202*b*). The resource information, in some aspects, may be received via backhaul signaling from a second network device associated with the second TRP or a network entity associated with both the first and second TRPs. The resource information, in some aspects, may relate to an expected volume of DL or UL communication with one or more UEs associated with the first and second TRPs. In some aspects, the resource information may relate to a current configuration of sets of resource pools for one or more UEs associated with the second TRP, or other information that may be used to determine a configuration of resource pools for at least one UE associated with the first and second TRP. For example, referring to FIG. 12, TRP0 1202*a*, in configuring a plurality of resource pools at 1206, may exchange and/or receive information with TRP1 1202*b* and network entity 1205 to determine the allocation of resources among the plurality of resource pools.

At 1304, the network device may configure at least a first resource pool associated with the first TRP and a second resource pool associated with both the first TRP and the second TRP. In some aspects, configuring at least the first resource pool and the second resource pool at 1304 may include configuring a third resource pool associated with the second TRP. Configuring at least the first resource pool and the second resource pool at 1304, in some aspects, may include configuring the first resource pool, the second resource pool, and the third resource pool for DL communication. Configuring at least the first resource pool and the second resource pool at 1304, in some aspects, may include configuring a fourth resource pool associated with the first TRP, a fifth resource pool associated with both the first TRP and the second TRP, and a sixth resource pool associated with the second TRP for UL communication. The resource pools configured at 1304 may be UE-specific and additional resource pools may be configured for additional UEs. For example, 1304 may be performed by CU processor 1812, DU processor 1832, RU processor 1842, transceiver(s) 1846, antenna(s) 1880, and/or resource pool configuration component 199 of FIG. 18 or by network interface 1980 and/or resource pool configuration component 199 of FIG. 19. In some aspects, configuring at least the first resource pool and the second resource pool at 1304 (and/or configuring the first through third resource pools for DL communication or the fourth through sixth resource pools for UL communication) may be based on the resource information regarding, or for, the second TRP. For example, referring to FIGS. 10-9, TRP0 1002 (corresponding to TRP0 1102 or TRP0 1202*a*), may configure (corresponding to the configuration at 1106 or 1206) a first DL resource pool 1081 and a first UL resource pool 1082 (corresponding to first resource pool 1109), a second DL resource pool 1083 and a second UL resource pool 1084 (corresponding to second resource pool 1117), and a third DL resource pool 1085 and a third UL resource pool 1086 (corresponding to third shared resource pool 1119 or 1213) based on information exchanged with, and/or received from, TRP1 1202*b* and/or network entity 1205.

At 1310, the network device may provide a grant for a resource for a communication with the first TRP. In some aspects, providing the grant at 1310 may be via a single control message based on the resource being in the first resource pool or via multiple control messages based on the resource being in the second resource pool. As will be described below, the single control message may be a DCI grant format (e.g., DCI type 0_0, 0_1, 1_0, 1_1, etc.) granting the resource. The multiple control messages, in some aspects, may include at least a potential grant (e.g., a pre-grant, or potential grant, DCI as described above in relation to FIGS. 5, 9, 11, and 12) and a feedback indicating an acceptance or rejection of the potential grant and may further include a subsequent grant for accepted potential grants if the potential grant does not include sufficient information for the first communication. For example, 1310 may be performed by CU processor 1812, DU processor 1832, RU processor 1842, transceiver(s) 1846, antenna(s) 1880, and/or resource pool configuration component 199 of FIG. 18 or by network interface 1980 and/or resource pool configuration component 199 of FIG. 19. In some aspects, the resource may be in the first resource pool and providing the grant at 1310 may include transmitting, from the first TRP, a single DCI including the grant of the resource to a wireless device and the network device may transmit the first communication to, or receive the first communication from, the wireless device via the resource. For example, referring to FIG. 11, TRP0 1102 may transmit grant 1112 and transmit or receive communication 1114.

In some aspects, the resource may be in the second resource pool and providing the grant at 1310 may include transmitting a first DCI indicating a potential grant of the resource and receiving, from the wireless device, feedback indicating that the potential grant of the resource is accepted. The network device may then (in a single-DCI pre-grant format) transmit the first communication to, or receive the first communication from, the wireless device via the resource indicated in the first DCI. In some aspects, the network device may transmit a second DCI indicating the grant of the resource in the second resource pool resource and then transmit the first communication to, or receive the first communication from, the wireless device via the resource based on second DCI (or the first DCI and the second DCI). For example, referring to FIG. 11, TRP0 1102 may transmit pre-grant 1122, receive acceptance 1126, transmit grant 1128 (for a two-DCI pre-grant format), and transmit or receive communication 1130.

In some aspects, the multiple control messages may include a first DCI indicating a potential grant of a plurality of subsets of resources in the second resource pool for a plurality of transmissions and a feedback from the UE. In some aspects, the first DCI may separately indicate each of the plurality of subsets of resources for the plurality of transmissions. The first DCI, in some aspects, may indicate a subset of resources to be reserved in a single slot and a number of slots in which a same subset of resources is to be reserved. In response to the indication of the potential grant of the plurality of subsets of resources, the network device may receive a combined feedback accepting, or rejecting, the plurality of subsets or may receive separate feedback for each potential grant of a subset of resources in the plurality of subsets of resources.

Figure 14:
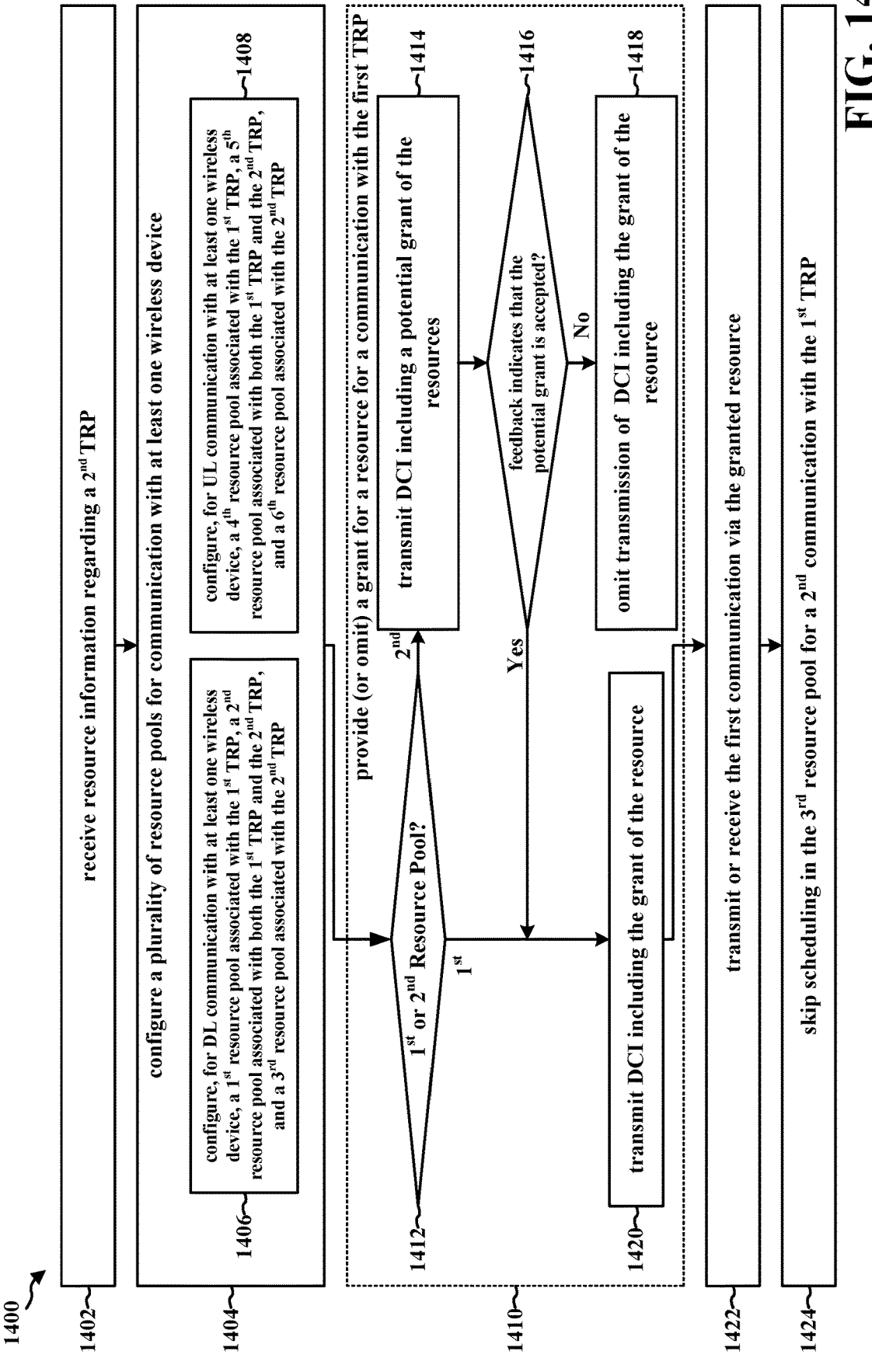
FIG. 14 is a flowchart of a method of wireless communication.

FIG. 14 is a flowchart 1400 of a method of wireless communication. The method may be performed by a base station or network device, e.g., a base station or network device associated with one of a first or second TRP (e.g., the base station 102; TRP0 402, TRP1 406, TRP0 502, TRP1 506, TRP0 602, TRP0 702, TRP0 802, TRP0 902, TRP1 906, TRP0 1002, TRP1 1006, TRP0 1102, TRP0 1202*a*, TRP1 1202*b*; the network entity 1205, the network entity 1702, the network entity 1802, or the network entity 1960). At 1402, the network device (e.g., a network device associated with a first TRP, such as TRP0 402, 502, 602, 702, 802, 902, 1002, 1102, or 1202*a*) may receive resource information regarding, or for, a second TRP (e.g., TRP1 406, 506, 906, 1006, or 1202*b*). The resource information, in some aspects, may be received at 1402 via backhaul signaling from a second network device associated with the second TRP or a network entity associated with both the first and second TRPs. For example, 1402 may be performed by CU processor 1812, DU processor 1832, RU processor 1842, transceiver(s) 1846, antenna(s) 1880, and/or resource pool configuration component 199 of FIG. 18 or by network interface 1980 and/or resource pool configuration component 199 of FIG. 19. The resource information received at 1402, in some aspects, may relate to an expected volume of DL or UL communication with one or more UEs associated with the first and second TRPs. In some aspects, the resource information received at 1402 may relate to a current configuration of sets of resource pools for one or more UEs associated with the second TRP, or other information that may be used to determine a configuration of resource pools for at least one UE associated with the first and second TRP. For example, referring to FIG. 12, TRP0 1202*a*, in configuring a plurality of resource pools at 1206, may exchange and/or receive information with TRP1 1202*b* and network entity 1205 to determine the allocation of resources among the plurality of resource pools.

At 1404, the network device may configure at least a first resource pool associated with the first TRP and a second resource pool associated with both the first TRP and the second TRP. In some aspects, configuring at least the first resource pool and the second resource pool at 1404 may include configuring a third resource pool associated with the second TRP. Configuring at least the first resource pool and the second resource pool at 1404, in some aspects, may include configuring, at 1406, the first resource pool, the second resource pool, and the third resource pool for DL communication. Configuring at least the first resource pool and the second resource pool at 1404, in some aspects, may include configuring, at 1408, a fourth resource pool associated with the first TRP, a fifth resource pool associated with both the first TRP and the second TRP, and a sixth resource pool associated with the second TRP for UL communication. The resource pools configured at 1404, 1406, or 1408 may be UE-specific and additional resource pools may be configured for additional UEs. For example, 1404, 1406, and 1408 may be performed by CU processor 1812, DU processor 1832, RU processor 1842, transceiver(s) 1846, antenna(s) 1880, and/or resource pool configuration component 199 of FIG. 18 or by network interface 1980 and/or resource pool configuration component 199 of FIG. 19. In some aspects, configuring at least the first resource pool and the second resource pool at 1404 (and/or configuring the first through third resource pools for DL communication at 1406 or the fourth through sixth resource pools for UL communication at 1408) may be based on the resource information regarding, or for, the second TRP received at 1402. For example, referring to FIGS. 10-9, TRP0 1002 (corresponding to TRP0 1102 or TRP0 1202*a*), may configure (corresponding to the configuration at 1106 or 1206) a first DL resource pool 1081 and a first UL resource pool 1082 (corresponding to first resource pool 1109), a second DL resource pool 1083 and a second UL resource pool 1084 (corresponding to second resource pool 1117), and a third DL resource pool 1085 and a third UL resource pool 1086 (corresponding to third shared resource pool 1119 or 1213) based on information exchanged with, and/or received from, TRP1 1202*b* and/or network entity 1205.

At 1410, the network device may provide (or omit) a grant for a resource for a communication with the first TRP. In some aspects, providing (or omitting) the grant may include determining, at 1412, whether a current time period is associated with the first resource pool associated with the first TRP or with the second resource pool associated with both the first TRP and the second TRP. If the network device determines at 1412 that the current time period is associated with the second resource pool, the network device, in some aspects, may transmit, at 1414, a first (pre-grant) DCI (or other control message) indicating a potential grant of a resource (or set of resources) in the second resource pool for a first communication with a wireless device. The network device may then determine, at 1416, if feedback from the wireless device indicates that the potential grant is accepted. For example, the network device may determine at 1416 whether it has received an ACK or a NACK or has not received feedback via a feedback resource associated with the first DCI transmitted at 1414 and what the feedback, or lack of feedback, indicates based on a configuration indicating the meaning of an ACK or a NACK and a related default behavior.

If the feedback, or lack of feedback, is determined, at 1416 to indicate that the potential grant indicated by the first DCI is rejected, the network device may, at 1418, omit a transmission of a second DCI indicating a grant of the resource in the second resource pool for the first communication. In some aspects, the first DCI transmitted at 1414 may further indicate a potential grant of a plurality of resources in the second resource pool for a plurality of transmissions associated with the wireless device and may determine, at 1416 whether it has received feedback indicating that either the plurality of resources indicated by the first DCI has been accepted or rejected and/or whether each resource in the plurality of resources has been accepted or rejected. If the network device determines at 1412 that the current time period is associated with the first resource pool or that a feedback (or lack of feedback) indicates that the potential grant indicated in the first DCI transmitted at 1414 has been accepted, the network device, in some aspects, may transmit, at 1420, a grant for the resource for the first communication (a first (grant) DCI or a second DCI indicating the grant of the resource indicated in the first (pre-grant) DCI). In some aspects, the determination at 1412 may further include whether the current time period is associated with the third resource pool associated with the second TRP and if the network device determines, at 1412, that the current time period is associated with the third resource pool, the network device may omit the transmission of a grant and/or a pre-grant, or may omit the transmission and/or the reception of a communication with the wireless device. For example, 1410, 1412, 1414, 1416, 1418, and 1420 may be performed by CU processor 1812, DU processor 1832, RU processor 1842, transceiver(s) 1846, antenna(s) 1880, and/or resource pool configuration component 199 of FIG. 18. Referring to FIGS. 11 and 12, for example, TRP0 1102 or TRP0 1202*a* may transmit one of grant 1112, pre-grant 1122, pre-grant 1134, or pre-grant 1216 based on a resource pool associated with a current time and determine whether a pre-grant has been accepted (e.g., pre-grant 1122) or rejected (e.g., pre-grant 1134 and pre-grant 1216) and either transmit a grant (e.g., grant 1128) associated with an accepted pre-grant (e.g., pre-grant 1122) or to omit, or skip, a transmission of a grant associated with the rejected pre-grant (e.g., pre-grant 1134 and pre-grant 1216) at 1140 or 1228.

If the network device transmits the grant at 1420 (e.g., either the first (grant DCI) or the second DCI indicating the grant of the resource indicated in the first (pre-grant) DCI), the network device may, at 1422, transmit and/or receive the first communication via the granted resources. For example, 1422 may be performed by CU processor 1812, DU processor 1832, RU processor 1842, transceiver(s) 1846, antenna(s) 1880, and/or resource pool configuration component 199 of FIG. 18. The communication, in some aspects, may be either a DL communication or an UL communication. For example, referring to FIGS. 11 and 12, in association with grant 1112 or grant 1128 TRP0 1102 may transmit or receive communication 1114 or communication 1130 via the granted resources and, in association with grant 1226, TRP0 1202b may transmit or receive communication 1230.

At 1424, the network device may skip scheduling a second communication in the third resource pool. For example, 1424 may be performed by CU processor 1812, DU processor 1832, RU processor 1842, transceiver(s) 1846, antenna(s) 1880, and/or resource pool configuration component 199 of FIG. 18. Skipping or omitting scheduling (or not scheduling), the second communication at 1424, in some aspects, may be based on a determination, at 1412, that the current time period is associated with the third resource pool. The network device, in some aspects, based on skipping scheduling the second communication at 1424 may also skip or omit a transmission of a grant or potential grant (or pre-grant) associated with the second communication. For example, referring to FIG. 11, TRP0 1102 may omit, at 1116, transmitting a grant or pre-grant for, or a communication via, resources associated with the second resource pool 1117.

Figure 15:
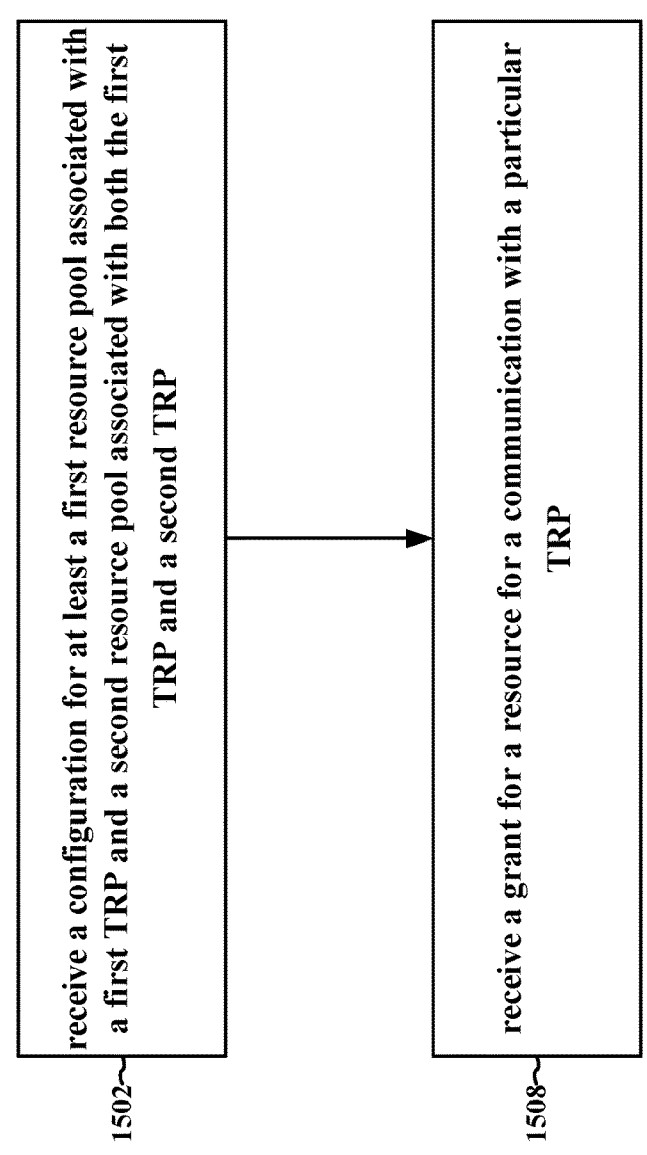
FIG. 15 is a flowchart of a method of wireless communication.

FIG. 15 is a flowchart 1500 of a method of wireless communication. The method may be performed by a UE (e.g., the UE 104, UE 404b, UE 504, UE 604, UE 704, UE 804, UE 904, UE 1004a-1004c, UE 1104, or UE 1204; the apparatus 1704). At 1502, the UE (e.g., a UE associated with a first TRP, such as TRP0 402, 502, 602, 702, 802, 902, 1002, 1102, or 1202a and a second TRP such as TRP1 406, 506, 906, 1006, or 1202b) may receive a configuration for at least a first resource pool associated with a first TRP and a second resource pool associated with both the first TRP and a second TRP. For example, 1502 may be performed by application processor 1706, cellular baseband processor 1724, transceiver(s) 1722, antenna(s) 1780, and/or resource pool configuration component 198 of FIG. 17. In some aspects, receiving the configuration for at least the first resource pool and the second resource pool at 1502 may include receiving a configuration for a third resource pool associated with the second TRP. Receiving at least the first resource pool and the second resource pool at 1502, in some aspects, may include receiving a configuration for the first resource pool, the second resource pool, and the third resource pool for DL communication. Receiving at least the first resource pool and the second resource pool at 1502, in some aspects, may include receiving a fourth resource pool associated with the first TRP, a fifth resource pool associated with both the first TRP and the second TRP, and a sixth resource pool associated with the second TRP for UL communication. The resource pools configured at 1502 may be UE-specific and additional resource pools may be configured for additional UEs. For example, 1502 may be performed by application processor 1706, cellular baseband processor 1724, transceiver(s) 1722, antenna(s) 1780, and/or resource pool configuration component 198 of FIG. 17. For example, referring to FIGS. 10-9, UE 1004c may receive, from TRP0 1002 (or TRP1 1006, TRP0 1102, TRP0 1202a, or TRP1 1202b), a configuration of a first DL resource pool 1081 and a first UL resource pool 1082 (corresponding to first resource pool 1109), a second DL resource pool 1083 and a second UL resource pool 1084 (corresponding to second resource pool 1117), and a third DL resource pool 1085 and a third UL resource pool 1086 (corresponding to third shared resource pool 1119 or 1213), where UE 1004a, UE 1004b, UE 1104, and UE 1204 may receive similar configurations for a plurality of resource pools as illustrated in FIGS. 10-9.

At 1508, the UE may receive a grant for a resource for a (first) communication with the first TRP. In some aspects, receiving the grant at 1508 may be via a single control message based on the resource being in the first resource pool or via multiple control messages based on the resource being in the second resource pool. As will be described below, the single control message may be a DCI grant format (e.g., DCI type 0_0, 0_1, 1_0, 1_1, etc.) granting the resource. The multiple control messages, in some aspects, may include at least a potential grant (e.g., a pre-grant, or potential grant, DCI as described above in relation to FIGS. 5, 9, 11, and 12) and a feedback indicating an acceptance or rejection of the potential grant and may further include a subsequent grant for accepted potential grants if the potential grant does not include sufficient information for the first communication. For example, 1508 may be performed by application processor 1706, cellular baseband processor 1724, and/or resource pool configuration component 198 of FIG. 17. In some aspects, the resource may be in the first resource pool and receiving the grant at 1508 may include receiving, from the first TRP, a single DCI including the grant of the resource and the UE may transmit the first communication to, or receive the first communication from, the first TRP via the resource. For example, referring to FIG. 11, UE 1104 may receive grant 1112 and transmit or receive communication 1114.

In some aspects, the resource may be in the second resource pool and receiving the grant at 1508 may include receiving a first DCI indicating a potential grant of the resource and transmitting, for the first TRP, feedback indicating that the potential grant of the resource is accepted. The UE may then (in a single-DCI pre-grant format) transmit the first communication to, or receive the first communication from, the first TRP via the resource indicated in the first DCI. In some aspects, the UE may receive, from the first TRP, a second DCI indicating the grant of the resource in the second resource pool resource and then transmit the first communication to, or receive the first communication from, the first TRP via the resource based on second DCI (or the first DCI and the second DCI). For example, referring to FIG. 11, UE 1104 may receive pre-grant 1122, transmit acceptance 1126, receive grant 1128 (for a two-DCI pre-grant format), and transmit or receive communication 1130.

In some aspects, receiving the grant at 1508 may be performed based on multiple potential grants received from different TRPs for resources in the second resource pool. For example, the UE may receive, from the first TRP, a first DCI indicating a first potential grant of a second resource in the second resource pool for a second communication with the first TRP and receive, from the second TRP, a second DCI indicating a second potential grant of a third resource in the second resource pool for a third communication with the second TRP. In some aspects, there may be an overlap between the second resource and the third resource. The UE, based on the overlap (in time or in time and frequency based on the UEs capabilities) may transmit, for the first TRP, a first feedback indicating that the first potential grant of the second resource is rejected and transmit, for the second TRP, a second feedback indicating that the second potential grant of the third resource is accepted. For a single-DCI format, the UE may transmit the third communication to, or receive the third communication from, the second TRP via the third resource based on the indication in the second DCI. In a two-DCI pre-grant format, the UE may receive, from the second TRP, a third DCI indicating the grant of the third resource in the second resource pool and transmit the third communication to, or receive the third communication from, the second TRP via the third resource granted in the third DCI. For example, referring to FIG. 12, UE 1204 may receive pre-grants 1216 and 1218, transmit acceptance 1222 to TRP1 1202b and rejection 1224 to TRP0 1202a, receive a grant 1226 from TRP1 1202b, and transmit communication 1230 to, or receive communication 1230 from, TRP1 1202b.

In some aspects, the multiple control messages may include receiving a first DCI indicating a potential grant of a plurality of subsets of resources in the second resource pool for a plurality of transmissions and a feedback from the UE. In some aspects, the first DCI may separately indicate each of the plurality of subsets of resources for the plurality of transmissions. The first DCI, in some aspects, indicates a subset of resources to be reserved in a single slot and a number of slots in which a same subset of resources is to be reserved. The specific configuration of the first DCI is discussed in greater detail above in relation to FIG. 12. In response to the indication of the potential grant of the plurality of subsets of resources, the UE may transmit a combined feedback accepting, or rejecting, the plurality of subsets or may transmit separate feedback for each potential grant of a subset of resources in the plurality of subsets of resources as discussed in relation to FIG. 12.

FIG. 16 is a flowchart 1600 of a method of wireless communication. The method may be performed by a UE (e.g., the UE 104, UE 404b, UE 504, UE 604, UE 704, UE 804, UE 904, UE 1004a-1004c, UE 1104, or UE 1204; the apparatus 1704). At 1602, the UE (e.g., a UE associated with a first TRP, such as TRP0 402, 502, 602, 702, 802, 902, 1002, 1102, or 1202a and a second TRP such as TRP1 406, 506, 906, 1006, or 1202b) may receive a configuration for at least a first resource pool associated with a first TRP and a second resource pool associated with both the first TRP and a second TRP. For example, 1602 may be performed by application processor 1706, cellular baseband processor 1724, transceiver(s) 1722, antenna(s) 1780, and/or resource pool configuration component 198 of FIG. 17. In some aspects, receiving the configuration for at least the first resource pool and the second resource pool at 1602 may include receiving a configuration for a third resource pool associated with the second TRP. Receiving at least the first resource pool and the second resource pool at 1602, in some aspects, may include receiving, at 1604, a configuration for the first resource pool, the second resource pool, and the third resource pool for DL communication. Receiving at least the first resource pool and the second resource pool at 1602, in some aspects, may include receiving, at 1606, a fourth resource pool associated with the first TRP, a fifth resource pool associated with both the first TRP and the second TRP, and a sixth resource pool associated with the second TRP for UL communication. The resource pools configured at 1602, 1604, or 1606 may be UE-specific and additional resource pools may be configured for additional UEs. For example, 1602, 1604, and 1606 may be performed by application processor 1706, cellular baseband processor 1724, transceiver(s) 1722, antenna(s) 1780, and/or resource pool configuration component 198 of FIG. 17. For example, referring to FIGS. 10-9, UE 1004c may receive, from TRP0 1002 (or TRP1 1006, TRP0 1102, TRP0 1202a, or TRP1 1202b), a configuration of a first DL resource pool 1081 and a first UL resource pool 1082 (corresponding to first resource pool 1109), a second DL resource pool 1083 and a second UL resource pool 1084 (corresponding to second resource pool 1117), and a third DL resource pool 1085 and a third UL resource pool 1086 (corresponding to third shared resource pool 1119 or 1213), where UE 1004a, UE 1004b, UE 1104, and UE 1204 may receive similar configurations for a plurality of resource pools as illustrated in FIGS. 10-9.

At 1608, the UE may receive a grant for a resource for a (first) communication with the first TRP. Receiving the grant at 1608, in some aspects, may include determining, at 1610, whether a current time period is associated with the first resource pool associated with the first TRP, with the second resource pool associated with both the first TRP and the second TRP, or with the third resource pool associated with the second TRP. For example, 1610 may be performed by application processor 1706, cellular baseband processor 1724, and/or resource pool configuration component 198 of FIG. 17. The determination, in some aspects, may be based on the configuration received at 1602 (or at 1604 and/or at 1606). Referring to FIGS. 11 and 12, for example, UE 1104 (or UE 1204) may, determine that a time period is associated with one of the first resource pool 1109, the second resource pool 1117, or the third shared resource pool 1119 (or the third shared resource pool 1213).

If the UE determines at 1610 that the current time period is associated with the first resource pool associated with the first TRP, the UE, in some aspects, may monitor for a grant of resources from the first TRP to determine, at 1612A, whether the UE has received a grant for a first resource (or set of resources) for the first communication (e.g., a DCI granting a first resource or set of resources). If the UE determines, at 1612A, that the grant for the first resource (or set of resources) for the first communication was received, the UE may transmit or receive, at 1614A, the first communication via the first resource (or set of resources). For example, 1612A and 1614A may be performed by application processor 1706, cellular baseband processor 1724, transceiver(s) 1722, antenna(s) 1780, and/or resource pool configuration component 198 of FIG. 17. Referring to FIG. 11, for example, UE 1104 may, during a time period associated with the first resource pool 1109, monitor, at 1110, for a grant from TRP0 1102, and based on receiving the grant 1112, UE 1104 may exchange (transmit and/or receive) communication 1114 via the granted resources.

After transmitting or receiving the first communication via the first resource, at 1614A, or if the UE determines, at 1612A, that a grant for the first resource (or set of resources) for the first communication was not received, the UE may determine, at 1616A, if the time period associated with the first resource pool is complete. If the UE determines, at 1616A that the time period associated with the first resource pool is not complete, the UE may return to monitor for a grant of resources to determine, at 1612A, whether the UE has received a grant for the first resource (or set of resources) for the first communication. If the UE determines, at 1616A, that the time period associated with the first resource pool is complete, the UE may return to 1610 to determine whether a current time period is associated with the first resource pool associated with the first TRP, with the second resource pool associated with both the first TRP and the second TRP, or with the third resource pool associated with the second TRP. For example, 1616A may be performed by application processor 1706, cellular baseband processor 1724, and/or resource pool configuration component 198 of FIG. 17. Referring to FIG. 11, for example, UE 1104 may, receive grant 1112 and exchange communication 1114 with TRP0 1102 and then, based on a determination that the time period associated with first resource pool 1109 has ended (and that a time period associated with the second resource pool 1117 associated with TRP1 has begun) monitor for a grant from TRP1.

Similarly, if the UE determines at 1610 that the current time period is associated with the third resource pool associated with the second TRP, the UE, in some aspects, may monitor for a grant of resources from the second TRP to determine, at 1612B, whether the UE has received a grant for a second resource for a second communication (e.g., a DCI granting a second resource or set of resources). If the UE determines, at 1612B, that the grant for the second resource (or set of resources) for the second communication was received, the UE may transmit or receive, at 1614B, the second communication via the second resource (or set of resources). For example, 1612B and 1614B may be performed by application processor 1706, cellular baseband processor 1724, transceiver(s) 1722, antenna(s) 1780, and/or resource pool configuration component 198 of FIG. 17. Referring to FIG. 11, for example, UE 1104 may, during a time period associated with the second resource pool 1117, monitor, at 1118, for a grant from TRP1 and determine that no grant was received.

After transmitting or receiving the second communication via the second resource, at 1614B, or if the UE determines, at 1612B, that a grant for the second resource (or set of resources) for the second communication was not received, the UE may determine, at 1616B, if the time period associated with the third resource pool is complete. If the UE determines, at 1616B that the time period associated with the third resource pool is not complete, the UE may return to monitor for a grant of resources to determine, at 1612B, whether the UE has received a grant for the second resource (or set of resources) for the second communication. If the UE determines, at 1616B, that the time period associated with the third resource pool is complete, the UE may return to 1610 to determine whether a current time period is associated with the first resource pool associated with the first TRP, with the second resource pool associated with both the first TRP and the second TRP, or with the third resource pool associated with the second TRP. For example, 1616B may be performed by application processor 1706, cellular baseband processor 1724, and/or resource pool configuration component 198 of FIG. 17. Referring to FIG. 11, for example, UE 1104 may, at 1118, monitor for, and not receive, a grant from the second TRP (TRP1) and based on a determination that the time period associated with second resource pool 1117 associated with TRP1 has ended (and that a time period associated with the third shared resource pool 1119 has begun) monitor for a potential grant from either TRP0 or TRP1.

If the UE determines at 1610 that the current time period is associated with the second resource pool associated with both the first TRP and the second TRP, the UE, in some aspects, may monitor for a potential grant of resources from either the first TRP or the second TRP to determine, at 1618, whether the UE has received at least one potential grant (e.g., a first DCI indicating a potential grant) for at least one resource (or set of resources) for at least one communication (e.g., at least one pre-grant DCI indicating a potential grant of the at least one resource or set of resources). For example, 1618 may be performed by application processor 1706, cellular baseband processor 1724, transceiver(s) 1722, antenna(s) 1780, and/or resource pool configuration component 198 of FIG. 17. Referring to FIGS. 11 and 12, for example, UE 1104 (or the UE 1204) may, during a time period associated with the third shared resource pool 1119 (or the third shared resource pool 1213), monitor (at 1120, 1132, or 1214) for a potential grant from either TRP0 1102 (or TRP0 1202a) or from a second TRP (e.g., TRP1 1202b).

If the UE determines, at 1618, that the at least one grant for the at least one resource (or set of resources) for the at least one communication was received, the UE may determine, at 1620, to accept or reject each received potential grant. In some aspects, the UE may determine to accept multiple communications based on multiple corresponding potential grants not indicating a conflict and/or collision based on the capabilities of the UE. The UE, in some aspects, may determine to reject one or more received potential grants based on identifying (or determining) that the one or more received potential grants would conflict and/or collide with other received potential grants. For example, the UE may determine that a first resource associated with a first potential grant overlaps (e.g., in time or in time and frequency) with, or otherwise conflicts and/or collides with, a second resource associated with a second potential grant based on the capabilities of the UE to simultaneously engage in communication via the first and second resource. For example, 1620 may be performed by application processor 1706, cellular baseband processor 1724, and/or resource pool configuration component 198 of FIG. 17. Referring to FIGS. 11 and 12, for example, UE 1104 (or the UE 1204) may, based on receiving at least one potential grant (e.g., pre-grant 1122, 1134, 1216, or 1218), determine (at 1124, 1136, or 1220) whether to accept or reject each potential grant.

Based on the determination at 1620, the UE may, at 1622, transmit (or omit/skip a transmission) of feedback corresponding to the received at least one grant. Feedback for a potential grant may be associated with a HARQ codebook (type 1 or type 2) and may be transmitted via a feedback resource configured in the potential grant received by the UE as described above in relation to FIGS. 5, 9, 11, and 12. A feedback configuration may determine the type of feedback (ACK or NACK) indicating an acceptance or rejection and a default behavior of the TRP (or associated network node or device) and the UE if no feedback is received or transmitted. For example, 1622 may be performed by application processor 1706, cellular baseband processor 1724, transceiver(s) 1722, antenna(s) 1780, and/or resource pool configuration component 198 of FIG. 17. Referring to FIGS. 11 and 12, for example, UE 1104 (or the UE 1204) may, transmit (or omit) feedback (e.g., acceptance 1126, acceptance 1222, rejection 1138, or rejection 1224).

Assuming that at least one potential grant is accepted and corresponding feedback transmitted or omitted at 1622 is correctly interpreted at the corresponding TRP, the UE may, at 1624, receive (from the corresponding TRP) a grant of a resource, or set of resources, associated with (or indicated in) the potential grant. In some aspects using a single-DCI pre-grant (or potential grant) format, receiving the grant of resources at 1624 is performed when (or by) receiving the potential grant in association with the monitoring and determination at 1618 (e.g., the potential grant may include the information for a granted resource, or set of resources, if accepted). When using a two-DCI pre-grant (or potential grant) format, in some aspects, the UE may, at 1624, receive an additional DCI granting the resource. The additional DCI may use a DCI grant format (e.g., DCI type 0_0, 0_1, 1_0, 1_1, etc.) or may use a new format including information related to granting the resource for the at least one accepted communication that is not included in the first (potential grant or pre-grant) DCI received in association with the monitoring and determination at 1618. Accordingly, the new format, in some aspects, may be based on the information included in the first (potential grant or pre-grant) DCI. For example, 1624 may be performed by application processor 1706, cellular baseband processor 1724, transceiver(s) 1722, antenna(s) 1780, and/or resource pool configuration component 198 of FIG. 17. Referring to FIGS. 11 and 12, for example, UE 1104 (or the UE 1204) may, receive grant 1128 or 1226 (or pre-grant 1122 or 1218) indicating a grant of a resource for communication 1130 or 1230, respectively.

Based on receiving the grant of resources at 1624 via the additional DCI (or based on receiving the grant in association with the monitoring and determination at 1618 via the first DCI indicating the potential grant), the UE, in some aspects, may, at 1626, transmit and/or receive the at least one (accepted) communication based on the feedback transmitted (or omitted) at 1622. Transmitting and/or receiving multiple communications of the at least one communication, in some aspects, may include any combination of transmitting to, or receiving from, the first and second TRPs based on the indicated types of transmissions (e.g., PUSCH, PDSCH, PUCCH, etc.) via non-conflicting resources in the second resource pool. For example, 1626 may be performed by application processor 1706, cellular baseband processor 1724, transceiver(s) 1722, antenna(s) 1780, and/or resource pool configuration component 198 of FIG. 17. Referring to FIGS. 11 and 12, for example, UE 1104 (or the UE 1204) may, transmit and/or receive communication 1130 (or communication 1230) via resources indicated in one of grant 1128 or pre-grant 1122 (or one of grant 1226 or pre-grant 1218).

After transmitting or receiving the at least one communication at 1626, or if the UE determines, at 1618, that a potential grant for at least one communication was not received, the UE may determine, at 1628, if the time period associated with the second resource pool is complete. If the UE determines, at 1628 that the time period associated with the second resource pool is not complete, the UE may return to monitor for a grant of resources to determine, at 1618, whether the UE has received a potential grant for at least one communication. If the UE determines, at 1628, that the time period associated with the second resource pool is complete, the UE may return to 1610 to determine whether a current time period is associated with the first resource pool associated with the first TRP, with the second resource pool associated with both the first TRP and the second TRP, or with the third resource pool associated with the second TRP. For example, 1628 may be performed by application processor 1706, cellular baseband processor 1724, and/or resource pool configuration component 198 of FIG. 17. Referring to FIG. 11, for example, UE 1104 may, receive pre-grant 1122 and exchange communication 1130 with TRP0 1102 and then, based on a determination that the time period associated with third shared resource pool 1119 has not ended, monitor for additional potential grants such as pre-grant 1134. While the determinations at 1616A, 1616B, and 1628 are illustrated as being dependent on the monitoring and determining at 1612A, 1612B, and 1618, in some aspects, each of the determinations at 1616A, 1616B, and 1628 and the monitoring and determining at 1612A, 1612B, and 1618 are performed independently and may not be interrupted by the receipt or a grant or potential grant and the subsequent transmissions related to a received grant or potential grant.

Figure 17:
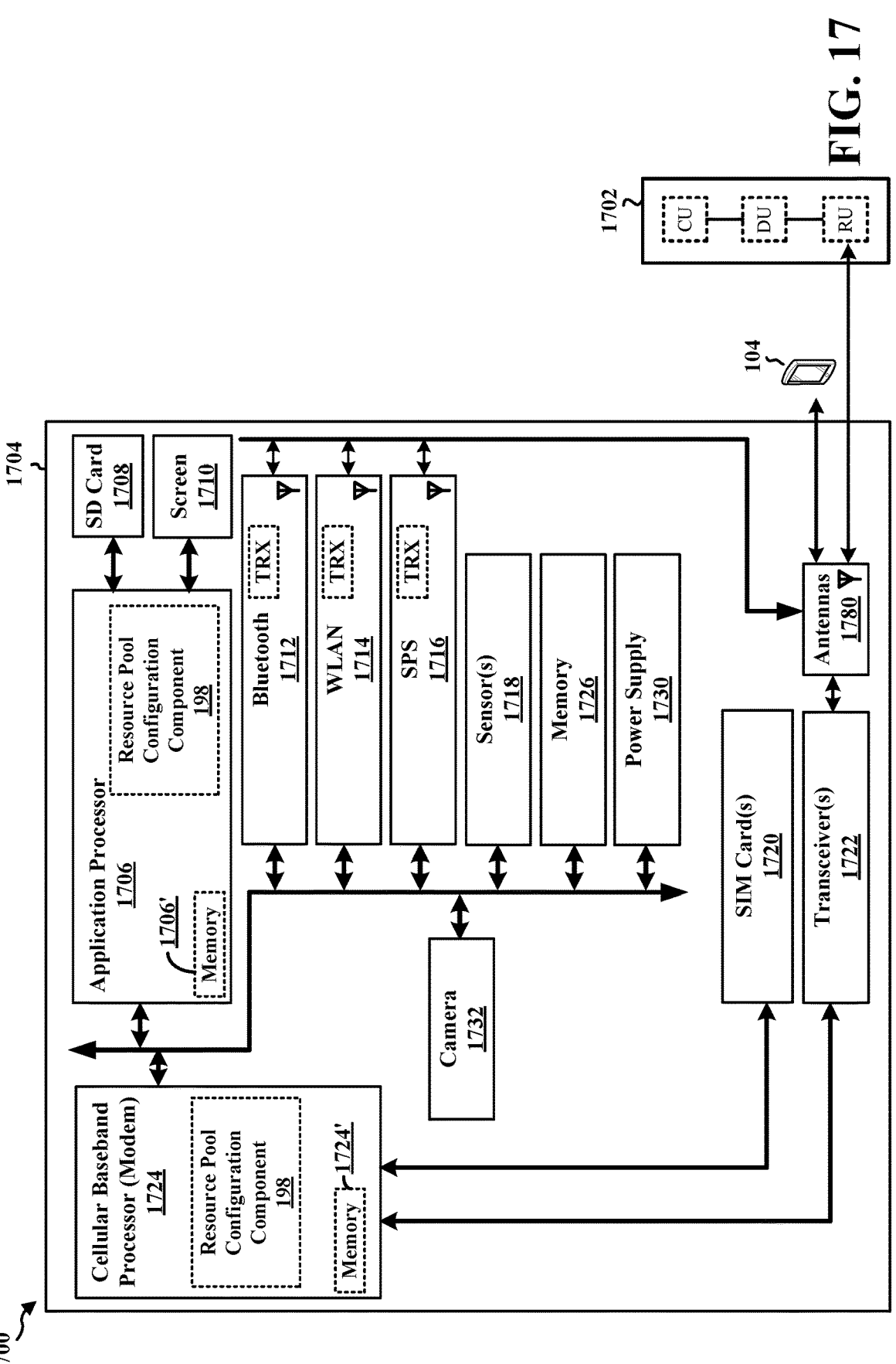
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include a cellular baseband processor 1724 (also referred to as a modem) coupled to one or more transceivers 1722 (e.g., cellular RF transceiver). The cellular baseband processor 1724 may include on-chip memory 1724'. In some aspects, the apparatus 1704 may further include one or more subscriber identity modules (SIM) cards 1720 and an application processor 1706 coupled to a secure digital (SD) card 1708 and a screen 1710. The application processor 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor 1724 communicates through the transceiver(s) 1722 via one or more antennas 1780 with the UE 104 and/or with an RU associated with a network entity 1702. The cellular baseband processor 1724 and the application processor 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described supra. The computer-readable medium/memory may also be used for storing data that is manipulated by the cellular baseband processor 1724/application processor 1706 when executing software. The cellular baseband processor 1724/application processor 1706 may be a component of the UE 350 and may include the memory 360 and/or at least one of the TX processor 368, the RX processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., see UE 350 of FIG. 3) and include the additional modules of the apparatus 1704.

As discussed supra, the resource pool configuration component 198 may be configured to receive a configuration for at least a first resource pool associated with a first TRP and a second resource pool associated with both the first TRP and a second TRP. The resource pool configuration component 198 may further be configured to receive a grant for a resource for a first communication with the first TRP via one of a single control message based on the resource being in the first resource pool, or multiple control messages based on the resource being in the second resource pool. The resource pool configuration component 198 may be within the cellular baseband processor 1724, the application processor 1706, or both the cellular baseband processor 1724 and the application processor 1706. The resource pool configuration component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, may include means for receiving a configuration for at least a first resource pool associated with a first TRP and a second resource pool associated with both the first TRP and a second TRP. The apparatus 1704, and in particular the cellular baseband processor 1724 and/or the application processor 1706, in some aspects, may include means for receiving a grant for a resource for a first communication with the first TRP via: a single control message based on the resource being in the first resource pool, or multiple control messages based on the resource being in the second resource pool. The apparatus 1704, and in particular the cellular baseband processor 1724 and/or the application processor 1706, in some aspects, may include means for receiving a configuration for a third resource pool associated with the second TRP. The apparatus 1704, and in particular the cellular baseband processor 1724 and/or the application processor 1706, in some aspects, may include means for receiving an additional grant for an additional resource for a second communication with the second TRP via: a single additional control message based on the additional resource being in the third resource pool, or multiple additional control messages based on the additional resource being in the second resource pool. The apparatus 1704, and in particular the cellular baseband processor 1724 and/or the application processor 1706, in some aspects, may include means for receiving, from the first TRP, a single downlink control information (DCI) including the grant of the resource. The apparatus 1704, and in particular the cellular baseband processor 1724 and/or the application processor 1706, in some aspects, may include means for transmitting or receiving, via the first TRP, the first communication associated with the first TRP via the resource. The apparatus 1704, and in particular the cellular baseband processor 1724 and/or the application processor 1706, in some aspects, may include means for receiving the first DCI indicating the potential grant of the resource. The apparatus 1704, and in particular the cellular baseband processor 1724 and/or the application processor 1706, in some aspects, may include means for transmitting, for the first TRP, the feedback indicating that the potential grant of the resource is accepted. The apparatus 1704, and in particular the cellular baseband processor 1724 and/or the application processor 1706, in some aspects, may include means for transmitting or receiving, via the first TRP and based on the resource indicated in the first DCI, the first communication associated with the first TRP via the resource. The apparatus 1704, and in particular the cellular baseband processor 1724 and/or the application processor 1706, in some aspects, may include means for receiving, from the first TRP, a second DCI indicating the grant of the resource in the second resource pool. The apparatus 1704, and in particular the cellular baseband processor 1724 and/or the application processor 1706, in some aspects, may include means for receiving, from the first TRP, a first DCI indicating a first potential grant of a second resource in the second resource pool for a second communication with the first TRP. The apparatus 1704, and in particular the cellular baseband processor 1724 and/or the application processor 1706, in some aspects, may include means for transmitting, for the first TRP, a first feedback indicating that the first potential grant of the second resource is rejected. The apparatus 1704, and in particular the cellular baseband processor 1724 and/or the application processor 1706, in some aspects, may include means for receiving, from the second TRP, a second DCI indicating a second potential grant of a third resource in the second resource pool for a third communication with the second TRP. The apparatus 1704, and in particular the cellular baseband processor 1724 and/or the application processor 1706, in some aspects, may include means for transmitting, for the second TRP, a second feedback indicating that the second potential grant of the third resource is accepted. The apparatus 1704, and in particular the cellular baseband processor 1724 and/or the application processor 1706, in some aspects, may include means for receiving, from the second TRP, a third DCI indicating the grant of the third resource in the second resource pool. The apparatus 1704, and in particular the cellular baseband processor 1724 and/or the application processor 1706, in some aspects, may include means for transmitting or receiving, via the second TRP, the third communication associated with the second TRP via the third resource. The apparatus 1704, and in particular the cellular baseband processor 1724 and/or the application processor 1706, in some aspects, may include means for receiving a configuration, for uplink communication with the first TRP, a third indication of a third resource pool associated with the first TRP and a fourth resource pool associated with both the first TRP and the second TRP. The apparatus 1704, and in particular the cellular baseband processor 1724 and/or the application processor 1706, in some aspects, may include means for receiving, from the first TRP, a first DCI indicating a potential grant of a plurality of subsets of resources in the second resource pool for a plurality of transmissions. The apparatus 1704, and in particular the cellular baseband processor 1724 and/or the application processor 1706, in some aspects, may include means for transmitting separate feedback to the potential grant for one or more of the plurality of transmissions. The means may be the resource pool configuration component 198 of the apparatus 1704 configured to perform the functions described in relation to FIGS. 13 and 14 and recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 18:
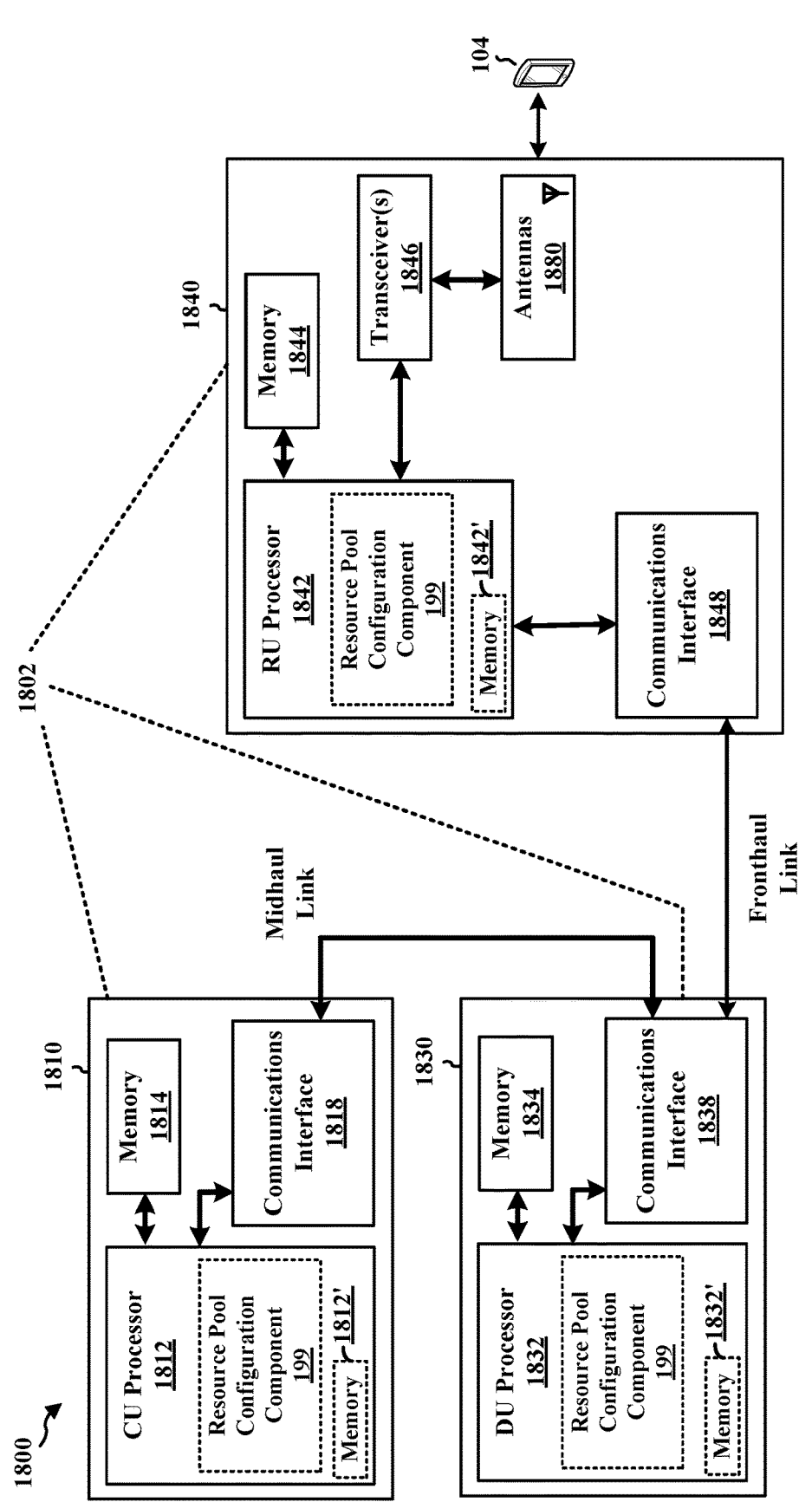
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include a CU processor 1812. The CU processor 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include a DU processor 1832. The DU processor 1832 may include on-chip memory 1832'. In some aspects, the DU 1830 may further include additional memory modules 1834 and a communications interface 1838. The DU 1830 communicates with the RU 1840 through a fronthaul link. The RU 1840 may include an RU processor 1842. The RU processor 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the resource pool configuration component 199 may be configured to configure at least a first resource pool associated with the first TRP and a second resource pool associated with both the first TRP and a second TRP. The resource pool configuration component 199 may further be configured to provide a grant for a resource for a first communication with the first TRP using one of a single control message based on the resource being in the first resource pool, or multiple control messages based on the resource being in the second resource pool. The resource pool configuration component 199 may be within one or more processors of one or more of the CU 1810, DU 1830, and the RU 1840. The resource pool configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1802 may include a variety of components configured for various functions. In one configuration, the network entity 1802 may include means for configuring at least a first resource pool associated with the first TRP and a second resource pool associated with both the first TRP and the second TRP. In one configuration, the network entity 1802 may include means for providing a grant for a resource for a first communication with the first TRP using: a single control message based on the resource being in the first resource pool, or multiple control messages based on the resource being in the second resource pool. In one configuration, the network entity 1802 may include means for configuring a third resource pool associated with the second TRP. In one configuration, the network entity 1802 may include means for skipping scheduling in the third resource pool for a second communication with the first TRP. In one configuration, the network entity 1802 may include means for transmitting, from the first TRP, a single DCI including the grant of the subset of resources. In one configuration, the network entity 1802 may include means for transmitting or receiving, via the first TRP, the first communication via the subset of resources. In one configuration, the network entity 1802 may include means for receiving, based on the first DCI, a feedback indicating that the potential grant of the resource is accepted. In one configuration, the network entity 1802 may include means for transmitting, from the first TRP, a second DCI indicating the grant of the resource in the second resource pool. In one configuration, the network entity 1802 may include means for transmitting, for a second communication with the first TRP, a first DCI indicating a potential grant of an additional resource in the second resource pool for the second communication with a wireless device. In one configuration, the network entity 1802 may include means for receiving, based on the first DCI, a feedback indicating that the potential grant of the additional resource is rejected. In one configuration, the network entity 1802 may include means for omitting a transmission, from the first TRP, of a second DCI indicating the grant of the additional resource in the second resource pool. In one configuration, the network entity 1802 may include means for receiving, via backhaul signaling resource information for the second TRP. In one configuration, the network entity 1802 may include means for configuring, for uplink communication with a wireless device, a third resource pool associated with the first TRP and a fourth resource pool associated with both the first TRP and the second TRP. In one configuration, the network entity 1802 may include means for receiving separate feedback to the potential grant for one or more of the plurality of transmissions. The means may be the resource pool configuration component 199 of the network entity 1802 configured to perform the functions recited in the description of FIGS. 15 and 16 and by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

Figure 19:
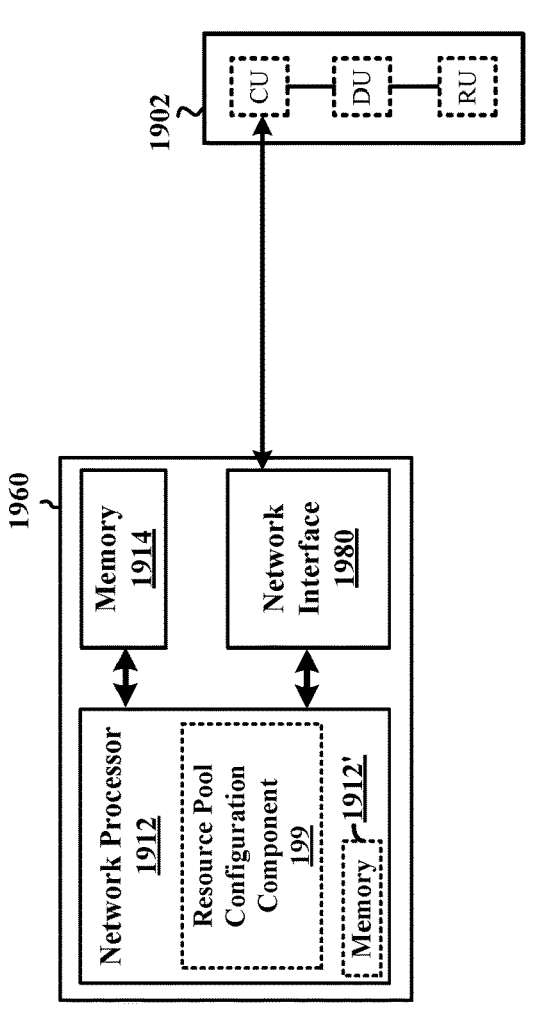
FIG. 19 is a diagram illustrating an example of a hardware implementation for an example network entity.

FIG. 19 is a diagram 1900 illustrating an example of a hardware implementation for a network entity 1960. In one example, the network entity 1960 may be within the core network 120. The network entity 1960 may include a network processor 1912. The network processor 1912 may include on-chip memory 1912'. In some aspects, the network entity 1960 may further include additional memory modules 1914. The network entity 1960 communicates via the network interface 1980 directly (e.g., backhaul link) or indirectly (e.g., through a RIC) with the CU 1902. The on-chip memory 1912' and the additional memory modules 1914 may each be considered a computer-readable medium/memory. Each computer-readable medium/memory may be non-transitory. The processor 1912 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the resource pool configuration component 199 may be configured to configure at least a first resource pool associated with the first TRP and a second resource pool associated with both the first TRP and a second TRP. The resource pool configuration component 199 may further be configured to provide a grant for a resource for a first communication with the first TRP using one of a single control message based on the resource being in the first resource pool, or multiple control messages based on the resource being in the second resource pool. The resource pool configuration component 199 may be within the processor 1912. The resource pool configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1960 may include a variety of components configured for various functions. In one configuration, the network entity 1960 may include means for configuring at least a first resource pool associated with the first TRP and a second resource pool associated with both the first TRP and the second TRP. In one configuration, the network entity 1960 may include means for configuring a third resource pool associated with the second TRP. In one configuration, the network entity 1960 may include means for configuring, for uplink communication with a wireless device, a third resource pool associated with the first TRP and a fourth resource pool associated with both the first TRP and the second TRP. The means may be the resource pool configuration component 199 of the network entity 1960 configured to perform the functions recited in the description of FIGS. 15 and 16 and by the means.

In some aspects of wireless communication, e.g., 5G NR, a mTRP architecture may be implemented allowing a UE to connect to multiple TRPs. In some aspects, multiple TRPs connected to a particular UE may not cooperate and/or coordinate (e.g., in real-time and/or via fast backhaul signaling) to schedule individual communications. The lack of cooperation and/or coordination may lead to "collisions" between communications for the different TRPs such that neither communication can be decoded resulting in wasted resources. For example, a same set of resources (or overlapping resources in one or more of frequency and/or time) may be allocated and/or granted for communication with a particular UE (or other wireless device) by two TRPs such that neither can be decoded. Accordingly, a method and apparatus are provided to configure resource pools for each TRP separately and/or a shared resource pool and a corresponding type of resource grant procedure for separate and shared resource pools to reduce collisions and wasted resources for non-cooperating and/or non-coordinating TRPs.

The method and apparatus, in some aspects, may allocate, for a particular UE or wireless device, a first (separate) resource pool for communication between the UE and a first TRP, a second (separate) resource pool for communication between the UE and a second TRP, and a third (shared) resource pool for communication between the UE and either the first TRP or the second TRP. The method and apparatus may further configure each TRP to grant resources in a corresponding first or second (separate) resource pool using a first format (e.g., a legacy DCI format) that is not configured to handle collisions and to grant resources in the third (shared) resource pool using a second format (e.g., a pre-grant format as described below) that is configured to handle collisions. Accordingly, the method and apparatus reduce the effect of collisions while introducing a minimal amount of additional cooperation and/or coordination between independent TRPs and a minimal amount of additional signaling overhead.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first network device associated with a first TRP, including configuring at least a first resource pool associated with the first TRP and a second resource pool associated with both the first TRP and a second TRP, and providing a grant for a resource for a first communication with the first TRP using one of a single control message based on the resource being in the first resource pool, or multiple control messages based on the resource being in the second resource pool.

Aspect 2 is the method of aspect 1, further including configuring a third resource pool associated with the second TRP and skipping scheduling in the third resource pool for a second communication with the first TRP.

Aspect 3 is the method of any of aspects 1 and 2, where the first communication is associated with a wireless device connected to the first TRP and the second TRP and the resource for the first communication with the first TRP is in a subset of resources in the first resource pool, where providing the grant includes transmitting, from the first TRP, a single DCI including the grant of the subset of resources and transmitting or receiving, via the first TRP, the first communication via the subset of resources.

Aspect 4 is the method of any of aspects 1 to 2, where the multiple control messages include a first DCI indicating a potential grant of the resource in the second resource pool for the first communication with a wireless device and a feedback indicating that the potential grant of the resource is accepted, the method further including: transmitting the first DCI indicating the potential grant of the resource, receiving, from the wireless device, the feedback indicating that the potential grant of the resource is accepted and transmitting or receiving, based on the resource indicated in the first DCI, the first communication associated with the first TRP via the resource.

Aspect 5 is the method of any of aspects 1 and 2, where the multiple control messages include a first DCI indicating a potential grant of the resource in the second resource pool for the first communication with the wireless device, a feedback indicating that the potential grant of the resource is accepted, and a second DCI indicating the grant of the resource in the second resource pool, the method further including: transmitting the first DCI indicating the potential grant of the resource, receiving, from the wireless device, the feedback indicating that the potential grant of the resource is accepted, transmitting a second DCI indicating the grant of the resource in the second resource pool, and transmitting or receiving, via the first TRP, the first communication associated with the first TRP via the resource.

Aspect 6 is the method of any of aspects 1 to 5, further including transmitting, for a second communication with the first TRP, a first DCI indicating a potential grant of an additional resource in the second resource pool for the second communication with a wireless device, receiving, based on the first DCI, a feedback indicating that the potential grant of the additional resource is rejected, and omitting a transmission, from the first TRP, of a second DCI indicating the grant of the additional resource in the second resource pool.

Aspect 7 is the method of any of aspects 1 to 6, receiving, via backhaul signaling resource information for the second TRP, where configuring at least the first resource pool associated with the first TRP and the second resource pool associated with both the first TRP and the second TRP is based on the resource information for the second TRP.

Aspect 8 is the method of any of aspects 1 to 7, where a configuration of the first resource pool and the second resource pool is UE specific.

Aspect 9 is the method of any of aspects 1 to 8, where the first resource pool is configured for downlink communication, the method further including configuring, for uplink communication with a wireless device, a third resource pool associated with the first TRP and a fourth resource pool associated with both the first TRP and the second TRP.

Aspect 10 is the method of any of aspects 1, 2, or 4 to 9, where the multiple control messages include a first DCI indicating a potential grant of a plurality of subsets of resources in the second resource pool for a plurality of transmissions associated with a wireless device, the method further including transmitting the first DCI indicating the potential grant of the plurality of subsets of resources.

Aspect 11 is the method of aspect 10, where the first DCI separately indicates each of the plurality of subsets of resources for the plurality of transmissions.

Aspect 12 is the method of aspect 10, where the first DCI indicates a subset of resources to be reserved within a slot and a number of slots in which a corresponding subset of resources are to be reserved.

Aspect 13 is the method of any of aspects 10 to 12, further including receiving separate feedback to the potential grant for one or more of the plurality of transmissions.

Aspect 14 is a method of wireless communication at a wireless device, the method including receiving a configuration for at least a first resource pool associated with a first TRP and a second resource pool associated with both the first TRP and a second TRP and receiving a grant for a resource for a first communication with the first TRP via one of a single control message based on the resource being in the first resource pool, or multiple control messages based on the resource being in the second resource pool.

Aspect 15 is the method of aspect 14, further including receiving an additional configuration for a third resource pool associated with the second TRP, and receiving an additional grant for an additional resource for a second communication with the second TRP via one of a single additional control message based on the additional resource being in the third resource pool, or multiple additional control messages based on the additional resource being in the second resource pool.

Aspect 16 is the method of any of aspects 14 and 15, where the resource for the first communication with the first TRP is in the first resource pool, where receiving the grant includes receiving, from the first TRP, a single DCI including the grant of the resource, and transmitting or receiving, via the first TRP, the first communication associated with the first TRP via the resource.

Aspect 17 is the method of any of aspects 14 and 15, where the multiple control messages include a first DCI indicating a potential grant of the resource in the second resource pool for the first communication with the first TRP and a feedback indicating that the potential grant of the resource is accepted, the method further including receiving the first DCI indicating the potential grant of the resource, transmitting, for the first TRP, the feedback indicating that the potential grant of the resource is accepted, and transmitting or receiving, via the first TRP and based on the resource indicated in the first DCI, the first communication associated with the first TRP via the resource.

Aspect 18 is the method of any of aspects 14 to 16, where the multiple control messages include a first DCI indicating a potential grant of the resource in the second resource pool for the first communication with the first TRP, a feedback indicating that the potential grant of the resource is accepted, and a second DCI indicating the grant of the resource in the second resource pool, the method further including receiving the first DCI indicating the potential grant of the resource, transmitting, for the first TRP, a feedback indicating that the potential grant of the resource is accepted, receiving, from the first TRP, a second DCI indicating the grant of the resource in the second resource pool, and transmitting or receiving, via the first TRP, the first communication associated with the first TRP via the resource.

Aspect 19 is the method of any of aspects 14 to 18, where the resource is a first resource, the method further including receiving, from the first TRP, a first DCI indicating a first potential grant of a second resource in the second resource pool for a second communication with the first TRP, and transmitting, for the first TRP, a first feedback indicating that the first potential grant of the second resource is rejected.

Aspect 20 is the method of aspect 19, further including receiving, from the second TRP, a second DCI indicating a second potential grant of a third resource in the second resource pool for a third communication with the second TRP, where there is an overlap between the second resource and the third resource, where transmitting the first feedback indicating that the first potential grant of the second resource is rejected is based on the overlap between the second resource and the third resource.

Aspect 21 is the method of aspect 20, further including transmitting, for the second TRP, a second feedback indicating that the second potential grant of the third resource is accepted, receiving, from the second TRP, a third DCI indicating the grant of the third resource in the second resource pool, and transmitting or receiving, via the second TRP, the third communication associated with the second TRP via the third resource.

Aspect 22 is the method of any of aspects 14 to 21, where the first resource pool is configured for downlink communication, the method further including receiving a configuration, for uplink communication with the first TRP, a third indication of a third resource pool associated with the first TRP and a fourth resource pool associated with both the first TRP and the second TRP.

Aspect 23 is the method of any of aspects 1, 2, or 4-21, where receiving the grant includes receiving, from the first TRP, a first DCI indicating a potential grant of a plurality of subsets of resources in the second resource pool for a plurality of transmissions.

Aspect 24 is the method of aspect 23, where the first DCI separately indicates each of the plurality of subsets of resources for the plurality of transmissions.

Aspect 25 is the method of aspect 23, where the first DCI indicates a subset of resources to be reserved in a single slot and a number of slots in which a same subset of resources is to be reserved.

Aspect 26 is the method of any of aspects 23 to 25, where the first DCI indicates a subset of resources to be reserved in a single slot and a number of slots in which a same subset of resources is to be reserved.

Aspect 27 is an apparatus for wireless communication at a device including a memory and at least one processor coupled to the memory and, based at least in part on information stored in the memory, the at least one processor is configured to implement any of aspects 1 to 26.

Aspect 28 is the method of aspect 27, further including a transceiver or an antenna coupled to the at least one processor.

Aspect 29 is an apparatus for wireless communication at a device including means for implementing any of aspects 1 to 26.

Aspect 30 is a computer-readable medium (e.g., a non-transitory computer-readable medium) storing computer executable code, where the code when executed by a processor causes the processor to implement any of aspects 1 to 26.

What is claimed is:

1. An apparatus for wireless communication at a first network device associated with a first transmission and reception point (TRP), comprising:
   memory; and
   at least one processor coupled to the memory and, based at least in part on information stored in the memory, the at least one processor is configured to:
   configure at least a first resource pool associated with the first TRP and a second resource pool associated with both the first TRP and a second TRP;
   transmit, for a first communication with the first TRP, a first resource-granting control message that indicates a grant of a first resource in the first resource pool, wherein the first network device is configured to use the first resource-granting control message in association with the first resource pool; and
   transmit, for a second communication with the first TRP, a second potential-resource-granting control message that indicates a potential grant of a second resource in the second resource pool, wherein the first network device is configured to use the second potential-resource-granting control message in association with the second resource pool.

2. The apparatus of claim 1, wherein the at least one processor is further configured to:
   configure a third resource pool associated with the second TRP; and
   skip scheduling in the third resource pool for a third communication with the first TRP.

3. The apparatus of claim 1, wherein the first communication is associated with a wireless device connected to the first TRP and the second TRP, wherein the first resource-granting control message is a downlink control information (DCI) that indicates the grant of the first resource for the first communication, and wherein the at least one processor is further configured to:
   transmit or receive, via the first TRP, the first communication via the first resource.

4. The apparatus of claim 1, wherein the second potential-resource-granting control message is a downlink control information (DCI) that indicates a potential grant of the second resource in the second resource pool for the second communication with a wireless device, wherein the at least one processor is further configured to:
   receive, from the wireless device, a feedback indicating that the potential grant of the second resource is accepted; and transmit or receive, based on the potential grant of the second resource indicated in the first DCI and the feedback, the second communication associated with the first TRP via the second resource.

5. The apparatus of claim 1, wherein the second potential-resource-granting control message is a downlink control information (DCI) that indicates the potential grant of the second resource in the second resource pool for the second communication with a wireless device, wherein the at least one processor is further configured to:

receive, from the wireless device, a feedback indicating that the potential grant of the second resource is accepted;

transmit a second DCI indicating the grant of the second resource in the second resource pool; and transmit or receive, via the first TRP, the first communication associated with the first TRP via the second resource.

6. The apparatus of claim 1, wherein the second potential-resource-granting control message is a downlink control information (DCI) that indicates the potential grant of the second resource in the second resource pool for the second communication with a wireless device, and wherein the at least one processor is further configured to:

receive, based on the DCI, a feedback indicating that the potential grant of the second resource is rejected; and omit a transmission, from the first TRP, of a resource-granting DCI indicating the grant of the second resource in the second resource pool.

7. The apparatus of claim 1, wherein the at least one processor is further configured to:

receive, via backhaul signaling resource information for the second TRP, wherein the at least one processor is configured to configure at least the first resource pool associated with the first TRP and the second resource pool associated with both the first TRP and the second TRP based on the resource information for the second TRP.

8. The apparatus of claim 1, wherein a configuration of the first resource pool and the second resource pool is UE specific.

9. The apparatus of claim 1, wherein the first resource pool is configured for downlink communication, wherein the at least one processor is further configured to:

configure, for uplink communication with a wireless device, a third resource pool associated with the first TRP and a fourth resource pool associated with both the first TRP and the second TRP.

10. The apparatus of claim 1, wherein the second potential-resource-granting control message is a downlink control information (DCI) that indicates a potential grant of a plurality of subsets of resources in the second resource pool for a plurality of transmissions associated with a wireless device, wherein the plurality of subsets of resources comprises the second resource.

11. The apparatus of claim 10, wherein the DCI separately indicates each of the plurality of subsets of resources for the plurality of transmissions.

12. The apparatus of claim 10, wherein the DCI indicates a subset of resources to be reserved within a slot and a number of slots in which a corresponding subset of resources are to be reserved.

13. The apparatus of claim 10, wherein the at least one processor is further configured to:

receive separate feedback to the potential grant for one or more of the plurality of transmissions.

14. An apparatus for wireless communication at a wireless device, comprising:

memory; and at least one processor coupled to the memory and, based at least in part on information stored in the memory, the at least one processor is configured to:

receive a configuration for at least a first resource pool associated with a first transmission and reception point (TRP) and a second resource pool associated with both the first TRP and a second TRP;

receive, for a first communication with the first TRP, a first resource-granting control message that indicates a grant of a first resource in the first resource pool, wherein the wireless device is configured to receive the first resource-granting control message in association with the first resource pool; and receive, for a second communication with the first TRP, a second potential-resource-granting control message that indicates a potential grant of a second resource in the second resource pool, wherein the wireless device is configured to receive the second potential-resource-granting control message in association with the second resource pool.

15. The apparatus of claim 14, wherein the at least one processor is further configured to:

receive an additional configuration for a third resource pool associated with the second TRP;

receive, for a third communication with the second TRP, a third resource-granting control message that indicates an additional grant of a third resource in the third resource pool, wherein the wireless device is configured to receive the third resource-granting control message in association with the third resource pool; and receive, for a fourth communication with the second TRP, a fourth potential-resource-granting control message that indicates an additional potential grant of a fourth resource in the second resource pool, wherein the wireless device is configured to receive the fourth potential-resource-granting control message in association with the second resource pool.

16. The apparatus of claim 14, wherein the first resource-granting control message is a downlink control information (DCI) that indicates the grant of the first resource for the first communication, and wherein the at least one processor is further configured to:

transmit or receive, via the first TRP, the first communication associated with the first TRP via the first resource.

17. The apparatus of claim 14, wherein the second potential-resource-granting control message is a downlink control information (DCI) that indicates the potential grant of the second resource in the second resource pool for the second communication with the first TRP, wherein the at least one processor is further configured to:

transmit, for the first TRP, a feedback indicating that the potential grant of the second resource is accepted; and transmit or receive, via the first TRP and based on the potential grant of the second resource indicated in the DCI and the feedback, the second communication associated with the first TRP via the second resource.

18. The apparatus of claim 14, wherein the second potential-resource-granting control message is a downlink control information (DCI) that indicates the potential grant of the second resource in the second resource pool for the second communication with the first TRP, wherein the at least one processor is further configured to:

transmit, for the first TRP, a feedback indicating that the potential grant of the second resource is accepted;

receive, from the first TRP, a second DCI indicating the grant of the second resource in the second resource pool; and transmit or receive, via the first TRP, the first communication associated with the first TRP via the second resource.

19. The apparatus of claim 14, wherein the second potential-resource-granting control message is a downlink control information (DCI) that indicates the potential grant of the second resource in the second resource pool for the second communication with the first TRP, and, wherein the at least one processor is further configured to:

transmit, for the first TRP, a first feedback indicating that the potential grant of the second resource is rejected.

20. The apparatus of claim 19, wherein the at least one processor is further configured to:

receive, from the second TRP, an additional DCI that indicates an additional potential grant of a third resource in the second resource pool for a third communication with the second TRP, wherein there is an overlap between the second resource and the third resource, wherein the at least one processor is configured to transmit the first feedback indicating that the potential grant of the second resource is rejected based on the overlap between the second resource and the third resource.

21. The apparatus of claim 20, wherein the at least one processor is further configured to:

transmit, for the second TRP, a second feedback indicating that the additional potential grant of the third resource is accepted;

receive, from the second TRP, a third DCI indicating an additional grant of the third resource in the second resource pool; and transmit or receive, via the second TRP, the third communication associated with the second TRP via the third resource.

22. The apparatus of claim 14, wherein the first resource pool is configured for downlink communication, wherein the at least one processor is further configured to:

receive, for uplink communication with the first TRP, a third indication of an additional configuration of a third resource pool associated with the first TRP and a fourth resource pool associated with both the first TRP and the second TRP.

23. The apparatus of claim 14, wherein the second potential-resource-granting control message is a downlink control information (DCI) indicating a potential grant of a plurality of subsets of resources in the second resource pool for a plurality of transmissions, wherein the plurality of subsets of resources comprises the second resource.

24. The apparatus of claim 23, wherein the DCI separately indicates each of the plurality of subsets of resources for the plurality of transmissions.

25. The apparatus of claim 23, wherein the DCI indicates a subset of resources to be reserved in a single slot and a number of slots in which a same subset of resources is to be reserved.

26. The apparatus of claim 23, wherein the at least one processor is further configured to:

transmit separate feedback to the potential grant for one or more of the plurality of transmissions.

27. A method for wireless communication at a first network device associated with a first transmission and reception point (TRP), comprising:

configuring at least a first resource pool associated with the first TRP and a second resource pool associated with both the first TRP and a second TRP;

transmitting, for a first communication with the first TRP, a first resource-granting control message that indicates a grant of a first resource in the first resource pool, wherein the first network device is configured to use the first resource-granting control message in association with the first resource pool; and transmitting, for a second communication with the first TRP, a second potential-resource-granting control message that indicates a potential grant of a second resource in the second resource pool, wherein the first network device is configured to use the second potential-resource-granting control message in association with the second resource pool.

28. The method of claim 27, further comprising:

configuring a third resource pool associated with the second TRP; and skipping scheduling in the third resource pool for a third communication with the first TRP.

29. A method for wireless communication at a wireless device, the method comprising:

receiving a configuration for at least a first resource pool associated with a first transmission and reception point (TRP) and a second resource pool associated with both the first TRP and a second TRP;

receiving, for a first communication with the first TRP, a first resource-granting control message that indicates a grant of a first resource in the first resource pool, wherein the wireless device is configured to receive the first resource-granting control message in association with the first resource pool; and receiving, for a second communication with the first TRP, a second potential-resource-granting control message that indicates a potential grant of a second resource in the second resource pool, wherein the wireless device is configured to receive the second potential-resource-granting control message in association with the second resource pool.

30. The method of claim 29, wherein the second potential-resource-granting control message is a downlink control information (DCI) that indicates the potential grant of the second resource in the second resource pool for the second communication with the first TRP, the method further comprising:

receiving, from the second TRP, an additional DCI that indicates an additional potential grant of a third resource in the second resource pool for a third communication with the second TRP, wherein there is an overlap between the second resource and the third resource;

transmitting, for the first TRP and based on the overlap between the second resource and the third resource, a first feedback indicating that the first potential grant of the second resource is rejected;

transmitting, for the second TRP, a second feedback indicating that the additional potential grant of the third resource is accepted;

receiving, from the second TRP, a third DCI indicating an additional grant of the third resource in the second resource pool; and transmitting or receiving, via the second TRP, the third communication associated with the second TRP via the third resource.

* * * * *